(12) United States Patent
Park et al.

(10) Patent No.: US 11,121,744 B2
(45) Date of Patent: Sep. 14, 2021

(54) METHOD FOR TRANSMITTING AND RECEIVING DOWNLINK DATA IN WIRELESS COMMUNICATION SYSTEM, AND APPARATUS THEREFOR

(71) Applicant: LG Electronics Inc., Seoul (KR)

(72) Inventors: Jonghyun Park, Seoul (KR); Hanbyul Seo, Seoul (KR)

(73) Assignee: LG Electronics Inc., Seoul (KR)

(*) Notice: Subject to any disclaimer, the term of this patent is extended or adjusted under 35 U.S.C. 154(b) by 126 days.

(21) Appl. No.: 15/773,793

(22) PCT Filed: Nov. 4, 2016

(86) PCT No.: PCT/KR2016/012665
§ 371 (c)(1),
(2) Date: May 4, 2018

(87) PCT Pub. No.: WO2017/078464
PCT Pub. Date: May 11, 2017

(65) Prior Publication Data
US 2018/0323830 A1 Nov. 8, 2018

Related U.S. Application Data

(60) Provisional application No. 62/251,081, filed on Nov. 4, 2015, provisional application No. 62/291,484, filed
(Continued)

(51) Int. Cl.
*H04B 7/024* (2017.01)
*H04L 5/00* (2006.01)
(Continued)

(52) U.S. Cl.
CPC ............. *H04B 7/024* (2013.01); *H04L 5/001* (2013.01); *H04L 5/005* (2013.01); *H04L 5/0044* (2013.01);
(Continued)

(58) Field of Classification Search
CPC . H04W 72/1226; H04W 24/10; H04W 72/12; H04W 28/0231; H04W 24/0205;
(Continued)

(56) References Cited

U.S. PATENT DOCUMENTS

2010/0238821 A1 9/2010 Liu et al.
2013/0170469 A1 7/2013 Yu et al.
(Continued)

FOREIGN PATENT DOCUMENTS

WO 2013-137582 A1 9/2013

OTHER PUBLICATIONS

Samsung, "Necessary Enhancement to Support V2X on Uu Interface", R1-155522, 3GPP TSG RAN WG1 #82bis, Malmo, Sweden, Oct. 5-9, 2015.
(Continued)

*Primary Examiner* — Ashley Shivers
(74) *Attorney, Agent, or Firm* — Dentons US LLP

(57) ABSTRACT

Disclosed are a method for transmitting and receiving downlink data in a wireless communication system, and an apparatus therefor. Specifically, a method for receiving downlink data from multiple cells in a wireless communication system may comprise a step for receiving downlink data on a physical downlink shared channel (PDSCH), wherein the PDSCH includes a first resource block group and a second resource block group, downlink data transmitted from a first cell is mapped to the first resource block group, downlink data transmitted from a second cell is mapped to the second resource block group, and a quasi-co-location (QCL) assumption is independently applied in order to decode the first resource block group and the second resource block group.

19 Claims, 23 Drawing Sheets

Related U.S. Application Data on Feb. 4, 2016, provisional application No. 62/335,655, filed on May 12, 2016.

(51) Int. Cl.
*H04L 25/02* (2006.01)
*H04L 1/00* (2006.01)

(52) U.S. Cl.
CPC .............. *H04L 25/02* (2013.01); *H04L 5/0023* (2013.01); *H04L 5/0035* (2013.01); *H04L 2001/0093* (2013.01)

(58) Field of Classification Search
CPC ......... H04W 72/1205; H04W 72/1263; H04W 72/1278; H04W 74/04; H04B 7/024; H04B 7/04; H04B 7/0404; H04B 7/0408; H04B 7/0413; H04B 7/0452; H04B 7/0456; H04B 7/0473
See application file for complete search history.

(56) References Cited

U.S. PATENT DOCUMENTS

| | | | | |
|---|---|---|---|---|
| 2015/0078271 | A1* | 3/2015 | Kim | H04L 5/0051 370/329 |
| 2015/0304997 | A1* | 10/2015 | Park | H04L 23/00 370/330 |
| 2016/0248561 | A1* | 8/2016 | Davydov | H04B 7/0413 |
| 2017/0325208 | A1* | 11/2017 | Xin | H04W 72/0406 |
| 2018/0011163 | A1* | 1/2018 | Han | G01S 5/0236 |

OTHER PUBLICATIONS

LG Electronics, "Potential Enhancement Areas for Uu-based V2V and Uu/PC-based V2I/N/P", R1-155421, 3GPP TSG RAN WG1 Meeting #82bis, Malmo, Sweden, Oct. 5-9, 2015.

* cited by examiner

[FIG. 1]
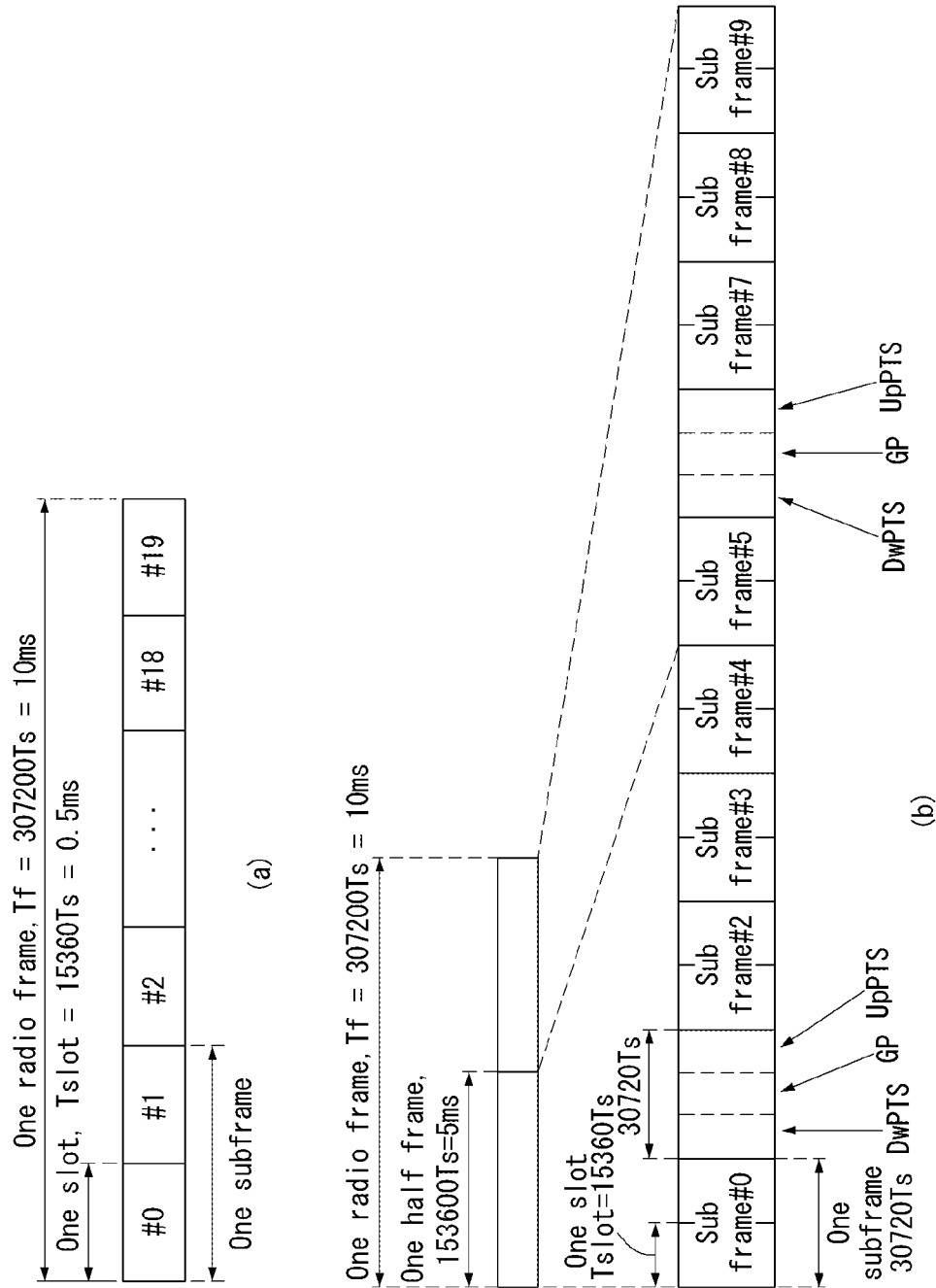

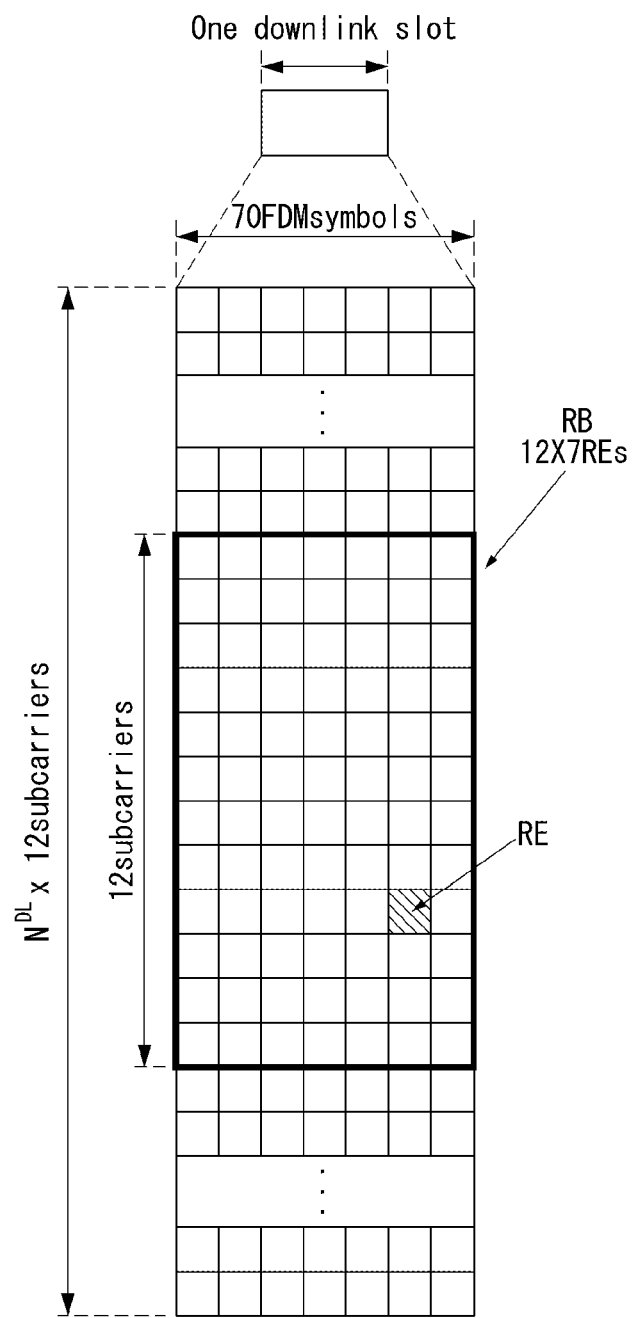
[FIG. 2]

[FIG. 3]
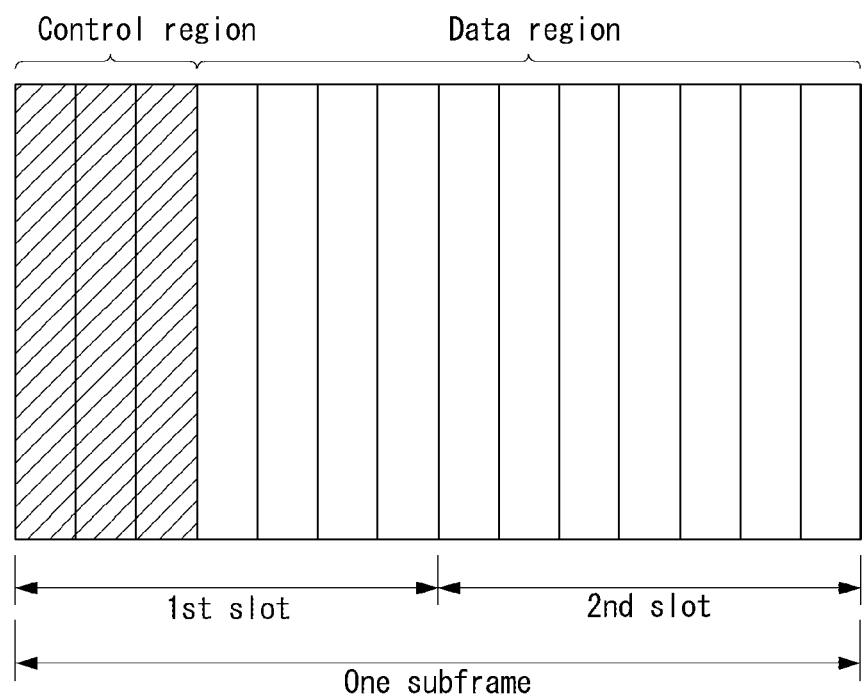
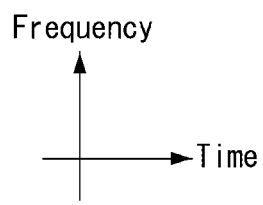

[FIG. 4]
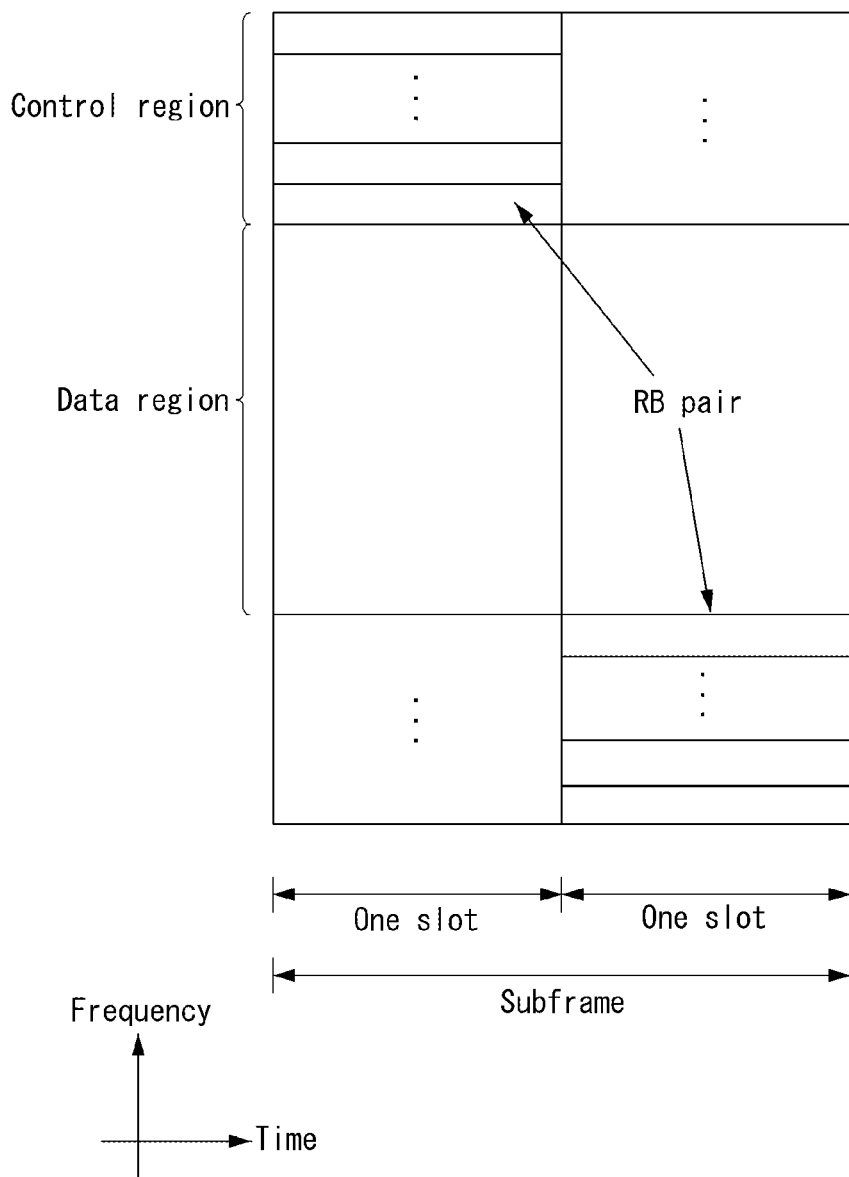

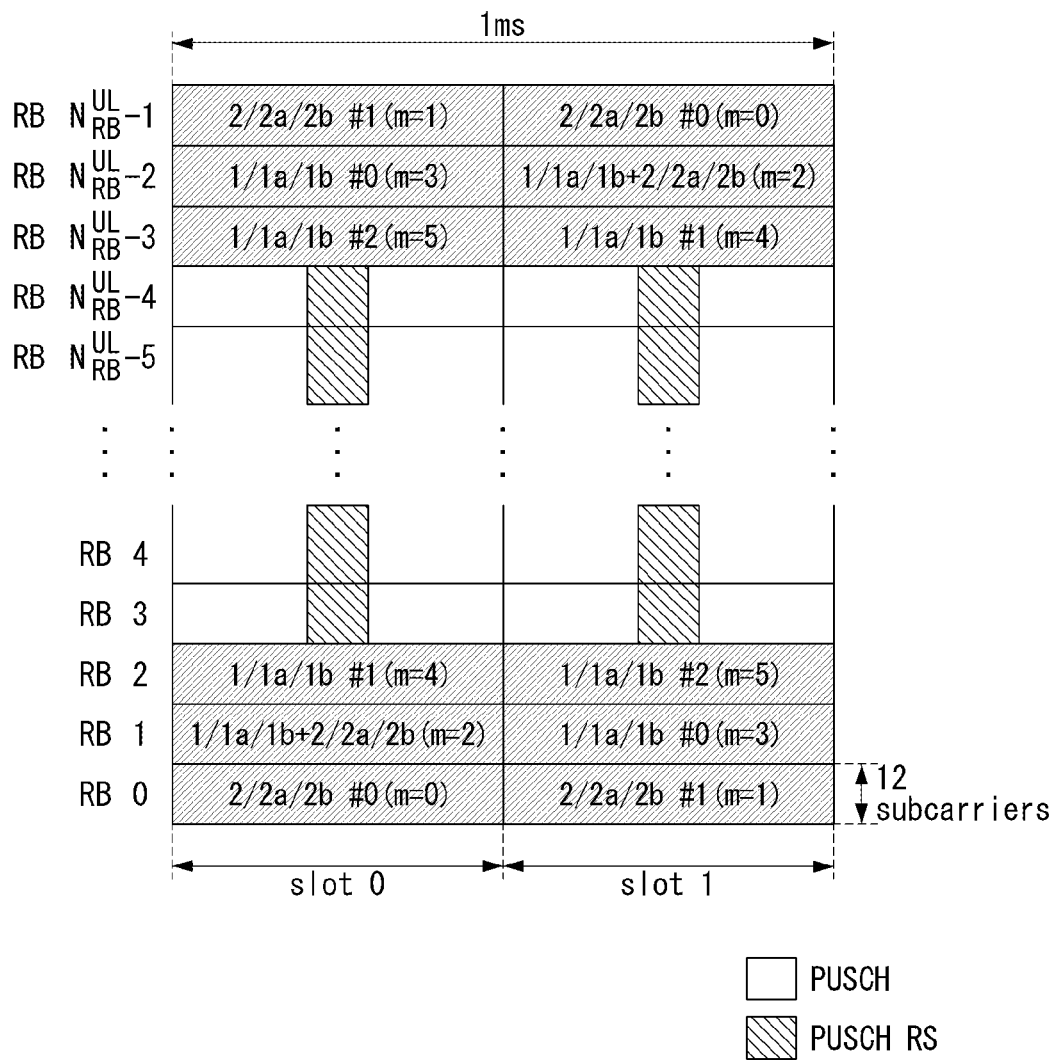

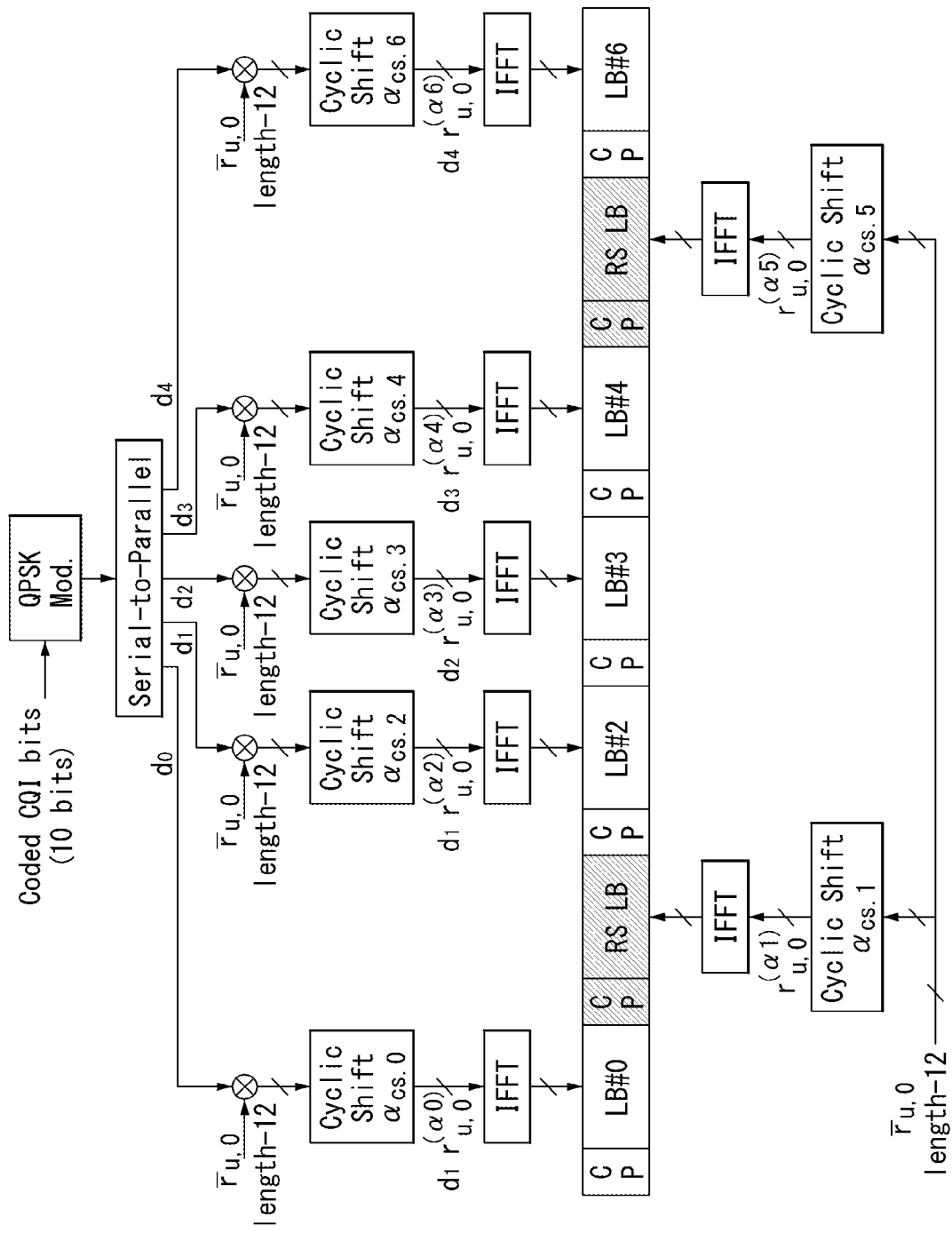
[FIG. 6]

[FIG. 7]
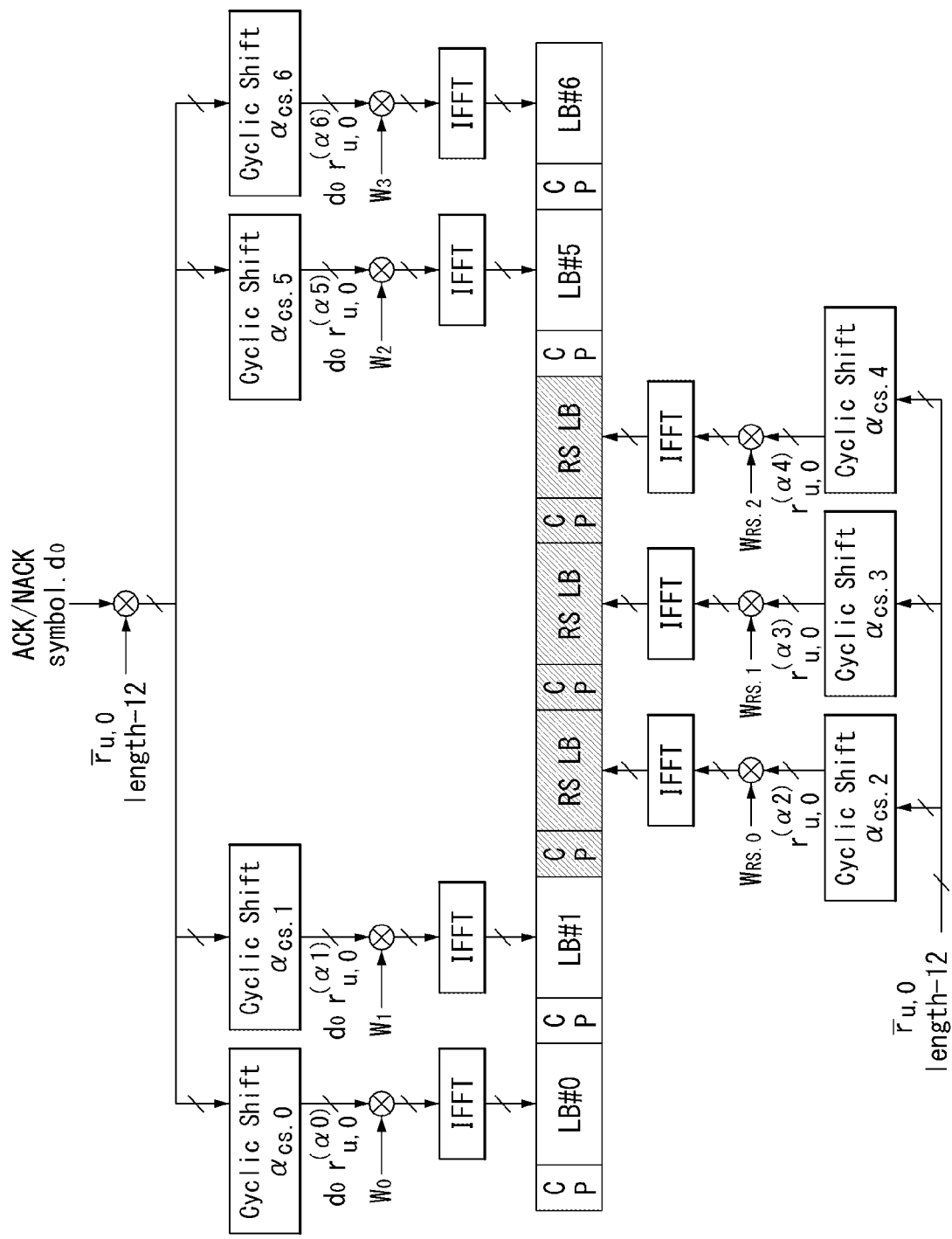

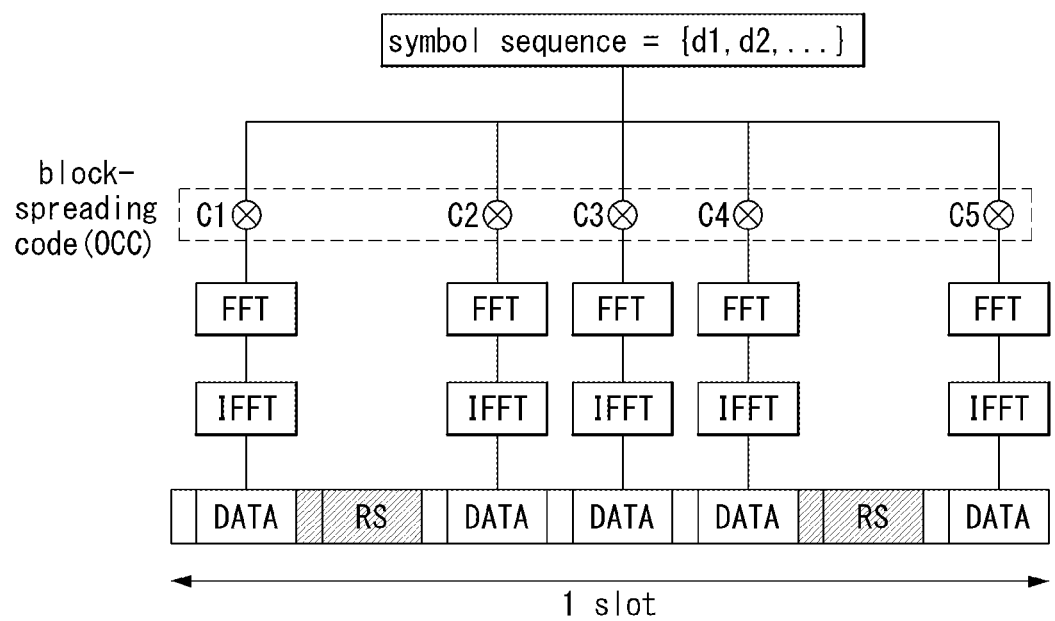
[FIG. 8]

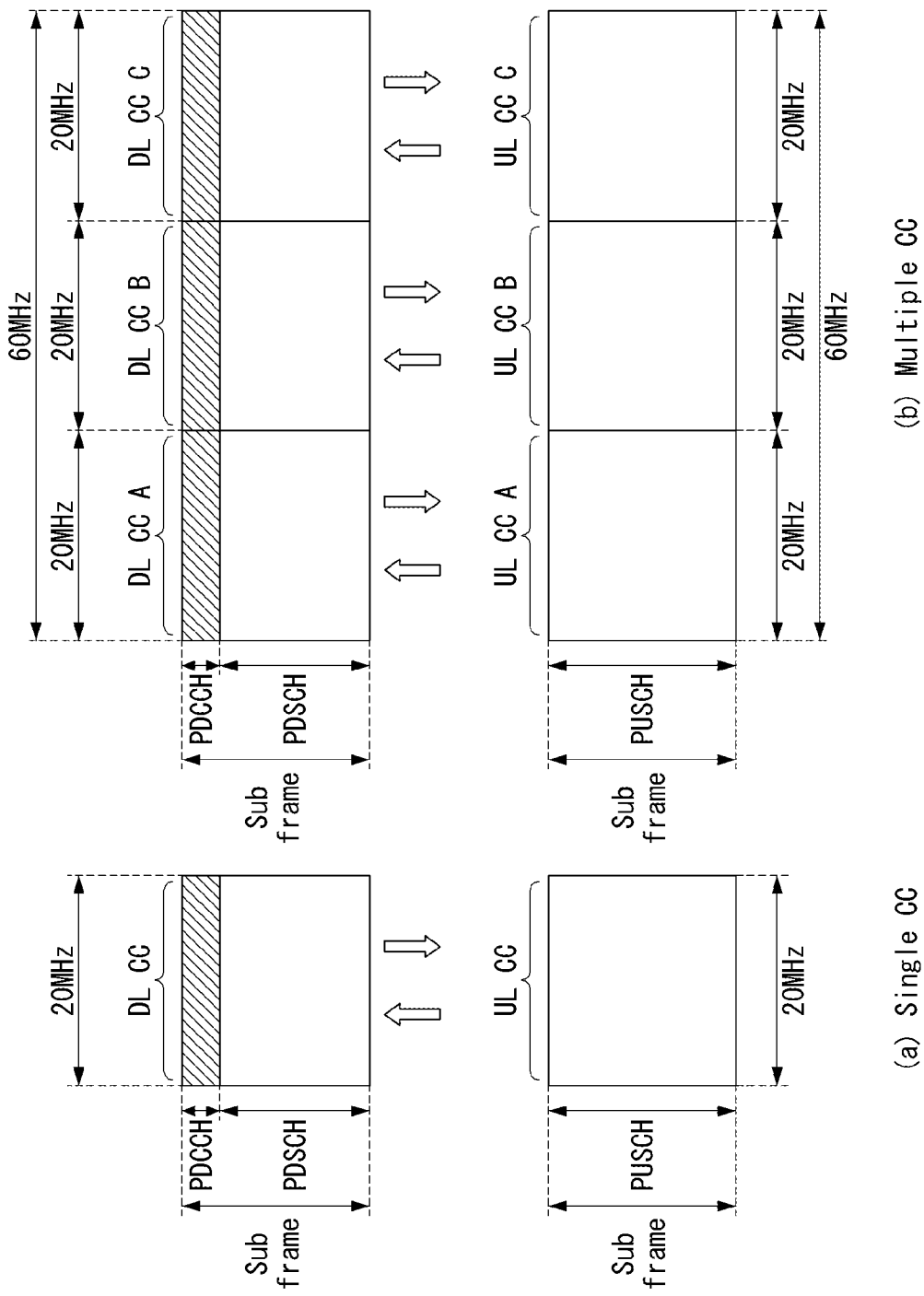

[FIG. 10]
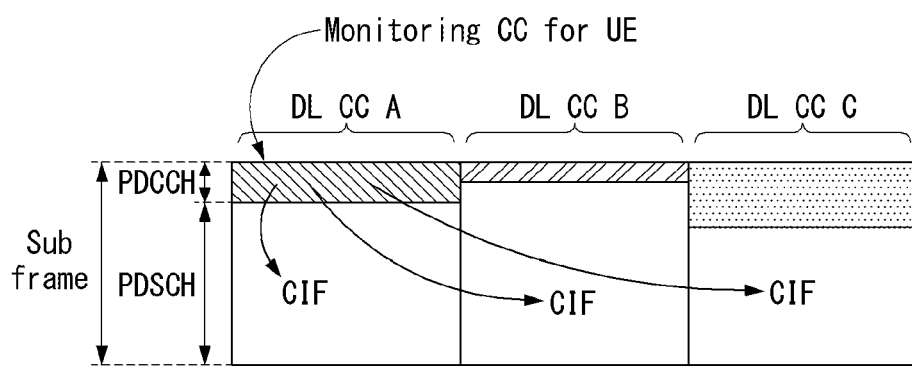
[FIG. 11]
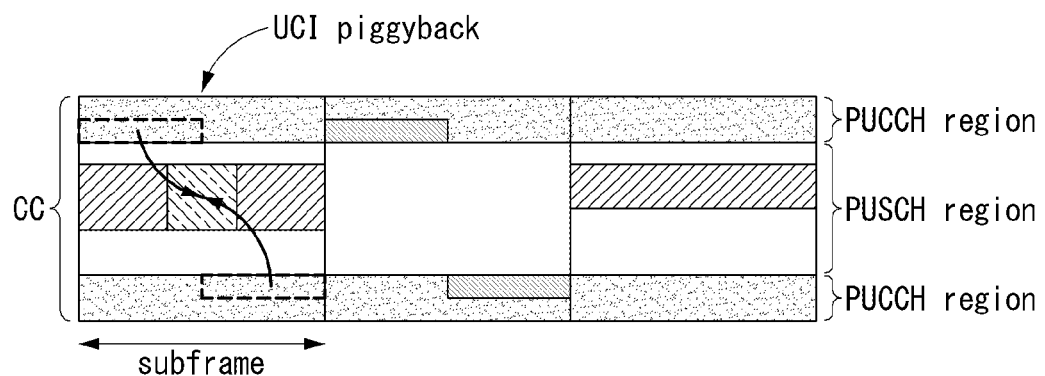

[FIG. 12]
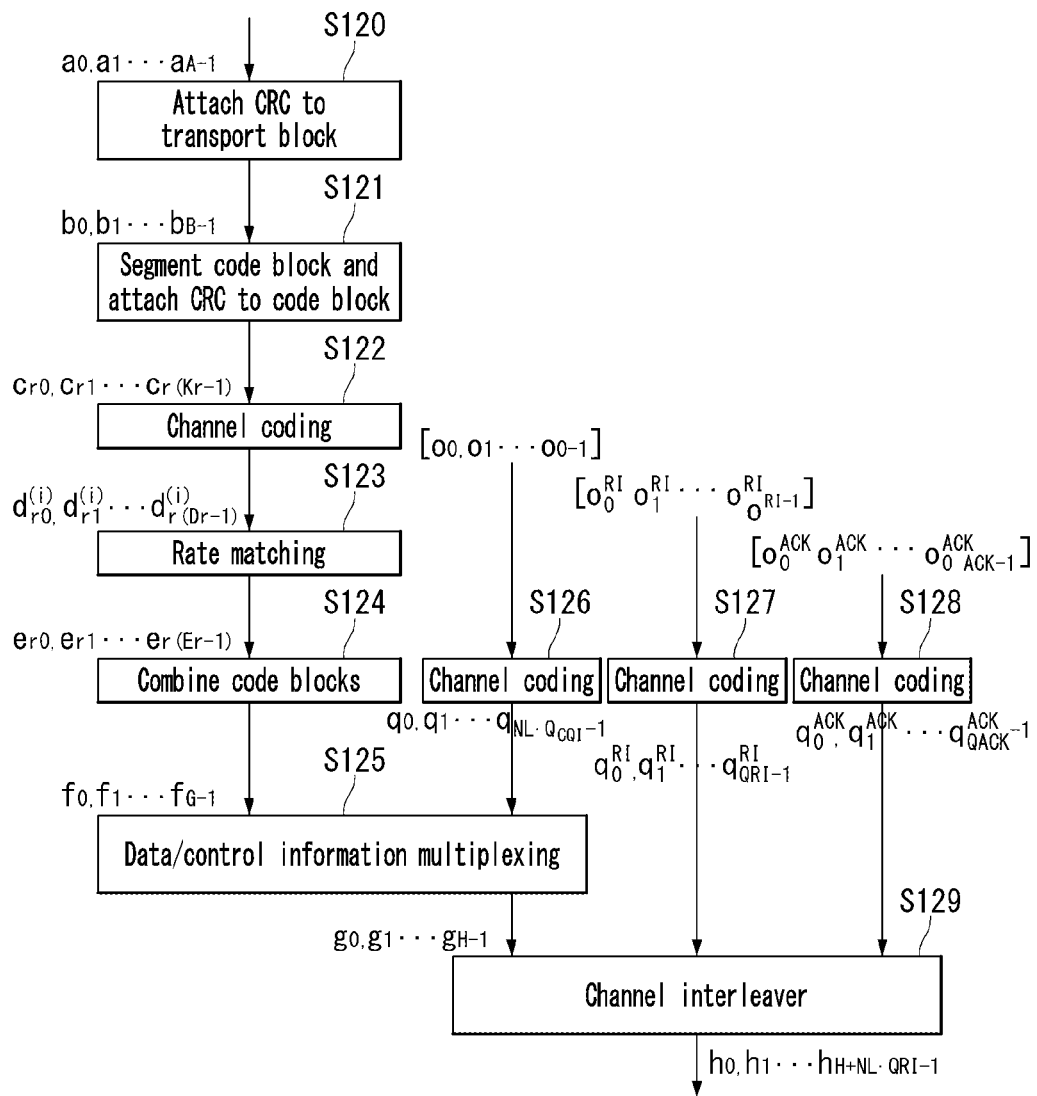

[FIG. 13]
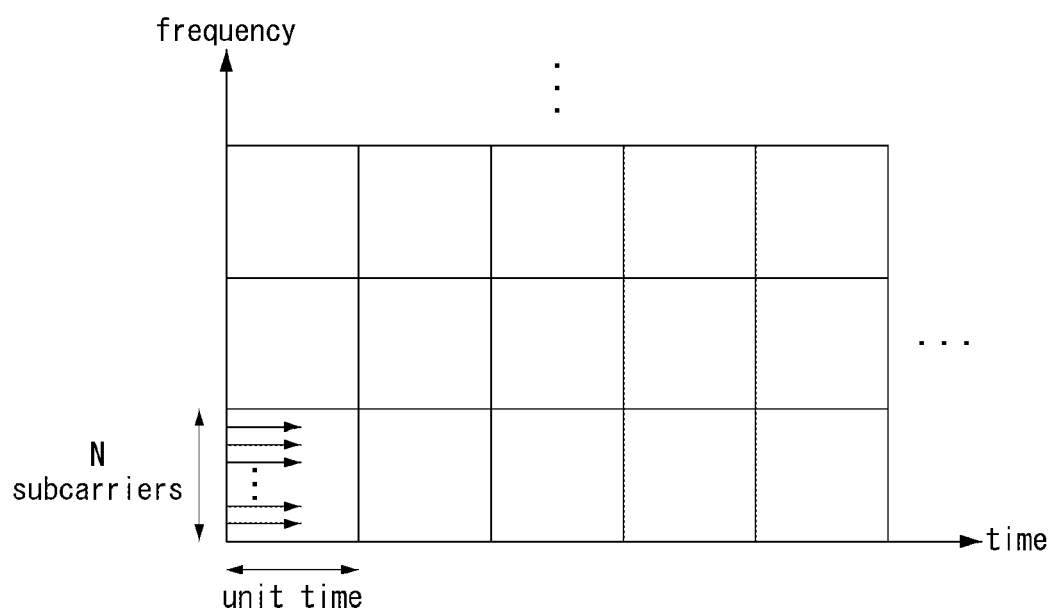

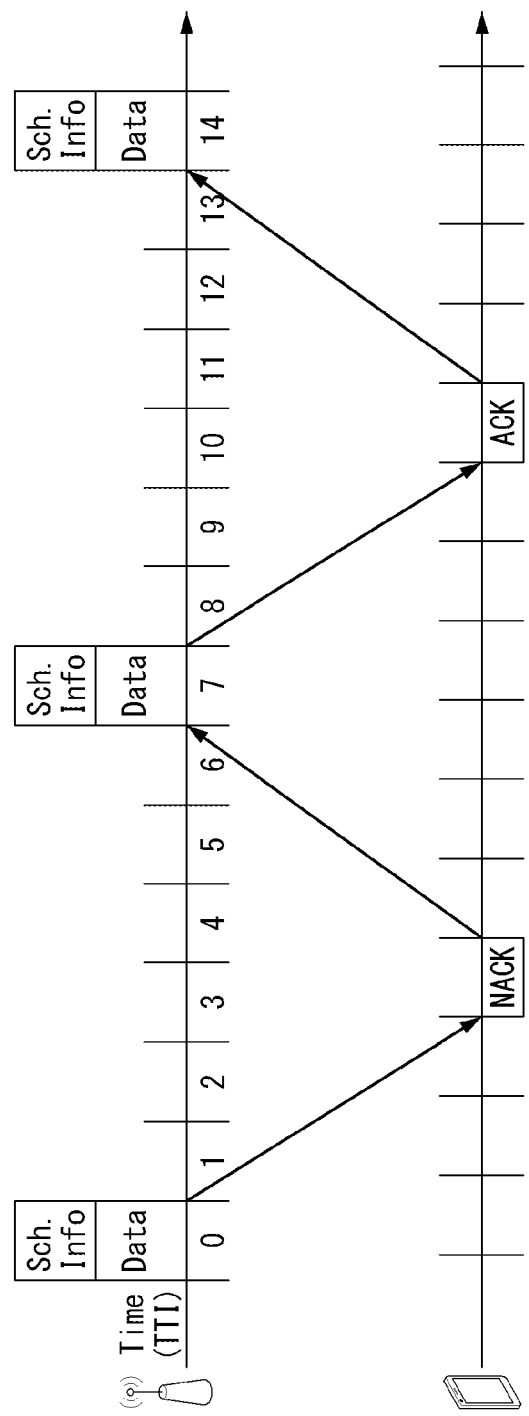
[FIG. 14]

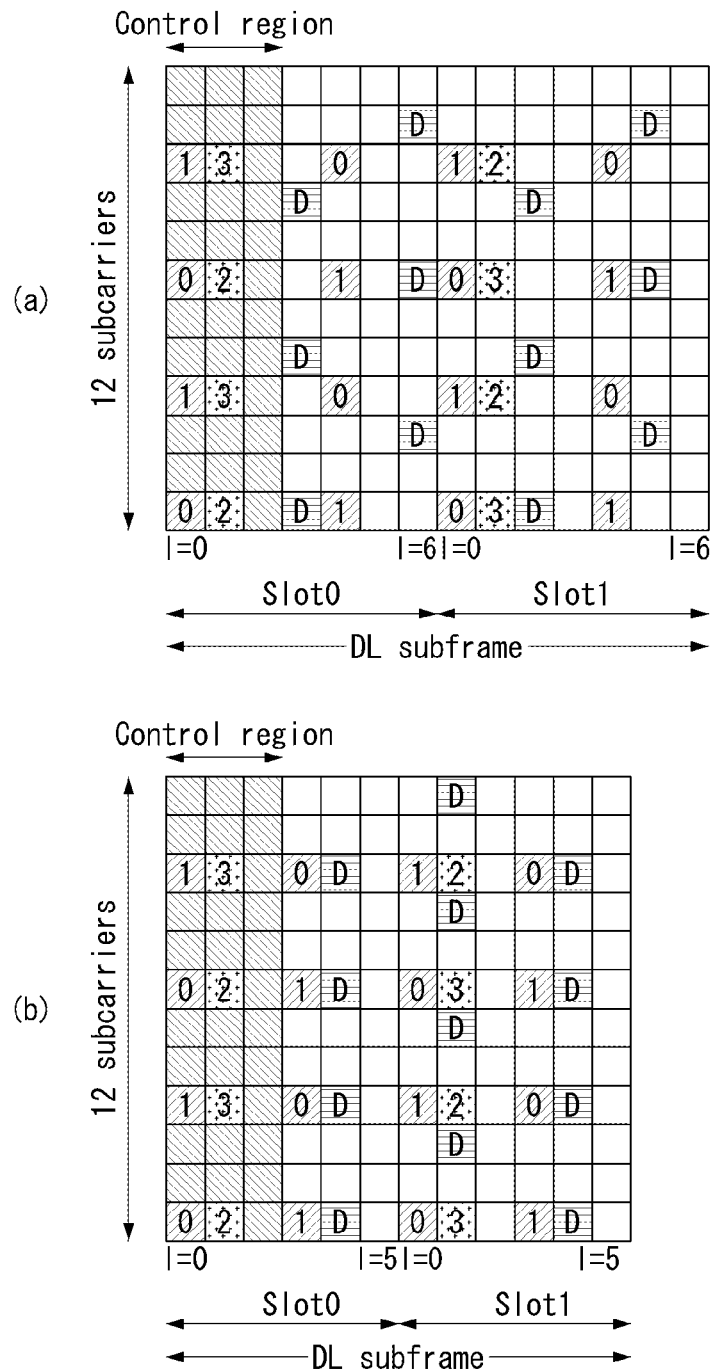
[FIG. 15]

[FIG. 16]
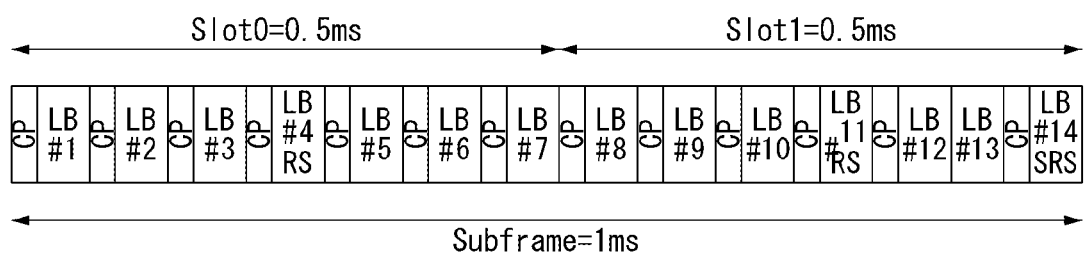
[FIG. 17]
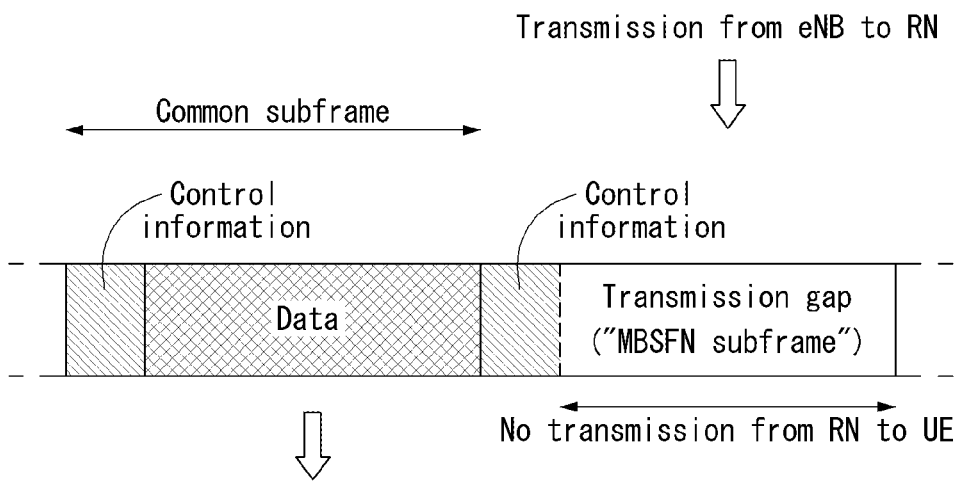

[FIG. 18]
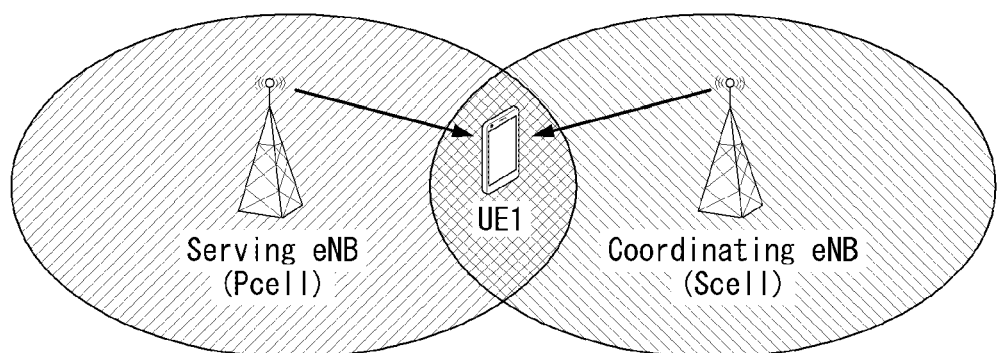
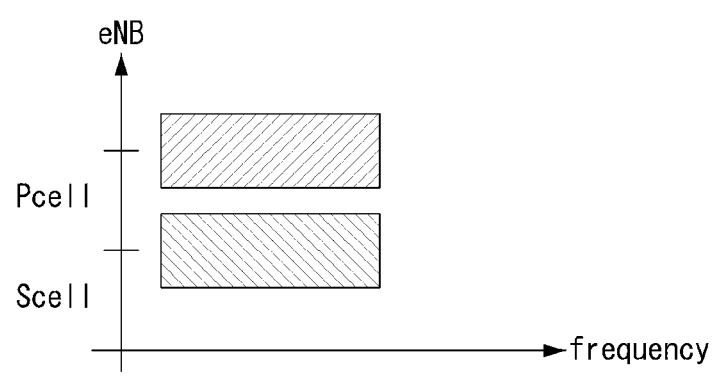

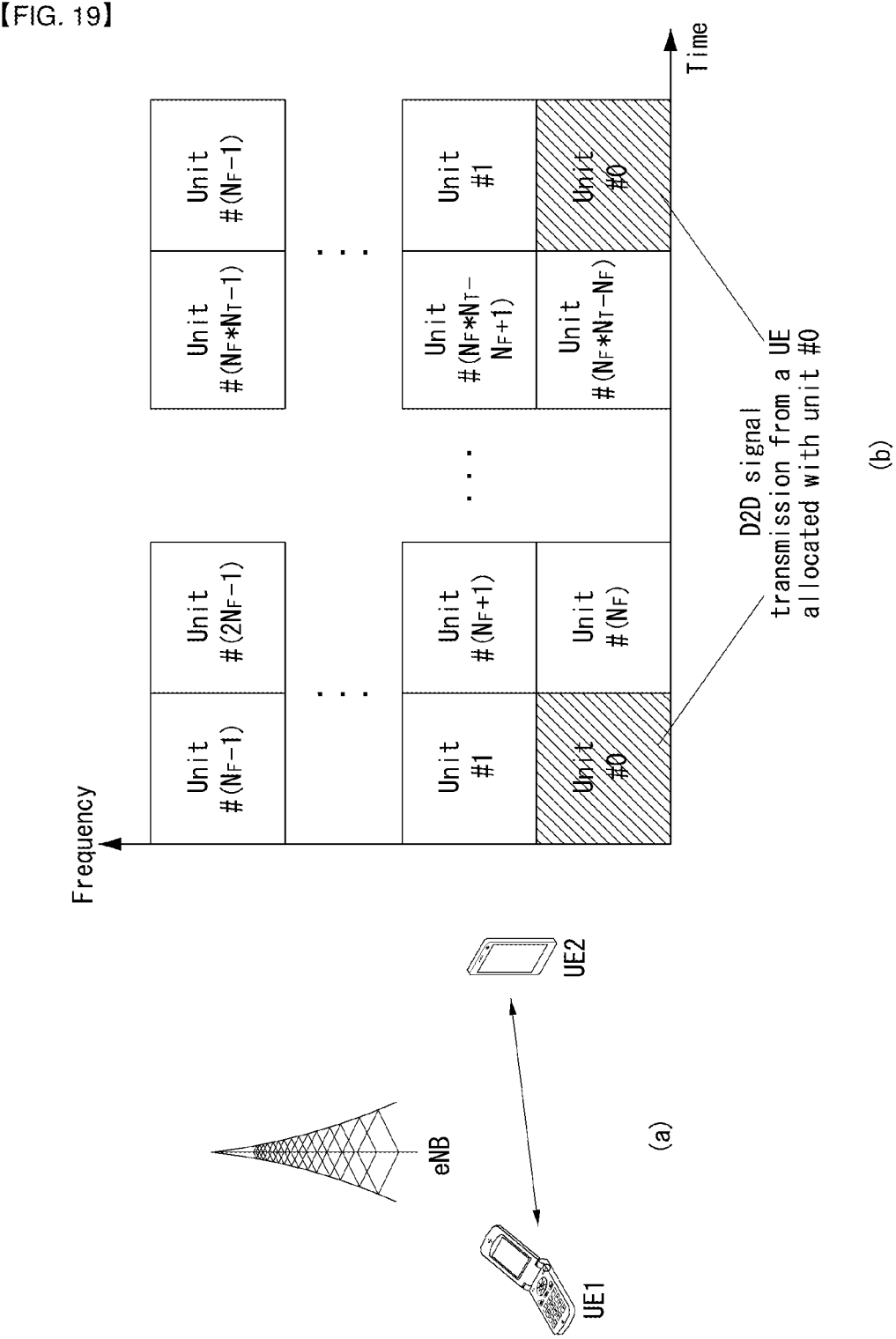
[FIG. 19]

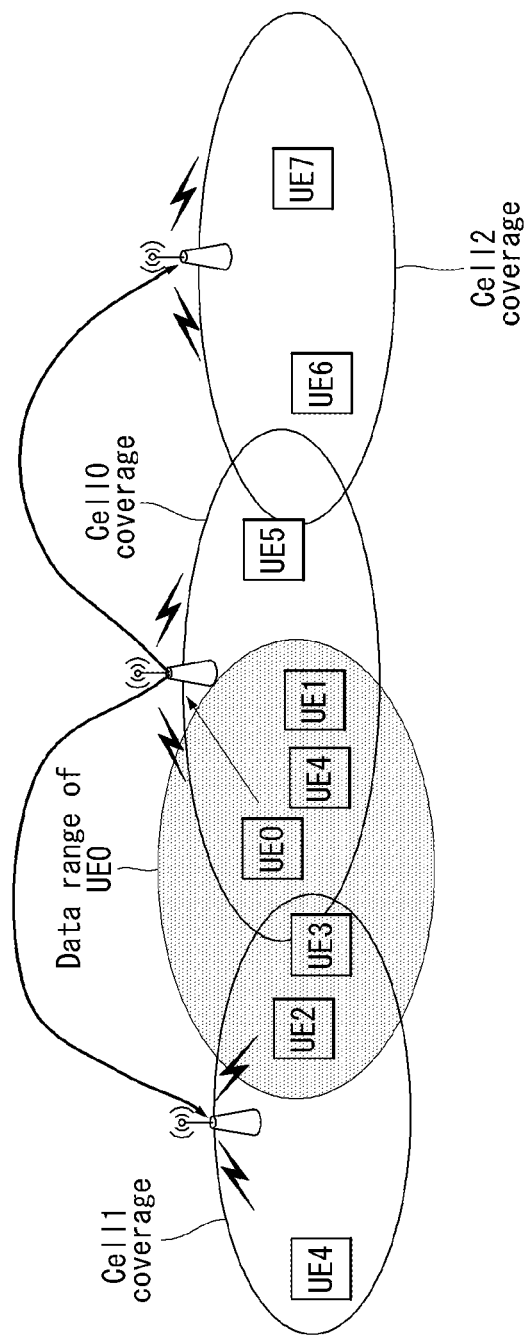
[FIG. 20]

[FIG. 21]
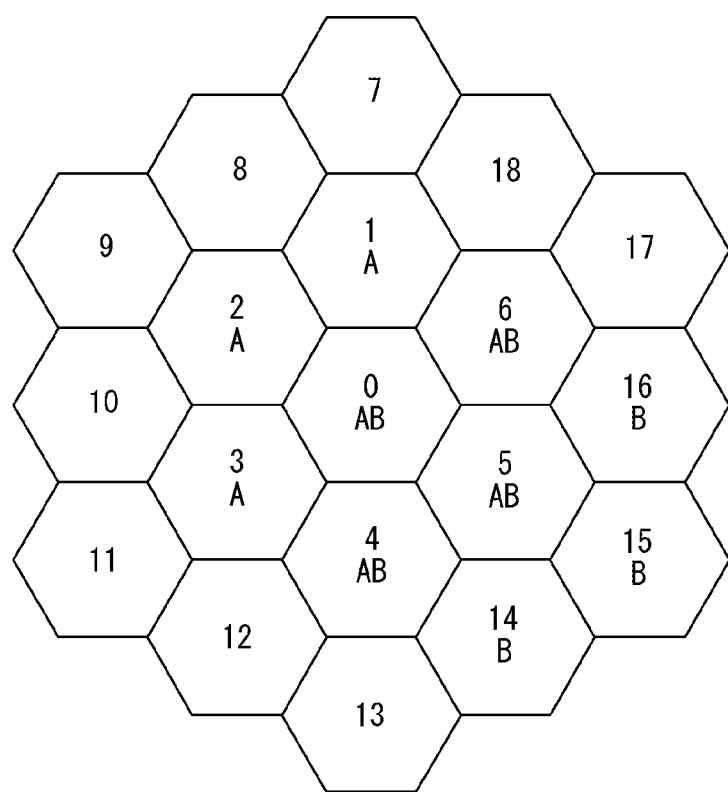

[FIG. 22]
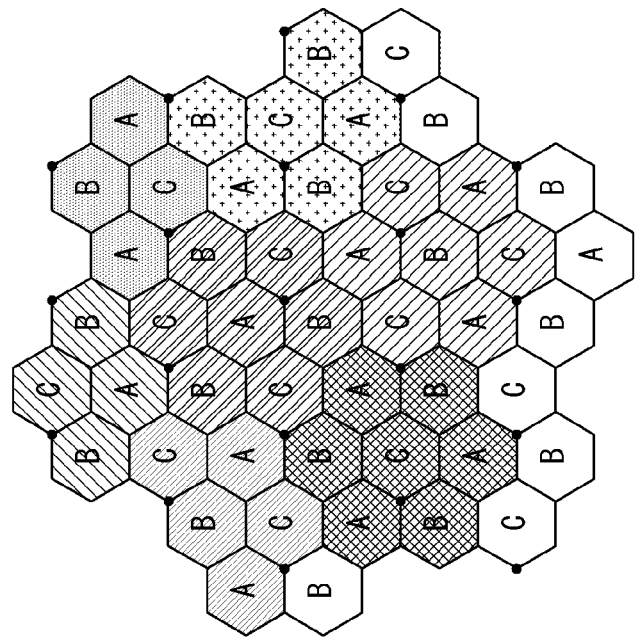
Transmission in the 2nd subframe
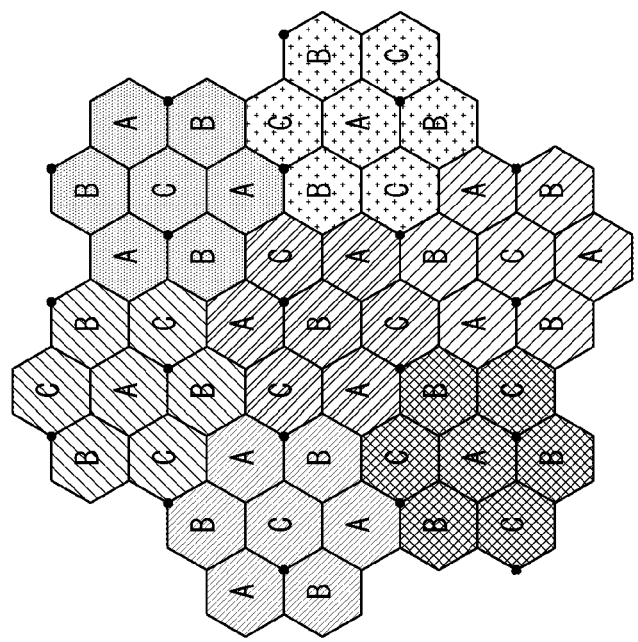
Transmission in the 1st subframe 【FIG. 23】
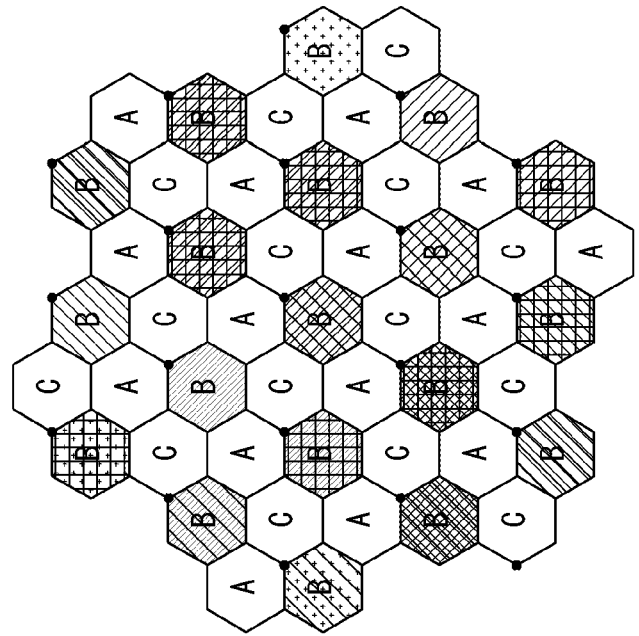
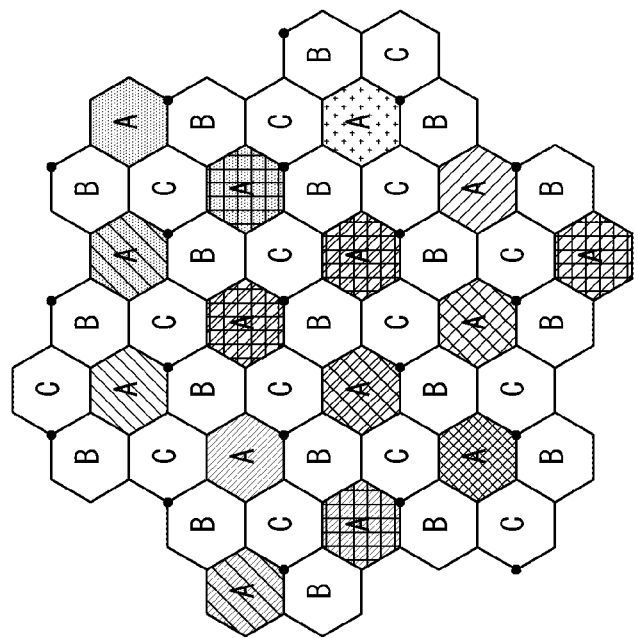

[FIG. 24]
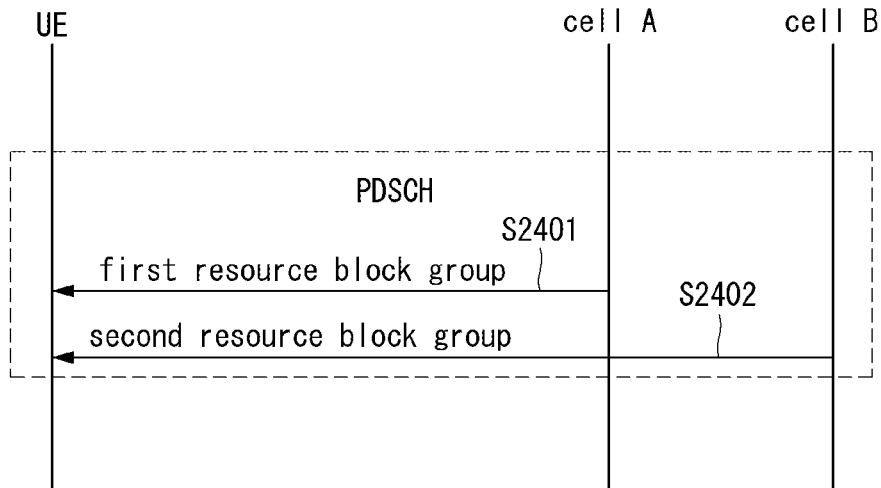
[FIG. 25]
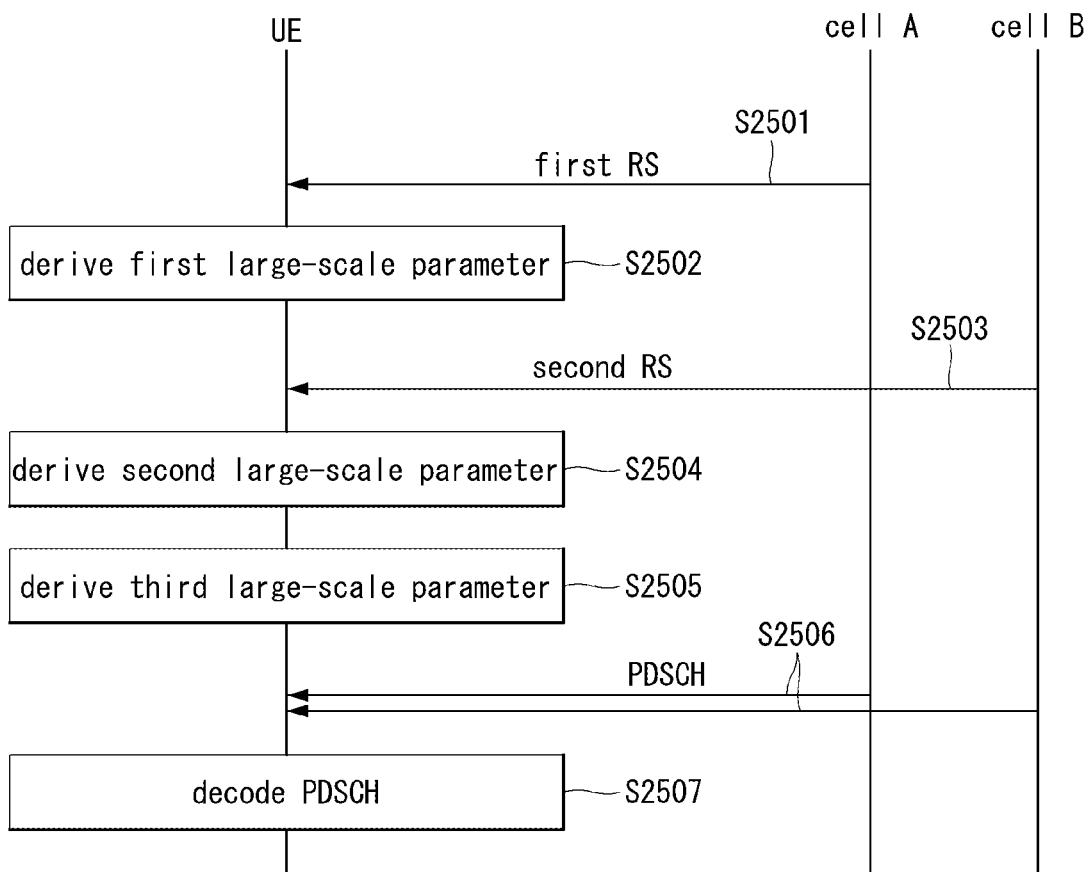

[FIG. 26]
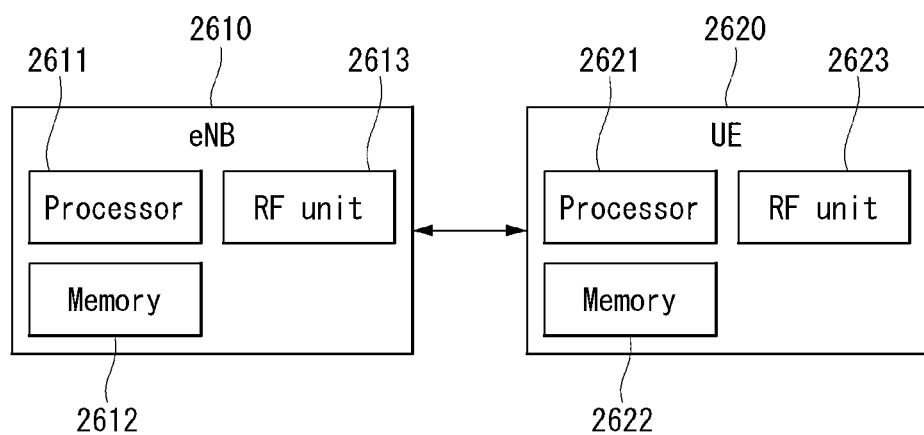

METHOD FOR TRANSMITTING AND RECEIVING DOWNLINK DATA IN WIRELESS COMMUNICATION SYSTEM, AND APPARATUS THEREFOR

CROSS-REFERENCE TO RELATED APPLICATIONS

This application is the National Stage filing under 35 U.S.C. 371 of International Application No. PCT/KR2016/012665, filed on Nov. 4, 2016, which claims the benefit of U.S. Provisional Application No. 62/251,081, filed on Nov. 4, 2015, No. 62/291,484, filed on Feb. 4, 2016, No. 62/335,655, filed on May 12, 2016, the contents of which are all hereby incorporated by reference herein in their entirety.

TECHNICAL FIELD

The present invention relates to a wireless communication system, and more particularly, to a method for transmitting and receiving downlink data in a multicast and/or broadcast manner in a wireless communication system and an apparatus supporting the same.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

An aspect of the present invention provides a method for performing multicast and/or broadcast transmission by a plurality of cells in a wireless communication system.

In particular, an aspect of the present invention proposes a frequency-selective quasi-co-location (QCL) scheme, a single frequency network (SFN) transmission scheme, and the like.

The technical problems solved by the present invention are not limited to the above technical problems and those skilled in the art may understand other technical problems from the following description.

Technical Solution

According to an aspect of the present invention, there is provided a method for receiving downlink data from multiple cells in a wireless communication system, including: receiving downlink data on a physical downlink shared channel (PDSCH), wherein the PDSCH includes a first resource block group and a second resource block group, downlink data transmitted from a first cell is mapped to the first resource block group and downlink data transmitted from a second cell is mapped to the second resource block group, and a quasi-co-location (QCL) assumption is independently applied to decode the first resource block group and the second resource block group.

Preferably, it may be assumed that an antenna port associated with the first resource block group and an antenna port corresponding to first channel state information-reference signal (CSI-RS) resource are QCL-ed, and it may be assumed that an antenna port associated with the second resource block group and an antenna port corresponding to a second CSI-RS resource are QCL-ed.

Preferably, it may be assumed that an antenna port associated with the first resource block group and a first cell-specific reference signal (CRS) antenna port generated based on a first physical cell identity (PCI) are QCL-ed and it may be assumed that an antenna port associated with the second resource block group and a second CRS antenna port generated based on a second PCI.

Preferably, the method may further include: receiving a non-zero power (NZP) CSI-RS resource index to which the QCL assumption is applied and/or a PCI for a CRS to which the QCL assumption is applied for each of the first resource block group and the second resource block group.

Preferably, the method may further include: receiving indexes of one or more resource blocks constituting the first resource block group and indexes of one or more resource blocks constituting the second resource block group.

Preferably, when the PDSCH is transmitted, a coding rate may be limited to below a predetermined upper limit value.

According to an aspect of the present invention, there is provided a method for receiving downlink data from multiple cells in a wireless communication system, including: deriving a first large-scale parameter using a first reference signal (RS) received from a first cell; deriving a second large-scale parameter using a second RS received from a second cell; deriving a third large-scale parameter based on the first large-scale parameter and the second large-scale parameter; and decoding a physical downlink shared channel (PDSCH) which is single frequency network (SFN)-transmitted in the first cell and the second cell using the derived third large-scale parameter.

Preferably, the third large-scale parameter may be derived by weighted-averaging the first large-scale parameter and the second large-scale parameter.

Preferably, the third large-scale parameter may be derived by any one of the first large-scale parameter and the second large-scale parameter.

Preferably, the third large-scale parameter may be derived as a large-scale parameter for a cell having a larger reference signal received power (RSRP) or a reference signal received quality (RSRQ), among the first cell and the second cell.

Preferably, the first RS and the second RS may be transmitted to different antenna ports, and after channels are estimated by the first RS and the second RS, respectively, the respective channel estimated values may be superpositioned to calculate a third channel estimated value, and the PDSCH may be demodulated based on the third channel estimated value.

Preferably, a sequence of the first RS and a sequence of the second RS may be generated based on the same seed value, and mutually orthogonal sequences may be applied to the first RS and the second RS.

Preferably, the PDSCH may be transmitted to rank 2, the first cell and the second cell may each transmit a layer, and a single codeword may be transmitted across the layer of the first cell and the layer of the second cell.

Advantageous Effects

According to an embodiment of the present invention, a plurality of cells may reduce complexity of multicast and/or broadcast transmission.

According to an embodiment of the present invention, a plurality of cells may increase efficiency of multicast and/or broadcast transmission.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention FIG. 1 shows the structure of a radio frame in a wireless communication system to which an embodiment of the present invention may be applied FIG. 2 is a diagram illustrating a resource grid for one downlink slot in a wireless communication system to which an embodiment of the present invention may be applied FIG. 3 shows the structure of a downlink subframe in a wireless communication system to which an embodiment of the present invention may be applied FIG. 4 shows the structure of an uplink subframe in a wireless communication system to which an embodiment of the present invention may be applied FIG. 5 shows an example of a form in which PUCCH formats are mapped to the PUCCH region of the uplink physical resource block in a wireless communication system to which an embodiment of the present invention may be applied FIG. 6 shows the structure of a CQI channel in the case of a normal CP in a wireless communication system to which an embodiment of the present invention may be applied FIG. 7 shows the structure of an ACK/NACK channel in the case of a normal CP in a wireless communication system to which an embodiment of the present invention may be applied FIG. 8 shows an example in which five SC-FDMA symbols are generated and transmitted during one slot in a wireless communication system to which an embodiment of the present invention may be applied FIG. 9 shows an example of component carriers and a carrier aggregation in a wireless communication system to which an embodiment of the present invention may be applied FIG. 10 shows an example of the structure of a subframe according to cross-carrier scheduling in a wireless communication system to which an embodiment of the present invention may be applied FIG. 11 shows an example of transport channel processing for an UL-SCH in a wireless communication system to which an embodiment of the present invention may be applied FIG. 12 shows an example of a signal processing process in an uplink shared channel, that is, a transport channel, in a wireless communication system to which an embodiment of the present invention may be applied.

FIG. 13 is a diagram illustrating a time-frequency resource block in a time-frequency domain of a wireless communication system to which the present invention may be applied.

FIG. 14 is a diagram illustrating an asynchronous HARQ-based resource allocation and retransmission process in a wireless communication system to which the present invention may be applied.

FIG. 15 illustrates a reference signal pattern mapped to a downlink resource block pair in a wireless communication system to which the present invention may be applied.

FIG. 16 illustrates an uplink subframe including a sounding reference signal symbol in a wireless communication system to which the present invention may be applied.

FIG. 17 illustrates relay node resource partitioning in a wireless communication system to which the present invention may be applied.

FIG. 18 is a diagram illustrating a carrier aggregation-based CoMP system in a wireless communication system to which the present invention may be applied.

FIG. 19 is a diagram for explaining elements of device-to-device (D2D) communication technique.

FIG. 20 is a diagram illustrating a multicast/broadcast transmission method according to an embodiment of the present invention FIG. 21 is a view for explaining a cluster according to an embodiment of the present invention.

FIGS. 22 and 23 illustrate broadcast transmission within a hexagonal cell layout according to an embodiment of the present invention.

FIG. 24 illustrates a method of transmitting and receiving downlink data according to an embodiment of the present invention.

FIG. 25 is a diagram illustrating a method of transmitting and receiving downlink data according to an embodiment of the present invention.

FIG. 26 is a block diagram of a wireless communication device according to an embodiment of the present invention.

BEST MODES

Some embodiments of the present invention are described in detail with reference to the accompanying drawings. A detailed description to be disclosed along with the accompanying drawings are intended to describe some exemplary embodiments of the present invention and are not intended to describe a sole embodiment of the present invention. The following detailed description includes more details in order to provide full understanding of the present invention. However, those skilled in the art will understand that the present invention may be implemented without such more details.

In some cases, in order to avoid that the concept of the present invention becomes vague, known structures and devices are omitted or may be illustrated in a block diagram form based on the core functions of each structure and device.

In this specification, a base station has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a Base Transceiver System (BTS), or an access point (AP). Furthermore, the device may be fixed or may have mobility and may be substituted with another term, such as User Equipment (UE), a Mobile Station (MS), a User Terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, or a Device-to-Device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present invention, and the use of such specific terms may be changed in various forms without departing from the technical sprit of the present invention.

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and Non-Orthogonal Multiple Access (NOMA). CDMA may be implemented using a radio technology, such as Universal Terrestrial Radio Access (UTRA) or CDMA2000. TDMA may be implemented using a radio technology, such as Global System for Mobile communications (GSM)/General Packet Radio Service (GPRS)/Enhanced Data rates for GSM Evolution (EDGE). OFDMA may be implemented using a radio technology, such as Institute of Electrical and Electronics Engineers (IEEE) 802.11 (Wi-Fi), IEEE 802.16 (WiMAX), IEEE 802.20, or Evolved UTRA (E-UTRA). UTRA is part of a Universal Mobile Telecommunications System (UMTS). 3rd Generation Partnership Project (3GPP) Long Term Evolution (LTE) is part of an Evolved UMTS (E-UMTS) using evolved UMTS Terrestrial Radio Access (E-UTRA), and it adopts OFDMA in downlink and adopts SC-FDMA in uplink. LTE-Advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A is chiefly described, but the technical characteristics of the present invention are not limited thereto.

General System

FIG. 1 shows the structure of a radio frame in a wireless communication system to which an embodiment of the present invention may be applied.

3GPP LTE/LTE-A support a radio frame structure type 1 which may be applicable to Frequency Division Duplex (FDD) and a radio frame structure which may be applicable to Time Division Duplex (TDD).

FIG. 1(a) illustrates the radio frame structure type 1. A radio frame consists of 10 subframes. One subframe consists of 2 slots in a time domain. The time taken to send one subframe is called a Transmission Time Interval (TTI). For example, one subframe may have a length of 1 ms, and one slot may have a length of 0.5 ms.

One slot includes a plurality of Orthogonal Frequency Division Multiplexing (OFDM) symbols in the time domain and includes a plurality of Resource Blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of contiguous subcarriers in one slot.

FIG. 1(b) illustrates the frame structure type 2. The radio frame structure type 2 consists of 2 half frames. Each of the half frames consists of 5 subframes, a Downlink Pilot Time Slot (DwPTS), a Guard Period (GP), and an Uplink Pilot Time Slot (UpPTS). One subframe consists of 2 slots. The DwPTS is used for initial cell search, synchronization, or channel estimation in UE. The UpPTS is used for channel estimation in an eNB and to perform uplink transmission synchronization with UE. The guard period is an interval in which interference generated in uplink due to the multi-path delay of a downlink signal between uplink and downlink is removed.

In the frame structure type 2 of a TDD system, an uplink-downlink configuration is a rule indicating whether uplink and downlink are allocated (or reserved) to all subframes. Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

Referring to Table 1, in each subframe of the radio frame, "D" is indicative of a subframe for downlink transmission, "U" is indicative of a subframe for uplink transmission, and "S" is indicative of a special subframe including three types of a DwPTS, GP, and UpPTS. An uplink-downlink configuration may be classified into 7 types. The positions and/or number of downlink subframes, special subframes, and uplink subframe are different in each configuration.

A point of time at which a change is performed from downlink to uplink or a point of time at which a change is performed from uplink to downlink is called a switching point. The periodicity of the switching point means a cycle in which an uplink subframe and a downlink subframe are changed is identically repeated. Both 5 ms and 10 ms are supported in the periodicity of a switching point. If the periodicity of a switching point has a cycle of a 5 ms downlink-uplink switching point, the special subframe S is present in each half frame. If the periodicity of a switching point has a cycle of a 5 ms downlink-uplink switching point, the special subframe S is present in the first half frame only.

In all the configurations, 0 and 5 subframes and a DwPTS are used for only downlink transmission. An UpPTS and a subframe subsequent to a subframe are always used for uplink transmission.

Such uplink-downlink configurations may be known to both an eNB and UE as system information. An eNB may notify UE of a change of the uplink-downlink allocation state of a radio frame by transmitting only the index of uplink-downlink configuration information to the UE whenever the uplink-downlink configuration information is changed. Furthermore, configuration information is kind of downlink control information and may be transmitted through a Physical Downlink Control Channel (PDCCH) like other scheduling information. Configuration information may be transmitted to all UEs within a cell through a broadcast channel as broadcasting information.

Table 2 illustrates the configuration of the special subframe (DwPTS/GP/UpPTS length).

TABLE 2

| Special subframe configuration | Normal cyclic prefix in downlink | | | Extended cyclic prefix in downlink | | |
| --- | --- | --- | --- | --- | --- | --- |
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

The structure of a radio frame is only one example. The number of subcarriers included in a radio frame or the number of slots included in a subframe and the number of OFDM symbols included in a slot may be changed in various ways.

FIG. 2 is a diagram illustrating a resource grid for one downlink slot in a wireless communication system to which an embodiment of the present invention may be applied.

Referring to FIG. 2, one downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block (RB) includes 12×7 resource elements. The number of RBs N^DL included in a downlink slot depends on a downlink transmission bandwidth.

The structure of an uplink slot may be the same as that of a downlink slot.

FIG. 3 shows the structure of a downlink subframe in a wireless communication system to which an embodiment of the present invention may be applied.

Referring to FIG. 3, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific UE group.

A PDCCH may carry information about the resource allocation and transport format of a downlink shared channel (DL-SCH) (this is also called an "downlink grant"), resource allocation information about an uplink shared channel (UL-SCH) (this is also called a "uplink grant"), paging information on a PCH, system information on a DL-SCH, the resource allocation of a higher layer control message, such as a random access response transmitted on a PDSCH, a set of transmission power control commands for individual UE within specific UE group, and the activation of a Voice over Internet Protocol (VoIP), etc. A plurality of PDCCHs may be transmitted within the control region, and UE may monitor a plurality of PDCCHs. A PDCCH is transmitted on a single Control Channel Element (CCE) or an aggregation of some contiguous CCEs. A CCE is a logical allocation unit that is used to provide a PDCCH with a coding rate according to the state of a radio channel. A CCE corresponds to a plurality of resource element groups. The format of a PDCCH and the number of available bits of a PDCCH are determined by an association relationship between the number of CCEs and a coding rate provided by CCEs.

An eNB determines the format of a PDCCH based on DCI to be transmitted to UE and attaches a Cyclic Redundancy Check (CRC) to control information. A unique identifier (a Radio Network Temporary Identifier (RNTI)) is masked to the CRC depending on the owner or use of a PDCCH. If the PDCCH is a PDCCH for specific UE, an identifier unique to the UE, for example, a Cell-RNTI (C-RNTI) may be masked to the CRC. If the PDCCH is a PDCCH for a paging message, a paging indication identifier, for example, a Paging-RNTI (P-RNTI) may be masked to the CRC. If the PDCCH is a PDCCH for system information, more specifically, a System Information Block (SIB), a system information identifier, for example, a System Information-RNTI (SI-RNTI) may be masked to the CRC. A Random Access-RNTI (RA-RNTI) may be masked to the CRC in order to indicate a random access response which is a response to the transmission of a random access preamble by UE.

FIG. 4 shows the structure of an uplink subframe in a wireless communication system to which an embodiment of the present invention may be applied.

Referring to FIG. 4, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A resource block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

Physical Uplink Control Channel (PUCCH

The Uplink Control Information (UCI) transmitted through a PUCCH may include Scheduling Request (SR), HARQ ACK/NACK information, and downlink channel measurement information as shown below.

SR (Scheduling Request): used for requesting uplink UL-SCH resources. SR is transmitted by On-Off Keying (OOK) scheme.

HARQ ACK/NACK: a signal responding to a downlink data packet on a PDSCH. This signal indicates whether a downlink data packet has successfully received or not. ACK/NACK 1 bit is transmitted in response to a single downlink codeword while ACK/NACK 2 bits are transmitted in response to two downlink codewords.

CSI (Channel State Information): feedback information about a downlink channel. CSI may include at least one of a Channel Quality Indicator (CQI), a Rank Indicator (RI), a Precoding Matrix Indicator (PMI), and a Precoding Type Indicator (PTI). For each subframe, 20 bits are used to represent the CSI.

HARQ ACK/NACK information may be generated depending on whether a downlink data packet on a PDSCH has been successfully decoded. In an existing wireless communication system, 1 bit is transmitted as ACK/NACK information with respect to the transmission of downlink single codeword, and 2 bits are transmission as ACK/NACK information with respect to the transmission of downlink 2 codewords.

Channel measurement information denotes feedback information related to a Multiple Input Multiple Output (MIMO) scheme and may include a Channel Quality Indicator (CQI), a Precoding Matrix Index (PMI), and a Rank Indicator (RI). Such channel measurement information may be commonly called a CQI.

In order to transmit a CQI, 20 bits may be used in each subframe.

A PUCCH may be modulated using a Binary Phase Shift Keying (BPSK) scheme and a Quadrature Phase Shift Keying (QPSK) scheme. Control information for a plurality of UEs may be transmitted through a PUCCH. If Code Division Multiplexing (CDM) is performed in order to distinguish the signals of UEs from each other, a Constant Amplitude Zero Autocorrelation (CAZAC) sequence of a length 12 is mostly used. The CAZAC sequence has a characteristic in that a constant size (amplitude) is maintained in a time domain and a frequency domain. Accordingly, the CAZAC sequence has a property suitable for increasing coverage by lowering the Peak-to-Average Power Ratio (PAPR) or Cubic Metric (CM) of UE. Furthermore, ACK/NACK information about downlink data transmission transmitted through a PUCCH is covered using an orthogonal sequence or an Orthogonal Cover (OC).

Furthermore, control information transmitted through a PUCCH may be distinguished from each other using a cyclically shifted sequence having a different Cyclic Shift (CS) value. The cyclically shifted sequence may be generated by cyclically shifting a base sequence by a specific CS amount. The specific CS amount is indicated by a CS index. The number of available CSs may be different depending on delay spread of a channel. A variety of types of sequences may be used as the base sequence, and the CAZAC sequence is an example of the sequences.

Furthermore, the amount of control information that may be transmitted by UE in one subframe may be determined depending on the number of SC-FDMA symbols which may be used to send the control information (i.e., SC-FDMA symbols other than SC-FDMA symbols which are used to send a Reference Signal (RS) for the coherent detection of a PUCCH).

In a 3GPP LTE system, a PUCCH is defined as a total of 7 different formats depending on control information that is transmitted, a modulation scheme, and the amount of control information. The attributes of Uplink Control Information (UCI) transmitted according to each PUCCH format may be summarized as in Table 3 below.

TABLE 3

| PUCCH Format | Uplink Control Information(UCI) |
| --- | --- |
| Format 1 | Scheduling Request(SR)(unmodulated waveform) |
| Format 1a | 1-bit HARQ ACK/NACK with/without SR |
| Format 1b | 2-bit HARQ ACK/NACK with/without SR |
| Format 2 | CQI (20 coded bits) |
| Format 2 | CQI and 1- or 2-bit HARQ ACK/NACK (20 bits) for extended CP only |
| Format 2a | CQI and 1-bit HARQ ACK/NACK (20 + 1 coded bits) |
| Format 2b | CQI and 2-bit HARQ ACK/NACK (20 + 2 coded bits) |
| Format 3 | HARQ ACK/NACK, SR, CSI (48 coded bits) |

The PUCCH format 1 is used for SR-only transmission. In the case of SR-only transmission, a not-modulated waveform is applied. This is described in detail later.

The PUCCH format 1a or 1b is used to send HARQ ACK/NACK. If HARQ ACK/NACK is solely transmitted in a specific subframe, the PUCCH format 1a or 1b may be used. Alternatively, HARQ ACK/NACK and an SR may be transmitted in the same subframe using the PUCCH format 1a or 1b.

PUCCCH format 2 is used for transmission of CQI, and PUCCH format 2a or 2b is used for transmission of CQI and HARQ ACK/NACK. In the case of extended CP, PUCCH format 2 may be used for transmission of CQI and HARQ ACK/NACK.

PUCCH format 3 is used for carrying an encoded UCI of 48 bits. PUCCH format 3 may carry HARQ ACK/NACK about a plurality of serving cells, SR (if exists), and a CSI report about one serving cell.

FIG. 5 shows an example of a form in which the PUCCH formats are mapped to the PUCCH region of the uplink physical resource block in a wireless communication system to which an embodiment of the present invention may be applied.

In FIG. 5, N_RB^UL is indicative of the number of RBs in uplink, and 0, 1, ..., N_RB^UL−1 means the number of physical RBs. Basically, a PUCCH is mapped to both edges of an uplink frequency block. As illustrated in FIG. 5, the PUCCH format 2/2a/2b is mapped to a PUCCH region indicated by m=0, 1. This may represent that the PUCCH format 2/2a/2b is mapped to RBs located at a band edge. Furthermore, the PUCCH format 2/2a/2b and the PUCCH format 1/1a/1b may be mixed and mapped to a PUCCH region indicated by m=2. Furthermore, the PUCCH format 1/1a/1b may be mapped to a PUCCH region indicated by m=3, 4, 5. UEs within a cell may be notified of the number (N_RB^(2)) of PUCCH RBs which may be used by the PUCCH format 2/2a/2b through broadcasting signaling.

The PUCCH format 2/2a/2b is described below. The PUCCH format 2/2a/2b is a control channel for transmitting channel measurement feedback (i.e., a CQI, a PMI, and an RI).

The report cycle of channel measurement feedback (hereinafter commonly called "CQI information") and a frequency unit (or frequency resolution) to be measured may be controlled by an eNB. In a time domain, a periodic or aperiodic CQI report may be supported. The PUCCH format 2 may be used for a periodic report, and a PUSCH may be used for an aperiodic report. In the case of an aperiodic report, an eNB may instruct UE to carry an individual CQI report on a resource scheduled to transmit uplink data.

FIG. 6 shows the structure of a CQI channel in the case of a normal CP in a wireless communication system to which an embodiment of the present invention may be applied.

The SC-FDMA symbols 1 and 5 (i.e., the second and the sixth symbols) of the SC-FDMA symbols 0 to 6 of one slot are used to transmit a demodulation reference signal (DMRS), and the remaining SC-FDMA symbols of the SC-FDMA symbols 0 to 6 of the slot may be used to CQI information. Meanwhile, in the case of an extended CP, one SC-FDMA symbol (SC-FDMA symbol 3) is used for DMRS transmission.

In the PUCCH format 2/2a/2b, modulation by a CAZAC sequence is supported, and a QPSK-modulated symbol is multiplied by a CAZAC sequence of a length 12. A Cyclic Shift (CS) of the sequence is changed between a symbol and a slot. Orthogonal covering is used for a DMRS.

A reference signal (DMRS) is carried on 2 SC-FDMA symbols that belong to 7 SC-FDMA symbols included in one slot and that is spaced at 3 SC-FDMA symbols. CQI information is carried on the remaining 5 SC-FDMA symbols of the 7 SC-FDMA symbols. Two RSs are used in one slot in order to support high-speed UE. Furthermore, UEs are distinguished from each other using Cyclic Shift (CS) sequences. CQI information symbols are modulated into all SC-FDMA symbols and transferred. The SC-FDMA symbols consist of one sequence. That is, UE modulates a CQI using each sequence and sends the CQI.

The number of symbols which may be transmitted in one TTI is 10, and the modulation of CQI information is determined up to QPSK. If QPSK mapping is used for an SC-FDMA symbol, a CQI value of 10 bits may be carried on one slot because a CQI value of 2 bits may be carried on the SC-FDMA symbol. Accordingly, a CQI value having a maximum of 20 bits may be carried on one subframe. Frequency domain spread code is used to spread CQI information in a frequency domain.

A CAZAC sequence (e.g., ZC sequence) of a length 12 may be used as the frequency domain spread code. Control channels may be distinguished from each other by applying CAZAC sequences having different cyclic shift values. IFFT is performed on frequency domain-spread CQI information.

12 different UEs may be subjected to orthogonal multiplexing on the same PUCCH RB by 12 cyclic shifts having the same interval. In the case of a normal CP, a DMRS sequence on the SC-FDMA symbols 1 and 5 (on an SC-FDMA symbol 3 in the case of an extended CP) are similar to a CQI signal sequence on a frequency domain, but modulation, such as CQI information, is not applied to the DMRS sequence.

UE may be semi-statically configured by higher layer signaling so that it periodically reports different CQI, PMI and RI Types on PUCCH resources indicated by PUCCH resource indexes $n_{PUCCH}^{(1,\tilde{p})}$, $n_{PUCCH}^{(2,\tilde{p})}$, and $n_{PUCCH}^{(3,\tilde{p})}$. In this case, the PUCCH resource indexes $n_{PUCCH}^{(2,\tilde{p})}$ is information indicative of a PUCCH region that is used to transmit the PUCCH format 2/2a/2b and the value of a Cyclic Shift (CS) to be used.

Hereinafter, the PUCCH format 1a and 1b is described below

In the PUCCH format 1a/1b, a symbol modulated using a BPSK or QPSK modulation scheme is multiplied by a CAZAC sequence of a length 12. For example, the results of a modulation symbol d(0) by a CAZAC sequence r(n)(n=0, 1, 2, ..., N−1) of a length N become y(0), y(1), y(2), ..., y(N−1). The symbols y(0), ..., y(N−1) may be called a block of symbols. After the modulation symbol is multiplied by the CAZAC sequence, block-wise spread using an orthogonal sequence is applied.

A Hadamard sequence of a length 4 is used for common ACK/NACK information, and a Discrete Fourier Transform (DFT) sequence of a length 3 is used for shortened ACK/NACK information and a reference signal In the case of an extended CP, a Hadamard sequence of a length 2 is used in a reference signal.

FIG. 7 shows the structure of an ACK/NACK channel in the case of a normal CP in a wireless communication system to which an embodiment of the present invention may be applied.

FIG. 7 illustrates a PUCCH channel structure for transmitting HARQ ACK/NACK without a CQI.

A Reference Signal (RS) is carried on 3 contiguous SC-FDMA symbol that belong to 7 SC-FDMA symbols included in one slot and that are placed in a middle portion, and an ACK/NACK signal is carried on the remaining 4 SC-FDMA symbols of the 7 SC-FDMA symbols.

Meanwhile, in the case of an extended CP, an RS may be carried on 2 contiguous symbols placed in the middle of one slot. The number and positions of symbols used in an RS may be different depending on control channels, and the number and positions of symbols used in an ACK/NACK signal associated with the control channels may be changed depending on the number and positions of symbols used in the RS.

ACK information (not-scrambled state) of 1 bit and 2 bits may be represented as one HARQ ACK/NACK modulation symbol using respective BPSK and QPSK modulation schemes. Positive ACK (ACK) may be encoded as "1", and negative ACK (NACK) may be encoded as "0".

When a control signal is to be transmitted within an allocated bandwidth, two-dimensional spreading is applied in order to increase multiplexing capacity. That is, in order to increase the number of UEs or the number of control channels that may be multiplexed, frequency domain spreading and time domain spreading are used at the same time.

In order to spread an ACK/NACK signal in a frequency domain, a frequency domain sequence is used as a base sequence. A Zadoff-Chu (ZC) sequence which is one of CAZAC sequences, may be used as the frequency domain sequence. For example, by applying a different Cyclic Shift (CS) to a ZC sequence which is a base sequence, different UEs or different control channels may be multiplexed. The number of CS resources supported in a SC-FDMA symbol for PUCCH RBs for transmitting HARQ ACK/NACK is configured by a cell-specific higher layer signaling parameter ($\Delta\_shift^{PUCCH}$)

An ACK/NACK signal spread in a frequency domain is spread in a time domain using orthogonal spreading code. A Walsh-Hadamard sequence or DFT sequence may be used as the orthogonal spreading code. For example, an ACK/NACK signal may be spread for 4 symbols using an orthogonal sequence w0, w1, w2, or w3 of a length 4. Furthermore, an RS is also spread using an orthogonal sequence of a length 3 or length 2. This is called Orthogonal Covering (OC).

A plurality of UEs may be multiplexed using a Code Division Multiplexing (CDM) method using CS resources in a frequency domain and OC resources in a time domain, such as those described above. That is, ACK/NACK information and RSs of a large number of UEs may be multiplexed on the same PUCCH RB.

The number of spreading code supported for ACK/NACK information is restricted by the number of RS symbols with respect to such time domain spreading CDM. That is, the multiplexing capacity of an RS is smaller than the multiplexing capacity of ACK/NACK information because the number of SC-FDMA symbols for RS transmission is smaller than the number of SC-FDMA symbols for ACK/NACK information transmission.

For example, in the case of a normal CP, ACK/NACK information may be transmitted in 4 symbols. 3 pieces of orthogonal spreading code not 4 are used for ACK/NACK information. The reason for this is that only 3 pieces of orthogonal spreading code may be used for an RS because the number of symbols for RS transmission is limited to 3.

In case that 3 symbols of one slot may be used for RS transmission and 4 symbols of the slot may be used for ACK/NACK information transmission in a subframe of a normal CP, for example, if 6 Cyclic Shifts (CSs) may be used in a frequency domain and 3 Orthogonal Cover (OC) resources may be used in a time domain, HARQ ACK from a total of 18 different UEs may be multiplexed within one PUCCH RB. In case that 2 symbols of one slot are used for RS transmission and 4 symbols of one slot are used for ACK/NACK information transmission in a subframe of an extended CP, for example, if 6 CSs may be used in a frequency domain and 2 OC resources may be used in a time domain, HARQ ACK from a total of 12 different UEs may be multiplexed within one PUCCH RB.

The PUCCH format 1 is described below. A Scheduling Request (SR) is transmitted in such a way as to make a request or does not make a request that UE is scheduled. An SR channel reuses an ACK/NACK channel structure in the PUCCH format 1a/1b and consists of an On-Off Keying (OKK) method based on an ACK/NACK channel design. An RS is not transmitted in the SR channel. Accordingly, a sequence of a length 7 is used in the case of a normal CP, and a sequence of a length 6 is used in the case of an extended CP. Different cyclic shifts or orthogonal covers may be allocated to an SR and ACK/NACK. That is, in order to send a positive SR, UE sends HARQ ACK/NACK through a resource allocated for the SR. In order to send a negative SR, UE sends HARQ ACK/NACK through a resource allocated for ACK/NACK.

ACK/NACK Multiplexing Method

In a situation in which UE has to simultaneously send a plurality of ACK/NACKs corresponding to a plurality of data units received from an eNB, an ACK/NACK multiplexing method based on the selection of a PUCCH resource may be taken into consideration in order to maintain the single frequency characteristic of an ACK/NACK signal and to reduce ACK/NACK transmission power.

The content of ACK/NACK responses for a plurality of data units, together with ACK/NACK multiplexing, is identified by a combination of a PUCCH resource used in actual ACK/NACK transmission and the resource of QPSK modulation symbols.

For example, if one PUCCH resource sends 4 bits and a maximum of 4 data units are transmitted, ACK/NACK results may be identified in an eNB as in Table 4 below.

TABLE 4

| HARQ-ACK(0), HARQ-ACK(1), HARQ-ACK(2), HARQ-ACK(3) | $n_{PUCCH}^{(1)}$ | b(0), b(1) |
| --- | --- | --- |
| ACK, ACK, ACK, ACK | $n_{PUCCH,1}^{(1)}$ | 1, 1 |
| ACK, ACK, ACK, NACK/DTX | $n_{PUCCH,1}^{(1)}$ | 1, 0 |
| NACK/DTX, NACK/DTX, NACK, DTX | $n_{PUCCH,2}^{(1)}$ | 1, 1 |
| ACK, ACK, NACK/DTX, ACK | $n_{PUCCH,1}^{(1)}$ | 1, 0 |
| NACK, DTX, DTX, DTX | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 0, 1 |
| NACK/DTX, NACK/DTX, NACK/DTX, NACK | $n_{PUCCH,3}^{(1)}$ | 1, 1 |
| ACK, NACK/DTX, ACK, NACK/DTX | $n_{PUCCH,2}^{(1)}$ | 0, 1 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,3}^{(1)}$ | 0, 1 |
| NACK/DTX, NACK, DTX, DTX | $n_{PUCCH,1}^{(1)}$ | 0, 0 |
| NACK/DTX, ACK, ACK, NACK/DTX | $n_{PUCCH,2}^{(1)}$ | 1, 0 |
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| DTX, DTX, DTX, DTX | N/A | N/A |

In Table 4, HARQ-ACK(i) indicates an ACK/NACK result regarding ith data unit. In Table 3, DTX (DTX (Discontinuous Transmission) refers to that there is no data unit to be transmitted for the corresponding HARQ-ACK(i) or the UE cannot detect a data unit corresponding to the HARQ-ACK(i).

According to Table 4, there are a maximum of four PUCCH resources, and b(0) and b(1) are two bits transmitted using a selected PUCCH.

For example, when the UE successfully receives four data units, the UE transmits 2-bit (1,1) using n_(PUCCH, 1)^(1).

When the UE is unsuccessful in decoding in first and third data units and successful in decoding in second and fourth data units, the UE transmits a bit (1,0) using_(PUCCH, 1)^(3).

In ACK/NACK channel selection, when at least one ACK is present, NACK and DTX are coupled. This is because a combination of a reserved PUCCH resource and QPSK symbol cannot indicate every ACK/NACK state. However, without ACK, DTX is decoupled from the NACK.

In this case, a PUCCH resource linked to a data unit corresponding to one definite NACK may also be reserved for transmitting a signal of a plurality of ACK/NACKs.

In the LTE-A system, it is considered to transmit a plurality of ACK/NACK information/signals for a plurality of PDSCHs transmitted through a plurality of downlink component carriers (DL CCs), through a specific uplink component carrier (UP CC).

To this end, unlike the ACK/NACK transmission using the PUCCH format 1a/1b in the existing Rel-8 LTE, it may be considered to channel-code a plurality of pieces of ACK/NACK information/signals using channel-coding (for example, Reed-Muller code, a tail-biting convolutional code, etc.) and subsequently transmit the same using a PUCH format 2 or a new modified PUCCH format (i.e., E-PUCCH format) based on block-spreading as described below.

The block spreading technique is a scheme that modulates transmission of the control signal by using the SC-FDMA scheme unlike the existing PUCCH format 1 series or 2 series. As illustrated in FIG. 8, a symbol sequence may be spread and transmitted on the time domain by using an orthogonal cover code (OCC). The control signals of the plurality of terminals may be multiplexed on the same RB by using the OCC. In the case of PUCCH format 2 described above, one symbol sequence is transmitted throughout the time domain and the control signals of the plurality of terminals are multiplexed by using the cyclic shift (CS) of the CAZAC sequence, while in the case of a block spreading based on PUCCH format (for example, PUCCH format 3), one symbol sequence is transmitted throughout the frequency domain and the control signals of the plurality of terminals are multiplexed by using the time domain spreading using the OCC.

FIG. 8 illustrates one example of generating and transmitting 5 SC-FDMA symbols during one slot in the wireless communication system to which the present invention may be applied.

In FIG. 8, an example of generating and transmitting 5 SC-FDMA symbols (that is, data part) by using an OCC having the length of 5 (alternatively, SF=5) in one symbol sequence during one slot. In this case, two RS symbols may be used during one slot.

In the example of FIG. 8, the RS symbol may be generated from a CAZAC sequence to which a specific cyclic shift value is applied and transmitted in a type in which a predetermined OCC is applied (alternatively, multiplied) throughout a plurality of RS symbols. Further, in the example of FIG. 8, when it is assumed that 12 modulated symbols are used for each OFDM symbol (alternatively, SC-FDMA symbol) and the respective modulated symbols are generated by QPSK, the maximum bit number which may be transmitted in one slot becomes 24 bits (=12×2). Accordingly, the bit number which is transmittable by two slots becomes a total of 48 bits. When a PUCCH channel structure of the block spreading scheme is used, control information having an extended size may be transmitted as compared with the existing PUCCH format 1 series and 2 series.

For the sake of convenience, a scheme of transmitting plurality of ACK/NACK based on channel coding using the PUCCH format 2 or the E-PUCCH format is called a "multi-bit ACK/NACK coding" method. This method shows a method of transmitting an ACK/NACK coded block generated by channel coding ACK/NACK or DTX information (which means that the PDCCH may not be received/detected) for PDSCHs of a plurality of DL CCs. For example, if the UE operates in an SU-MIMO mode and receives two codewords (CW) in a certain DL CC, the UE may have a total of four feedback states of ACK/ACK, ACK/NACK, NACK/ACK, and NACK/NACK by CWs for the CCs. If the UE receives a single CW, it may have a maximum of three states of ACK, NACK, and DTX (or may have a total of two states of ACK and NACK/DTX when NACK is handled to be the same as DTX). Therefore, if the UE merges up to 5 DL CCs and operates in the SU-MIMO mode in all CCs, it may have a maximum of 55 transmittable feedback states, and a ACK/NACK payload size for expressing the feedback states is a total of 12 bits (If DTX is handled to be the same as NACK, the number of feedback states is 45, and a ACK/NACK payload size for expressing it is 10 bits in total).

In the foregoing ACK/NACK multiplexing (i.e., ACK/NACK selection) method applied to the existing Rel-8 TDD system, an implicit ACK/NACK selection method using an implicit PUCCH resource corresponding to the PDCCH scheduling each PDSCH of a corresponding UE (that is, linked to the lowermost CCE index) is considered. Meanwhile, in the LTE-A FDD system, a plurality of ACK/NACK transmissions for a plurality of PDSCHs transmitted through a plurality of DL CCs through one specific UL CC, which is basically set to be UE-specific, are considered, and to this end, an "ACK/NACK selection" method using a combination of explicit PUCCH resources previously reserved for each UE through an implicit PUCCH resource linked to the PDCCH scheduling specific or some or all of DL CCs (i.e., linked to the lowermost CCE index n_CCE or linked to n_CCE and n_CCE+1) or through the corresponding implicit PUCCH resource and RRC signaling is considered.

Also, in the LTE-A TDD system, it is possible to consider a situation where a plurality of CCs are merged (CA: Carrier Aggregation). Accordingly, it is considered to transmit a plurality of pieces of ACK/NACK information/signals for a plurality of PDSCHs transmitted through a plurality of DL subframes and a plurality of CCs, through a specific CC (i.e., A/N CC) in a UL subframe corresponding to the plurality of DL subframes. Here, unlike in the LTE-A FDD, a scheme of transmitting a plurality of ACK/NACKs corresponding to the maximum number of CWs that may be transmitted through all CCs allocated to the UE for all of a plurality of DL subframes (i.e., SFs) (i.e., the entire ACK/NACKs), or a scheme of transmitting by reducing the number of all the transmission ACK/NACKs by applying ACK/NACK bundling for CW and/or CC and/or SF domain (i.e., bundled ACK/NACK) may be considered. (Here, CW bundling refers to application of ACK/NACK bundling for CW by CCs for each DL SF, CC bundling refers to application of ACK/NACK bundling for all or some of CCs for each DL SF, and SF bundling refers to application of ACK/NACK bundling to all or some of DL SFs for each CC. Characteristically, as the SF bundling method, an "ACK-counter" scheme indicating a total number of ACKs (or the number of some ACKs) by CCs for every PDSCH or DL grant PDCCH received for each CC may be considered). Here, "multi-bit ACK/NACK coding" or "ACK/NACK selection"-based ACK/NACK transmission technique may be configurably applied according to sizes of ACK/NACK payload of each UE or ACK/NACK payload for the entire or bundled ACK/NACK transmission set for each UE.

General Carrier Aggregation

A communication environment taken into consideration in embodiments of the present invention includes a multi-carrier support environment. That is, a multi-carrier system or Carrier Aggregation (CA) system that is used in an embodiment of the present invention refers to a system in which one or more Component Carriers (CCs) having a smaller bandwidth than a target bandwidth are aggregated and used when the target wideband is configured in order to support a wideband.

In an embodiment of the present invention, a multi-carrier means of an aggregation of carriers (or a carrier aggregation). In this case, an aggregation of carriers means both an aggregation between contiguous carriers and an aggregation between discontiguous (or non-contiguous) carriers. Furthermore, the number of CCs aggregated between downlink and uplink may be different. A case where the number of downlink CCs (hereinafter called "DL CCs") and the number of uplink CCs (hereinafter called "UL CCs") are the same is called a symmetric aggregation. A case where the number of DL CCs is different from the number of UL CCs is called an asymmetric aggregation. Such the term of a carrier aggregation may be replaced with terms, such as a carrier aggregation, bandwidth aggregation, or spectrum aggregation.

An object of a carrier aggregation configured by aggregating two or more component carriers is to support up to a 100 MHz bandwidth in an LTE-A system. When one or more carriers having a smaller bandwidth than a target bandwidth are aggregated, the bandwidth of the aggregated carriers may be restricted to a bandwidth which is used in an existing system in order to maintain backward compatibility with an existing IMT system. For example, in an existing 3GPP LTE system, {1.4, 3, 5, 10, 15, 20} MHz bandwidths may be supported. In a 3GPP LTE-advanced system (i.e., LTE-A), bandwidths greater than the bandwidth 20 MHz may be supported using only the bandwidths for a backward compatibility with existing systems. Furthermore, in a carrier aggregation system used in an embodiment of the present invention, new bandwidths may be defined regardless of the bandwidths used in the existing systems in order to support a carrier aggregation.

An LTE-A system uses the concept of a cell in order to manage radio resources.

The aforementioned carrier aggregation environment may also be called a multi-cell environment. A cell is defined as a combination of a pair of a downlink resource (DL CC) and an uplink resource (UL CC), but an uplink resource is not an essential element. Accordingly, a cell may consist of a downlink resource only or a downlink resource and an uplink resource. If specific UE has a single configured serving cell, it may have 1 DL CC and 1 UL CC. If specific UE has two or more configured serving cells, it has DL CCs corresponding to the number of cells, and the number of UL CCs may be the same as or smaller than the number of DL CCs.

In some embodiments, a DL CC and an UL CC may be configured in an opposite way. That is, if specific UE has a plurality of configured serving cells, a carrier aggregation environment in which the number of UL CCs is greater than the number of DL CCs may also be supported. That is, a carrier aggregation may be understood as being an aggregation of two or more cells having different carrier frequency (the center frequency of a cell). In this case, the "cell" should be distinguished from a "cell", that is, a region commonly covered by an eNB.

A cell used in an LTE-A system includes a Primary Cell (PCell) and a Secondary Cell (SCell). A PCell and an SCell may be used as serving cells. In the case of UE which is in an RRC_CONNECTED state, but in which a carrier aggregation has not been configured or which does not support a carrier aggregation, only one serving cell configured as only a PCell is present. In contrast, in the case of UE which is in the RRC_CONNECTED state and in which a carrier aggregation has been configured, one or more serving cells may be present. A PCell and one or more SCells are included in each serving cell.

A serving cell (PCell and SCell) may be configured through an RRC parameter. PhysCellId is the physical layer identifier of a cell and has an integer value from 0 to 503. SCellIndex is a short identifier which is used to identify an SCell and has an integer value of 1 to 7. ServCellIndex is a short identifier which is used to identify a serving cell (PCell or SCell) and has an integer value of 0 to 7. The value 0 is applied to a PCell, and SCellIndex is previously assigned in order to apply it to an SCell. That is, in ServCellIndex, a cell having the smallest cell ID (or cell index) becomes a PCell.

A PCell means a cell operating on a primary frequency (or primary CC). A PCell may be used for UE to perform an initial connection establishment process or a connection re-establishment process and may refer to a cell indicated in a handover process. Furthermore, a PCell means a cell that belongs to serving cells configured in a carrier aggregation environment and that becomes the center of control-related communication. That is, UE may receive a PUCCH allocated only in its PCell and send the PUCCH and may use only the PCell to obtain system information or to change a monitoring procedure. An Evolved Universal Terrestrial Radio Access Network (E-UTRAN) may change only a PCell for a handover procedure using the RRC connection reconfiguration (RRCConnectionReconfiguration) message of a higher layer including mobility control information (mobilityControlInfo) for UE which supports a carrier aggregation environment.

An SCell may mean a cell operating on a secondary frequency (or secondary CC). Only one PCell is allocated to specific UE, and one or more SCells may be allocated to the specific UE. An SCell may be configured after RRC connection is established and may be used to provide additional radio resources. A PUCCH is not present in the remaining cells, that is, SCells that belong to serving cells configured in a carrier aggregation environment and that do not include a PCell. When adding an SCell to UE supporting a carrier aggregation environment, an E-UTRAN may provide all types of system information related to the operation of a related cell in the RRC_CONNECTED state through a dedicated signal. A change of system information may be controlled by releasing and adding a related SCell. In this case, the RRC connection reconfiguration (RRCConnection-Reconfiguration) message of a higher layer may be used. An E-UTRAN may send dedicated signaling having a different parameter for each UE instead of broadcasting within a related SCell.

After an initial security activation process is started, an E-UTRAN may configure a network including one or more SCells by adding to a PCell that is initially configured in a connection establishing process. In a carrier aggregation environment, a PCell and an SCell may operate respective component carriers. In the following embodiments, a Primary Component Carrier (PCC) may be used as the same meaning as a PCell, and a Secondary Component Carrier (SCC) may be used as the same meaning as an SCell.

FIG. 9 shows an example of component carriers and a carrier aggregation in a wireless communication system to which an embodiment of the present invention may be applied.

FIG. 9*a* shows the structure of a single carrier used in an LTE system. A component carrier includes a DL CC and an UL CC. One component carrier may have a frequency range of 20 MHz.

FIG. 9*b* shows the structure of a carrier aggregation used in an LTE-A system. FIG. 9*b* shows an example in which 3 component carriers each having a frequency size of 20 MHz have been aggregated. Three DL CCs and three UL CCs have been illustrated in FIG. 9, but the number of DL CCs and UL CCs is not limited. In the case of a carrier aggregation, UE may monitor 3 CCs at the same time, may receive downlink signal/data, and may transmit uplink signal/data.

If N DL CCs are managed in a specific cell, a network may allocate M (M≤N) DL CCs to UE. In this case, the UE may monitor only the M limited DL CCs and receive a DL signal. Furthermore, a network may give priority to L (L≤M≤N) DL CCs and allocate major DL CCs to UE. In this case, the UE must monitor the L DL CCs. Such a method may be applied to uplink transmission in the same manner.

A linkage between a carrier frequency (or DL CC) of a downlink resource and a carrier frequency (or UL CC) of an uplink resource may be indicated by a higher layer message, such as an RRC message, or system information. For example, a combination of DL resources and UL resources may be configured by a linkage defined by System Information Block Type2 (SIB2). Specifically, the linkage may mean a mapping relationship between a DL CC in which a PDCCH carrying an UL grant is transmitted and an UL CC in which the UL grant is used and may mean a mapping relationship between a DL CC (or UL CC) in which data for an HARQ is transmitted and an UL CC (or DL CC) in which an HARQ ACK/NACK signal is transmitted.

Cross-Carrier Scheduling

In a carrier aggregation system, there are two methods, that is, a self-scheduling method and a cross-carrier scheduling method form the point of view of scheduling for a carrier or a serving cell. Cross-carrier scheduling may also be called cross-component carrier scheduling or cross-cell scheduling.

Cross-carrier scheduling means that a PDCCH (DL grant) and a PDSCH are transmitted in different DL CCs or that a PUSCH transmitted according to a PDCCH (UL grant) transmitted in a DL CC is transmitted through an UL CC different from an UL CC that is linked to the DL CC through which the UL grant has been received.

Whether cross-carrier scheduling will be performed may be activated or deactivate in a UE-specific way, and each UE may be notified through high layer signaling (e.g., RRC signaling) semi-statically.

If cross-carrier scheduling is activated, there is a need for a Carrier Indicator Field (CIF) providing notification that a PDSCH/PUSCH indicated by a PDCCH is transmitted through which DL/UL CC. For example, a PDCCH may allocate a PDSCH resource or PUSCH resource to any one of a plurality of component carriers using a CIF. That is, if a PDCCH on a DL CC allocates a PDSCH or PUSCH resource to one of multi-aggregated DL/UL CCs, a CIF is configured. In this case, a DCI format of LTE-A Release-8 may be extended according to the CIF. In this case, the configured CIF may be fixed to a 3-bit field, and the position of the configured CIF may be fixed regardless of the size of the DCI format. Furthermore, a PDCCH structure (resource mapping based on the same coding and the same CCE) of LTE-A Release-8 may be reused.

In contrast, if a PDCCH on a DL CC allocates a PDSCH resource on the same DL CC or allocates a PUSCH resource on a single-linked UL CC, a CIF is not configured. In this case, the same PDCCH structure (resource mapping based on the same coding and the same CCE) and DCI format as those of LTE-A Release-8 may be used.

If cross-carrier scheduling is possible, UE needs to monitor a PDCCH for a plurality of pieces of DCI in the control region of a monitoring CC based on a transmission mode and/or bandwidth corresponding to each CC. Accordingly, there is a need for the configuration of a search space and PDCCH monitoring capable of supporting such monitoring.

In a carrier aggregation system, a UE DL CC set is indicative of a set of DL CCs scheduled so that UE receives a PDSCH. A UE UL CC set is indicative of a set of UL CCs scheduled so that UE transmits a PUSCH. Furthermore, a PDCCH monitoring set is indicative of a set of one or more DL CCs for performing PDCCH monitoring. A PDCCH monitoring set may be the same as a UE DL CC set or may be a subset of a UE DL CC set. A PDCCH monitoring set may include at least one of DL CCs within a UE DL CC set. Alternatively, a PDCCH monitoring set may be separately defined regardless of a UE DL CC set. DL CCs included in a PDCCH monitoring set may be configured so that self-scheduling for a linked UL CC is always possible. Such a UE DL CC set, UE UL CC set, and PDCCH monitoring set may be configured in a UE-specific, UE group-specific, or cell-specific way.

If cross-carrier scheduling is deactivated, it means that a PDCCH monitoring set is always the same as UE DL CC set. In this case, there is no indication, such as separate signaling for a PDCCH monitoring set. However, if cross-carrier scheduling is activated, a PDCCH monitoring set may be defined in a UE DL CC set. That is, in order to schedule a PDSCH or PUSCH for UE, an eNB transmits a PDCCH through a PDCCH monitoring set only.

FIG. 10 shows an example of the structure of a subframe according to cross-carrier scheduling in a wireless communication system to which an embodiment of the present invention may be applied.

FIG. 10 shows an example in which 3 DL CCs are aggregated in a DL subframe for LTE-A UE and a DL CC "A" has been configured as a PDCCH monitoring DL CC. IF a CIF is not used, each DL CC may send a PDCCH for scheduling its PDSCH without a CIF. In contrast, if a CIF is used through higher layer signaling, only the single DL CC "A" may send its PDSCH or a PDCCH for scheduling a PDSCH of a different CC using the CIF. In this case, the DL CCs "B" and "C" not configured as PDCCH monitoring DL CCs do not send a PDCCH.

PUCCH Piggybacking

FIG. 11 shows an example of transport channel processing for an UL-SCH in a wireless communication system to which an embodiment of the present invention may be applied.

In a 3GPP LTE system (=E-UTRA, Rel. 8), in the case of UL, in order to efficiently use the power amplifier of UE, a Peak-to-Average Power Ratio (PAPR) characteristic or Cubic Metric (CM) characteristic affecting performance of the power amplifier are set to maintain good single carrier transmission. That is, in the case of PUSCH transmission in an existing LTE system, the single carrier characteristic of data may be maintained through DFT-precoding. In the case of PUCCH transmission, a single carrier characteristic may be maintained by carrying information on a sequence having a single carrier characteristic and sending the information. However, if DFT-precoded data is discontiguously allocated based on a frequency axis, or a PUSCH and a PUCCH are transmitted at the same time, such a single carrier characteristic is not maintained. Accordingly, if PUSCH transmission is to be performed in the same subframe as that of PUCCH transmission as in FIG. 11, Uplink Control Information (UCI) information to be transmitted through a PUCCH is transmitted (piggybacked) along with data through a PUSCH in order to maintain the single carrier characteristic.

In a subframe in which a PUSCH is transmitted, a method of multiplexing Uplink Control Information (UCI) (a CQI/PMI, HARQ-ACK, an RI, etc.) with a PUSCH region is used because existing LTE UE is unable to send a PUCCH and a PUSCH at the same time as described above.

For example, if a Channel Quality Indicator (CQI) and/or a Precoding Matrix Indicator (PMI) are to be transmitted in a subframe allocated to send a PUSCH, UL-SCH data and the CQI/PMI may be multiplexed prior to DFT-spreading and may be transmitted along with control information and data. In this case, the UL-SCH data is subjected to rate matching by taking the CQI/PMI resources into consideration. Furthermore, a method of puncturing the UL-SCH data into control information, such as HARQ ACK, and an RI, and multiplexing the results with a PUSCH region is used.

FIG. 12 shows an example of a signal processing process in an uplink shared channel, that is, a transport channel, in a wireless communication system to which an embodiment of the present invention may be applied.

Hereinafter, a signal processing process for an uplink shared channel (hereinafter called an "UL-SCH") may be applied to one or more transport channels or control information types.

Referring to FIG. 12, an UL-SCH transfers data to a coding unit in the form of a Transport Block (TB) once for each Transmission Time Interval (TTI)

CRC parity bits $P\_0~P\_L-1$ are attached to the bits $a\_0~a\_A-1$ of the transport block received from a higher layer at step S120. In this case, A is the size of the transport block, and L is the number of parity bits. The input bits to which the CRC parity bits have been attached are $b\_0~b\_B-1$. In this case, B is indicative of the number of bits of the transport block including the CRC parity bits.

The input bits $b\_0~b\_B-1$ are partitioned into several Code Blocks (CBs) based on the TB size. A CRC is attached to the partitioned several CBs at step S121. Bits after the partitioning of the CBs and the attachment of the CRC are $c\_r0~c\_r(Kr-1)$. In this case, r is a CB number (r=0, . . . , C-1), and Kr is the number of bits according to a CB r. Furthermore, C is a total number of CBs Next, channel coding is performed at step S122. Output bits after the channel coding are $d\_r0^{\wedge}(i)~d\_r(Dr-1)^{\wedge}(i)$. In this case, i is a coded stream index and may have a value 0, 1, or 2 value. $D_r$ is the number of bits of the i-th-coded stream for the CB r. r is a CB number (r=0, . . . , C-1), and C a total number of CBs. Each CB may be coded by turbo coding.

Next, rate matching is performed at step S123. Bits after the rate matching are $e\_r0~e\_r(Er-1)$. In this case, r is a CB number (r=0, . . . , C-1), and C is a total number of CBs. $E_r$ is the number of bits of a r-th code block that has been subjected to rate matching.

Next, a concatenation between the CBs is performed again at step S124. Bits after the concatenation of the CBs are $f\_0~f\_G-1$. In this case, G is a total number of coded bits for transmission. When control information is multiplexed with UL-SCH transmission, the number of bits used for control information transmission is not included.

Meanwhile, when control information is transmitted in a PUSCH, channel coding is independently performed on a CQI/PMI, an RI, and ACK/NACK, that is, the control information, at steps S126, S127, and S128. The pieces of control information have different coding rates because different coded symbols are allocated for the transmission of the control information.

In Time Division Duplex (TDD), ACK/NACK feedback mode supports two types of ACK/NACK bundling mode and ACK/NACK multiplexing mode by the configuration of a higher layer. For ACK/NACK bundling, ACK/NACK information bits include 1 bit or 2 bits. For ACK/NACK multiplexing, ACK/NACK information bits include 1 bit to 4 bits.

After the concatenation between the CBs at step S124, the multiplexing of the coded bits $f\_0~f\_G-1$ of the UL-SCH data and the coded bits $q\_0~q\_(N\_L*Q\_CQI-1)$ of the CQI/PMI are performed at step S125. The results of the multiplexing of the UL-SCH data and the CQI/PMI are $g\_0~g\_H'-1$. In this case, $g\_i(i=0~H'-1)$ is indicative of a column vector having a length $(Q\_m*N\_L)$. $H=(G+N\_L*Q\_CQI)$ and $H'=H/(N\_L*Q\_m)$. $N\_L$ is the number of layers to which an UL-SCH transport block has been mapped. H is a total number of coded bits allocated to the $N\_L$ transmission layers to which the transport block has been mapped for the UL-SCH data and CQI/PMI information.

Next, the multiplexed data and CQI/PMI and the separately channel-coded RI and ACK/NACK are subjected to channel interleaving, thereby generating an output signal at step S129.

HARQ (Hybrid—Automatic Repeat and Request)

In a mobile communication system, one eNB sends and receives data to and from a plurality of UEs in one cell/sector through a wireless channel environment.

In a system in which multiple carriers operate or a system operating in a form similar to the system, an eNB receives packet traffic over a wired Internet and sends the received packet traffic to UE using a predetermined communication method. In this case, it is a downlink scheduling that the eNB determines to send data to which UE using which frequency domain at which timing.

Furthermore, the eNB receives data from the UE using a predetermined communication method, demodulates the received data, and sends packet traffic through the wired Internet. It is an Uplink scheduling that the eNB determines to allow which UE to send uplink data using which frequency band at which timing. In general, UE having a better channel state sends and receives data using more time and more frequency resources.

FIG. 13 is a diagram illustrating a time-frequency resource block in a time frequency domain in a wireless communication system to which an embodiment of the present invention may be applied.

Resources in a system in which multiple carriers operate and a system operating in a form similar to the system may be basically divided into a time domain and a frequency domain. The resources may be defined as resource blocks. The resource block includes specific N subcarriers and specific M subframes or a predetermined time unit. In this case, N and M may be 1.

In FIG. 13, one square means one resource block, and one resource block use several subcarriers as one axis and a predetermined time unit as the other axis. In downlink, an eNB schedules one or more resource blocks for selected UE according to a predetermined scheduling rule, and sends data to the UE using allocated resource blocks. In uplink, an eNB schedules one or more resource blocks to selected UE according to a predetermined scheduling rule, and the UE sends data using the allocated resource in uplink.

After the scheduling and the data is transmitted, an error control method if a frame is lost or damaged includes an automatic repeat request (ARQ) method and a hybrid ARQ (HARQ) method of a more advanced form.

Basically, in the ARQ method, after one frame is transmitted, a transmission side waits for an acknowledgement message (ACK). A reception side sends an acknowledgement message (ACK) only when the frame is successfully received. If an error is generated in the received frame, the reception side sends a negative-ACK (NACK) message again and deletes information about the received frame having an error from a reception end buffer. When an ACK signal is received, a transmission side sends a subsequent frame. When a NACK message is received, the transmission side resends a corresponding frame.

Unlike in the ARQ method, in the HARQ method, if a received frame cannot be demodulated, a reception end sends a NACK message to a transmission end, but stores an already received frame in a buffer during a specific time and combines the stored frame with a previously received from when the corresponding frame is retransmitted, thereby increasing a success rate of reception.

Recently, the HARQ method more efficient than the basic ARQ method is widely used. Such an HARQ method includes several types. The HARQ method may be basically divided into synchronous HARQ and asynchronous HARQ depending on retransmission timing and may be divided into a channel-adaptive method and a channel-non-adaptive method depending on whether a channel state is incorporated into the amount of resources used upon retransmission.

In the synchronous HARQ method, when initial transmission fails, subsequent retransmission is performed by a system according to predetermined timing. That is, assuming that timing upon retransmission is performed every fourth time unit after an initial transmission failure, an eNB and UE do not need to be additionally notified of such timing because the timing has already been agreed between the eNB and the UE. In this case, if a data transmission side has received an NACK message, it retransmits a frame every fourth time unit until it receives an ACK message.

In contrast, in the asynchronous HARQ method, retransmission timing may be newly scheduled or may be performed through additional signaling. Timing when retransmission for a previously failed frame is performed is changed depending on several factors, such as a channel state.

In the channel-non-adaptive HARQ method, the modulation of a frame upon retransmission, the number of resource blocks, and adaptive modulation and coding (AMC) are performed as they have been predetermined upon initial transmission. In contrast, in the channel-adaptive HARQ method, the modulation of a frame upon retransmission, the number of resource blocks, and adaptive modulation and coding (AMC) are performed are changed depending on the state of a channel. For example, in the channel-non-adaptive HARQ method, a transmission side sends data using 6 resource blocks upon initial transmission and performs retransmission using 6 resource blocks upon subsequent retransmission in the same manner. In contrast, in the channel-adaptive HARQ method, although transmission has been performed using 6 resource blocks, retransmission is subsequently performed using resource blocks greater than or smaller than the 6 resources blocks depending on a channel state.

Four HARQ combinations may be performed based on such a classification, but a HARQ method that are used primarily includes an asynchronous and channel-adaptive HARQ method and a synchronous and channel-non-adaptive HARQ method.

The asynchronous and channel-adaptive HARQ method may maximize retransmission efficiency because retransmission timing and the amount of resources used are adaptively changed depending on the state of a channel, but has a disadvantage in that overhead is increased. Accordingly, the asynchronous and channel-adaptive HARQ method is not taken into consideration in common for uplink.

The synchronous and channel-non-adaptive HARQ method is advantageous in that overhead for timing for retransmission and resource allocation is rarely present because the timing for retransmission and the resource allocation have been predetermined within a system, but is disadvantageous in that retransmission efficiency is very low if such a method is used in a channel state that varies severely.

FIG. 14 is a diagram illustrating a resource allocation and retransmission process of the asynchronous HARQ method in a wireless communication system to which an embodiment of the present invention may be applied.

For example, in the case of downlink, after scheduling is performed and data is transmitted, ACK/NACK information is received from UE. Time delay is generated until next data is transmitted as illustrated in FIG. 14. The time delay is generated due to channel propagation delay and the time taken for data decoding and data encoding.

For such a delay period, a method for sending data using an independent HARQ process is used for blankless data transmission. For example, if the shortest cycle between next data transmission and subsequent data transmission is 7 subframes, data may be transmitted without a blank if 7 independent processes are placed in the 7 subframes. In TE, in case of not operating by MIMO, a maximum of 8 processes may be allocated.

Reference Signal (RS)

In a wireless communication system, data is transmitted via a wireless channel, and thus, a signal may be distorted during transmission. In order for a receiving end to accurately receive, distortion of the received signal should be corrected using channel information. In order to detect channel information, a method of transmitting a signal known to both a transmitting side and the receiving side and a method of detecting channel information using a degree of distortion when a signal is transmitted through a channel are largely used. The afore-mentioned signal is called a pilot signal or a reference signal (RS).

Also, recently, most mobile communication systems uses a method for enhancing transmission/reception data efficiency by adopting multiple transmit antennas and multiple receive antennas in order to transmit a packet, moving away from the conventional use of a single transmit antenna and a single receive antenna. When data is transmitted or received using multiple input/output antennas, a channel state between the transmit antennas and the receive antennas should be detected to accurately receive a signal. Therefore, each transmit antenna should have a separate reference signal.

In a mobile communication system, an RS may be classified into two types according to its purpose. There are an RS for acquiring channel information and an RS used for data demodulation. The former aims at acquiring channel information by a UE to downlink, and thus, the former RS should be transmitted in a broadband, and even a UE, which does not receive downlink data in a specific subframe, should receive and measure the RS. Also, the former RS is used for measurement such as handover, or the like. The latter RS is an RS transmitted together in a corresponding resource when a base station (BS) transmits it to downlink. Upon receiving the corresponding RS, the UE may be able to perform channel estimation, and thus, demodulate data. The latter RS should be transmitted in a region in which data is transmitted.

Five types of downlink RS are defined as follows.
CRS: cell-specific reference signal
MBSFN RS: multicast-broadcast single-frequency network reference signal
UE-specific RS or demodulation RS (DM-RS)
PRS: positioning reference signal
CSI-RS: channel state information reference signal
One RS is transmitted for each downlink antenna port.

The CRS is transmitted in every downlink subframe within a cell supporting PDSCH transmission. The CRS is transmitted in one or more of antenna ports 0 to 3. The CRS is defined only in Δf=15 kHz.

The MBSFN RS is transmitted in an MBSFN region of an MBSFN subframe only when a physical multicast channel (PMCH) is transmitted. The MBSFN RS is transmitted in antenna port 4. The MBSFN RS is defined only in an extended CP.

The DM-RS is supported for transmission of a PDSCH and is transmitted in antenna ports p=5, p=7, p=8 or p=7, 8, . . . , u+6. Here, u is the number of layers used for transmission of the PDSCH. The DM-RS is present and valid for PDSCH demodulation only when PDSCH transmission is associated in a corresponding antenna port. The DM-RS is transmitted only in a resource block (RB) to which the corresponding PDSCH is mapped.

Regardless of the antenna port p, when any one of a physical channel and a physical signal other than the DM-RS is transmitted using an RE of the same index pair (k,l) in which the DM-RS is transmitted, the DM-RS is not transmitted in the RE of the corresponding index pair (k,l).

The PRS is transmitted only in a resource block within a downlink subframe set for PRS transmission.

When both a general subframe and an MBSFN subframe are set as positioning subframes within one cell, OFDM symbols within the MBSFN subframe set for PRS transmission use the same CP as that of subframe #0. When only the MBSFN subframe is set as a positioning subframe within one cell, OMDM symbols set for the PRS within the MBSFN region of the corresponding subframe use an extended CP.

Within the subframe set for PRS transmission, a starting point of an OFDM symbol set for PRS transmission is the same as a starting point of a subframe having the same CP length as that of every OFDM symbol set for the RPS transmission.

The PRS is transmitted in antenna port 6.

The PRS is not mapped to an RE (k,l) allocated to a physical broadcast channel (PBCH), a PSS, or SSS, regardless of the antenna port p.

The PRS is defined only in Δf=15 kHz.

The CSI-RS is transmitted in 1, 2, 4, or 8 number of antenna ports using p=15, p=15, 16, p=15, . . . , 18, and p=15, . . . , 22, respectively.

The CSI-RS is defined only in Δf=15 kHz.

The reference signal (RS) will be described in more detail.

The CRS is an RS for obtaining information regarding a state of a channel shared by every terminal within a cell and measuring handover, or the like. The DM-RS is used for data demodulation only for a specific UE. Information for demodulation and channel measurement may be provided using such RSs. That is, the DM-RS is used only for data demodulation, and the CRS is used for both purposes of channel information and data demodulation.

The reception side (i.e., UE) measures a channel state based on a CRS and feeds indicators related to channel quality, such as a Channel Quality Indicator (CQI), a Precoding Matrix Index (PMI) and/or a Rank Indicator (RI), back to the transmission side (i.e., an eNB). The CRS is also called a cell-specific RS. In contrast, a reference signal related to the feedback of Channel State Information (CSI) may be defined as a CSI-RS.

The DRS may be transmitted through resource elements if data on a PDSCH needs to be demodulated. UE may receive information about whether a DRS is present through a higher layer, and the DRS is valid only if a corresponding PDSCH has been mapped. The DRS may also be called a UE-specific RS or demodulation RS (DMRS).

FIG. 15 illustrates a reference signal pattern mapped to a downlink resource block pair in a wireless communication system to which an embodiment of the present invention may be applied.

Referring to FIG. 15, a downlink resource block pair, that is, a unit in which a reference signal is mapped unit, may be represented in the form of one subframe in a time domain X 12 subcarriers in a frequency domain. That is, in a time axis (i.e., x axis), one resource block pair has a length of 14 OFDM symbols in the case of a normal Cyclic Prefix (CP) (FIG. 15a) and has a length of 12 OFDM symbols in the case of an extended CP (FIG. 15b). In the resource block lattice, Resource Elements (REs) indicated by "0", "1", "2", and "3" mean the positions of the CRSs of antenna port indexes "0", "1", "2", and "3", and REs indicated by "D" denotes the position of a DRS.

A CRS is described in detail below. The CRS is used to estimate the channel of a physical antenna and is a reference signal which may be received by all UEs located in a cell in common. The CRS is distributed to the entire frequency bandwidth. Furthermore, the CRS may be used for Channel Quality Information (CQI) and data demodulation.

The CRS is defined in various formats depending on an antenna array on the transmission side (i.e., an eNB). In a 3GPP LTE system (e.g., release-8), various antenna arrays are supported, and the transmission side of a downlink signal has three types of antenna arrays, such as 3 single transmission antennas, 2 transmission antennas, and 4 transmission antennas. If an eNB uses a single transmission antenna, reference signals for a single antenna port are arrayed. If an eNB uses 2 transmission antennas, reference signals for 2 transmission antenna ports are arrayed using a Time Division Multiplexing (TDM) method and/or a Frequency Division Multiplexing (FDM) method. That is, different time resources and/or different frequency resources are allocated so that reference signals for 2 antenna ports are distinguished from each other.

Furthermore, if an eNB uses 4 transmission antennas, reference signals for 4 transmission antenna ports are arrayed using the TDM and/or FDM methods. Channel information measured by the reception side (i.e., UE) of a downlink signal may be used to demodulate data transmitted using a transmission method, such as single transmission antenna transmission, transmission diversity, closed-loop spatial multiplexing, open-loop spatial multiplexing, or an multi-User-multi-input/output (MIMO) antennas.

If a multi-input/output antenna is supported, when a reference signal is transmitted by a specific antenna port, the reference signal is transmitted in the positions of resource elements specified depending on the pattern of the reference signal and is not transmitted in the positions of resource elements specified for other antenna ports. That is, reference signals between different antennas do not overlap.

A rule for mapping a CRS to a resource block is defined as follows.

$$k = 6m + (v + v_{shift}) \bmod 6 \quad \text{[Equation 1]}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

In Equation 12, k and l denote a subcarrier index and a symbol index, respectively, and p denotes an antenna port. N_symb^DL denotes the number of OFDM symbols in one downlink slot, and N_RB^DL denotes the number of radio resources allocated to downlink. n_s denotes a slot index, and N_ID^cell denotes a cell ID. mod denotes modulo operation. The position of a reference signal is different depending on a value v_shift in a frequency domain. Since the value v_shift depends on a cell ID (i.e., physical cell identity), the position of a reference signal has various frequency shift values depending on a cell.

More specifically, in order to improve channel estimation performance through a CRS, the position of a CRS may be shifted in a frequency domain. For example, if reference signals are placed at an interval of 3 subcarriers, reference signals in one cell are allocated to a 3k-th subcarrier, and reference signals in the other cell are allocated to a (3k+1)-th subcarrier. From the point of view of a single antenna port, reference signals are arrayed at an interval of 6 resource elements in a frequency domain. Reference signals are spaced apart from reference signals allocated in other antenna ports at an interval of 3 resource elements.

In a time domain, reference signals are started from the symbol index 0 of each slot and are arrayed at a constant interval. A time interval is different defined depending on the length of a cyclic prefix. In the case of a normal cyclic prefix, reference signals are placed in the symbol indexes 0 and 4 of a slot. In the case of an extended cyclic prefix, reference signals are placed in the symbol indexes 0 and 3 of a slot. A reference signal for an antenna port that belongs to 2 antenna ports and that has a maximum value is defined within one OFDM symbol. Accordingly, in the case of 4 transmission antenna transmission, reference signals for RS antenna ports 0 and 1 are placed in the symbol indexes 0 and 4 of a slot (i.e., symbol indexes 0 and 3 in the case of an extended cyclic prefix), and reference signals for antenna ports 2 and 3 are placed in the symbol index 1 of the slot. The positions of reference signals for antenna ports 2 and 3 in a frequency domain are changed in a second slot.

A DRS is described in more detail below. The DRS is used to demodulate data. In multi-input/output antenna transmission, precoding weight used for specific UE is combined with a transport channel transmitted by each transmission antenna when the UE receives a reference signal and is used to estimate a corresponding channel without any change.

A 3GPP LTE system (e.g., release-8) supports a maximum of 4 transmission antennas and uses a DRS for rank 1 beamforming. The DRS for rank 1 beamforming also indicates a reference signal for an antenna port index 5.

A rule on which a DRS is mapped to a resource block is defined as follows. Equation 2 illustrates a normal cyclic prefix, and Equation 3 illustrates an extended cyclic prefix.

$$k = (k') \bmod N_{sc}^{RB} + N_{sc}^{RB} \cdot n_{PRB} \quad \text{[Equation 2]}$$

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

$$v_{shift} = N_{ID}^{cell} \bmod 3$$

$$k = (k') \bmod N_{sc}^{RB} + N_{sc}^{RB} \cdot n_{PRB} \quad \text{[Equation 3]}$$

$$k' = \begin{cases} 3m' + v_{shift} & \text{if } l = 4 \\ 3m' + (2 + v_{shift}) \bmod 3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s \bmod 2 = 0 \\ 1, 2 & \text{if } n_s \bmod 2 = 1 \end{cases}$$

$$m' = 0, 1, \ldots, 4N_{RB}^{PDSCH} - 1$$

$$v_{shift} = N_{ID}^{cell} \bmod 3$$

In Equations 2 and 3, k and l denote a subcarrier index and a symbol index, respectively, and p denotes an antenna port. N_sc^RB denotes the size of an RB in a frequency domain and is represented as the number of subcarriers. n_PRB denotes the number of physical RBs. N_RB^PDSCH denotes the frequency bandwidth of an RB for PDSCH transmission. n_s denotes the index of a slot, and N_ID^cell denotes the ID of a cell (i.e., physical cell identity). mod denotes modulo operation. The position of a reference signal is different depending on the value v_shift in a frequency domain. Since the value v_shift depends on the ID of a cell i.e., physical cell identity), the position of a reference signal has various frequency shift values depending on a cell.

In Equations 1 to 3, k and p denote a subcarrier index and an antenna port, respectively. N_RB^DL, n_s, and N_ID^cell denote the number of RBs allocated to downlink, the number of slot indices, and the number of cell IDs. The position of an RS is different depending on the value v_shift from the point of view of a frequency domain.

Sounding Reference Signal (SRS)

An SRS is mostly used in the measurement of channel quality in order to perform uplink frequency-selective scheduling and is not related to the transmission of uplink data and/or control information, but the present invention is not limited thereto. The SRS may be used for various other purposes for improving power control or various startup functions of UEs which have not been recently scheduled. The startup functions may include an initial Modulation and Coding Scheme (MCS), initial power control for data transmission, a timing advance, and frequency semi-selective scheduling, for example. In this case, the frequency semi-selective scheduling means selectively allocating a frequency resource to the first slot of a subframe and pseudo-randomly hopping to another frequency in the second slot of the subframe and allocating frequency resources.

Furthermore, the SRS may be used to measure downlink channel quality, assuming that a radio channel is reciprocal between uplink and downlink. Such an assumption is particularly valid when the same frequency spectrum is shared between uplink and downlink and in Time Division Duplex (TDD) systems separated in a time domain.

The subframes of an SRS transmitted by UE within a cell may be represented by a cell-specific broadcasting signal. A 4-bit cell-specific parameter "srsSubframeConfiguration" indicates 15 available subframe arrays in which an SRS may be transmitted though respective radio frames. In accordance with such arrays, the flexibility of control of SRS overhead may be provided according to a deployment scenario.

A sixteenth array completely turns off the switch of an SRS within a cell, which is mostly suitable for a serving cell which provides service to high-speed UEs.

FIG. 16 illustrates an uplink subframe including the symbols of a Sounding Reference Signal (SRS) in a wireless communication system to which an embodiment of the present invention may be applied.

Referring to FIG. 16, an SRS is always transmitted through the last SC-FDMA symbol in an arrayed subframe. Accordingly, an SRS and DMRS are placed in different SC-FDMA symbols.

The transmission of PUSCH data is not permitted in a specific SC-FDMA symbol for SRS transmission. As a result, if sounding overhead is the highest, that is, although an SRS symbol is included in all subframes, sounding overhead does not exceed about 7%.

Each SRS symbol is generated based on a base sequence (i.e., a random sequence or a sequence set based on Zadoff-Ch (ZC)) regarding a given time unit and frequency bandwidth. All UEs within the same cell use the same base sequence. In this case, the transmissions of SRSs from a plurality of UEs within the same cell in the same frequency bandwidth and the same time are orthogonal to each other by different cyclic shifts of a base sequence and are distinguished from each other.

SRS sequences from different cells may be distinguished from each other because different base sequences are allocated to respective cells, but orthogonality between the different base sequences is not guaranteed.

Relay Node (RN)

In a relay node, data transmitted/received between an eNB and UE is transferred through two different links (i.e., a backhaul link and an access link). An eNB may include a donor cell. A relay node is wirelessly connected to a radio access network through a donor cell.

In relation to the use of the bandwidth (or spectrum) of a relay node, a case where a backhaul link operates in the same frequency bandwidth as that of an access link is called an "in-band", and a case where a backhaul link and an access link operate in different frequency bandwidths is called an "out-band." In both the in-band and the out-band, UE (hereinafter called "legacy UE") operating in accordance with an existing LTE system (e.g., release-8) needs to be able to access a donor cell.

A relay node may be divided into a transparent relay node and a non-transparent relay node depending on whether UE recognizes a relay node. The term "transparent" means whether UE communicates with a network through a relay node is not recognized. The term "non-transparent" means whether UE communicates with a network through a relay node is recognized.

In relation to control of a relay node, a relay node may be divided into a relay node formed as part of a donor cell and a relay node autonomously controlling a cell.

A relay node formed as part of a donor cell may have a relay node identity (relay ID), but does not have its own cell identity.

If at least part of Radio Resource Management (RRM) is controlled by an eNB belonging to a donor cell, it is called a relay node formed as part of a donor cell although the remaining parts of the RRM are placed in the relay node. Such a relay node may support legacy UE. For example, various types of smart repeaters, decode-and-forward relays, and second layer (L2) relay nodes and a Type-2 relay node correspond to such a relay node.

In the case of a relay node autonomously controlling a cell, the relay node controls one or a plurality of cells, and a unique physical layer cell identity is provided to each of the cells controlled by the relay node. Furthermore, the cells controlled by the relay node may use the same RRM mechanism. From a viewpoint of UE, there is no difference between access to a cell controlled by a relay node and access to a cell controlled by a common eNB. A cell controlled by such a relay node may support legacy UE. For example, a self-backhauling relay node, a third layer (L3) relay node, a Type-1 relay node, and a Type-1a relay node correspond to such a relay node.

The Type-1 relay node is an in-band relay node and controls a plurality of cells, and each of the plurality of cells is seen by UE as a separate cell different from a donor cell. Furthermore, the plurality of cells has different physical cell IDs (this is defined in LTE release-8), and the relay node may send its own synchronization channel and reference signal. In the case of one cell operation, UE directly may receive scheduling information and HARQ feedback from a relay node and send its own control channels (e.g., a Scheduling Request (SR), a CQI, and ACK/NACK) to the relay node. Furthermore, the Type-1 relay node is seen by legacy UE (i.e., UE operating in accordance with an LTE release-8 system) as a legacy eNB (i.e., an eNB operating in accordance with an LTE release-8 system). That is, the Type-1 relay node has backward compatibility. Meanwhile, the Type-1 relay node is seen by UEs operating in accordance with an LTE-A system as an eNB different from a legacy eNB, thereby being capable of providing improved performance.

The Type-1a relay node has the same characteristics as the Type-1 relay node except that it operates in an out-band. The operation of the Type-1a relay node may be configured so that an influence on a first layer (L1) operation is minimized.

The Type-2 relay node is an in-band relay node, and it does not have a separate physical cell ID and thus does not form a new cell. The Type-2 relay node is transparent to legacy UE, and the legacy UE does not recognize the presence of the Type-2 relay node. The Type-2 relay node may send a PDSCH, but does not send at least CRS and PDCCH.

In order to prevent a relay node from operating in in-band, some resources in a time-frequency domain may need to be reserved for a backhaul link and may be configured so that they are not used for an access link. This is called resource partitioning.

A known principle in resource partitioning in a relay node may be described as follows. Backhaul downlink and access downlink may be multiplexed according to a Time Division Multiplexing (TDM) method on one carrier frequency (i.e., only one of a backhaul downlink and an access downlink in a specific time is activated). Likewise, backhaul uplink and access uplink may be multiplexed according to a TDM method on one carrier frequency (i.e., only one of a backhaul uplink and an access uplink in a specific time is activated).

In backhaul link multiplexing in FDD, backhaul downlink transmission may be performed in a downlink frequency bandwidth, and the transmission of a backhaul uplink may be performed in an uplink frequency bandwidth. In backhaul link multiplexing in TDD, backhaul downlink transmission may be performed in a downlink subframe of an eNB and a relay node, and the transmission of a backhaul uplink may be performed in an uplink subframe of an eNB and a relay node.

In the case of an in-band relay node, for example, when the reception of a backhaul downlink from an eNB and the transmission of an access downlink to UE are performed in the same frequency bandwidth at the same time, signal interference may be generated in the reception end of a relay node due to a signal transmitted by the transmission end of the relay node. That is, signal interference or RF jamming may be generated in the RF front end of the relay node. Likewise, when the transmission of a backhaul uplink to an eNB and the reception of an access uplink from UE are performed in the same frequency bandwidth at the same time, signal interference may be generated.

Accordingly, in order for a relay node to send/receive signals in the same frequency bandwidth at the same time, a sufficient separation needs to be provided between a reception signal and a transmission signal (e.g., that the reception signal and the transmission signal need to be sufficiently separated geographically, such as that a transmission antenna and a reception antenna are installed on the ground and in the grave, respectively).

One method for solving such signal interference is to allow a relay node to operate in such a way as not to send a signal to UE while receiving a signal from a donor cell. That is, a gap is generated in transmission from the relay node to the UE, and the UE (including legacy UE) is configured to not expect any transmission from the relay node during the gap. Such a gap may be configured by configuring a Multicast Broadcast Single Frequency Network (MBSFN) subframe.

FIG. 17 illustrates the partitioning of a relay node resource in a wireless communication system to which an embodiment of the present invention may be applied.

In FIG. 17, a first subframe is a common subframe, and a downlink (i.e., access downlink) control signal and data are transmitted from a relay node to UE in the first subframe. In contrast, a second subframe is an MBSFN subframe, and a control signal is transmitted from the relay node to the UE in the control region of the downlink subframe, but no transmission is performed from the relay node to the UE in the remaining region of the downlink subframe. In this case, since legacy UE expects the transmission of a PDCCH in all downlink subframes (i.e., a relay node needs to provide support so that legacy UEs within the region of the relay node perform measurement functions by receiving a PDCCH every subframe), the PDCCH needs to be transmitted in all downlink subframes for the correct operation of the legacy UE. Accordingly, the relay node does not perform backhaul downlink reception, but needs to perform access downlink transmission in the first N (N=1, 2 or 3) OFDM symbol period of a subframe (i.e., the second subframe) on the subframe configured for downlink (i.e., backhaul downlink) transmission from an eNB to the relay node. For this, the relay node may provide backward compatibility to serving legacy UE because a PDCCH is transmitted from the relay node to the UE in the control region of the second subframe. The relay node may receive transmission from the eNB while no transmission is performed from the relay node to the UE in the remaining region of the second subframe. Accordingly, access downlink transmission and backhaul downlink reception may not be performed at the same time in an in-band relay node through such a resource partitioning method.

The second subframe using an MBSFN subframe is described in detail. The control region of the second subframe may be said to be a relay node non-hearing period. The relay node non-hearing interval means an interval in which a relay node does not receive a backhaul downlink signal, but sends an access downlink signal. The interval may be configured to have a 1, 2 or 3 OFDM length, such as that described above. A relay node performs access downlink transmission to UE in a relay node non-hearing interval, but may perform backhaul downlink reception from an eNB in the remaining region. In this case, time is taken for the relay node to switch from transmission mode to reception mode because the relay node is unable to perform transmission/reception in the same frequency bandwidth at the same time. Accordingly, a Guard Time (GP) needs to be configured so that the relay node switches to transmission/reception mode in the first some interval of a backhaul downlink reception region. Likewise, a guard time for enabling the relay node to switch to reception/transmission mode may be configured although the relay node operates in such a way as to receive a backhaul downlink from the eNB and to send an access downlink to the UE. The length of such a guard time may be set as a value in a time domain. For example, the length of the guard time may be set as a k (k≥1) time sample (Ts) value or may be set as one or more OFDM symbol length. Alternatively, relay node backhaul downlink subframes may be contiguously configured, or the guard time of the last part of a subframe may not be defined or configured according to a specific subframe timing alignment relationship. Such a guard time may be defined only in a frequency domain configured for backhaul downlink subframe transmission in order to maintain backward compatibility (if a guard time is configured in an access downlink interval, legacy UE cannot be supported). In a backhaul downlink reception interval other than the guard time, the relay node may receive a PDCCH and a PDSCH from the eNB. This may be represented by a relay-PDCCH (R-PDCCH) and a relay-PDSCH (R-PDSCH) in the meaning of a relay node-dedicated physical channel.

Coordinated Multi-Point (CoMP) Transmission and Reception

In line with the demand of LTE-advanced, there has been proposed CoMP transmission in order to improve system performance. CoMP is also called co-MIMO, collaborative MIMO, or network MIMO. CoMP is expected to improve performance of UE located in a cell edge and to improve the average throughput of a cell (or sector).

In general, inter-cell interference deteriorates performance of UE located in a cell edge and the average cell (or sector) efficiency in a multi-cell environment in which a frequency reuse factor is 1. In order to reduce inter-cell interference, a simple passive method, such as Fractional Frequency Reuse (FFR), has been applied to an LTE system so that UE placed in a cell edge in an interference-limited environment has proper performance efficiency. However, instead of reducing the use of frequency resources per cell, a method of reusing inter-cell interference as a signal required to be received by UE or reducing inter-cell interference is more advantageous. In order to achieve the above object, a CoMP transmission method may be used.

A CoMP method applicable to downlink may be divided into a Joint Processing (JP) method and a Coordinated Scheduling/Beamforming (CS/CB) method.

In the JP method, data may be used in each point (i.e., eNB) of a CoMP unit. The CoMP unit means a set of eNBs used in the CoMP method. The JP method may be subdivided into a joint transmission method and a dynamic cell selection method.

The joint transmission method is a method of transmitting, by a plurality of points, that is, some or all of the points of a CoMP unit, signals through a PDSCH at the same time. That is, data transmitted to one UE is transmitted from a plurality of transmission points at the same time. The quality of a signal transmitted to UE may be improved coherently or non-coherently and interference between the UE and another UE may be actively removed through such a joint transmission method.

The dynamic cell selection method is a method of sending a signal by one point of a CoMP unit through a PDSCH. That is, data transmitted to one UE on a specific time is transmitted from one point, but is not transmitted from another point within the CoMP unit to the UE. A point at which data is transmitted to UE may be dynamically selected.

In accordance with the CS/CB method, a CoMP unit performs beamforming in cooperation in order to send data to one UE. That is, data is transmitted to UE in a serving cell only, but user scheduling/beamforming may be determined through cooperation between a plurality of cells within a CoMP unit.

In some embodiments, CoMP reception means the reception of a signal transmitted by cooperation between a plurality of points that are geographically separated. A CoMP method which may be applied to uplink may be divided into a Joint Reception (JR) method and a Coordinated Scheduling/Beamforming (CS/CB) method.

The JR method is a method of receiving, by a plurality of points, that is, some or all of the points of a CoMP unit, a signal transmitted through a PDSCH. In the CS/CB method, a signal transmitted through a PDSCH is received only at one point, but user scheduling/beamforming may be determined through cooperation between a plurality of cells within a CoMP unit.

CA-Based CoMP Operation

In system subsequent to LTE, cooperative multi-point (CoMP) transmission may be implemented using a carrier aggregation (CA) function in LTE.

FIG. 18 is a diagram illustrating a carrier aggregation-based CoMP system in a wireless communication system to which an embodiment of the present invention may be applied.

FIG. 18 illustrates that a primary cell (PCell) carrier and a secondary cell (SCell) carrier use the same frequency band on a frequency axis and are respectively allocated to two eNBs that are geographically spaced apart from each other.

A serving eNB allocates a PCell to UE1, and an neighboring eNB providing much interference allocates an SCell, so that Various DL/UL CoMP operations such as JT, CS/CB, and dynamic cell selection may be performed.

FIG. 18 shows an example in which UE aggregates two eNBs as a PCell and an SCell, respectively. Practically, UE may aggregate three or more cells, and a CoMP operation on some of the three cells in the same frequency band may be performed and a simple CA operation on other cells in a different frequency band may be performed. In this case, the PCell does not need to take part in the CoMP operation.

PDCCH Transmission

The BS determines a PDCCH format according to a DCI to be transmitted to the UE, and attaches a CRC (Cyclic Redundancy Check) to control information. A unique identifier (which is called an RNTI (Radio Network Temporary Identifier)) is masked to the CRC according to an owner of the PDCCH or a purpose thereof. In the case of a PDCCH for a specific UE, a unique identifier of a UE, e.g., a C-RNTI (Cell-RNTI), may be masked to the CRC. Or, in the case of a PDCCH for a paging message, a paging indication identifier, e.g., a P-RNTI (Paging-RNTI) may be masked to the CRC. In the case of a PDCCH for system information, specifically, a system information block (SIB), a system information identifier or an SI-RNTI (system information RNTI) may be masked to the CRC. In order to indicate a random access response, a response with respect to transmission of a random access preamble of a UE, an RA-RNTI (random access-RNTI) may be masked to the CRC.

Thereafter, the BS performs channel coding on CRC-added control information to generate coded data. Here, the BS may perform channel coding at a code rate according to an MCS level. The BS may perform rate matching according to a CCE aggregation level allocated to a PDCCH format, and modulates the coded data to generate modulated symbols. Here, a modulation order according to the MCS level may be used. A CCE aggregation level of modulated symbols forming one PDCCH may be one of 1, 2, 4 and 8. Thereafter, the BS maps the modulated symbols to physical resource elements (CCE to RE mapping).

A plurality of PDCCHs may be transmitted in one subframe. That is, a control region of one subframe includes a plurality of CCEs having an index $0 \sim N_{CCE,k}-1$. Here, $N_{CCE,k}$ denotes a total number of CCEs within a control region of a kth subframe. The UE monitors a plurality of PDCCHs in each subframe.

Here, monitoring refers to UE attempting to decode PDCCHs according to a monitored PDCCH format. In a control region allocated within a subframe, the BS does not provide information regarding where a corresponding PDCCH is present. In order to receive a control channel transmitted from the BS, the UE searches for a PDCCH thereof by monitoring an aggregation of PDCCH candidates within a subframe because the UE does not know in which position, at which CCE aggregation level, or in which DCI format, the PDCCH thereof is transmitted. This is called blind decoding/detection (BD). Blind decoding refers to a method by which the UE de-masks a UE ID thereof in a CRC portion and checks a CRC error to determine whether a corresponding PDCCH is a control channel of the UE.

In the active mode, the UE monitors a PDCCH of each subframe to receive data transmitted to the UE. In a DRX mode, the UE wakes up in a monitoring section of each DRX period to monitor a PDCCH in a subframe corresponding to a monitoring section. A subframe in which PDCCH is monitored is called a non-DRX subframe.

In order to receive the PDCCH transmitted to the UE, the UE should perform blind decoding on all CCEs present in the control region of the non-DRX subframe. Since the UE does not know which POOCH format will be transmitted, the UE should decode all PDCCHs at a possible CCE aggregation level until the blind decoding of the PDCCH is successful in every non-DRX subframe. Since the UE does not know how many CCEs the POOCH for itself uses, the UE should attempt detection at all possible CCE aggregation levels until the blind decoding of the POOCH is successful. That is, the UE performs blind decoding by each CCE aggregation level. That is, the UE first attempts at decoding at a CCE aggregation level unit by 1. If decoding fails, the UE attempts at decoding at the CCE aggregate level unit by 2. Thereafter, the UE attempts at decoding the CCE aggregation level unit by 4 and the CCE aggregation level unit by 8 again. Also, the UE attempts at blind decoding on all four C-RNTI, P-RNTI, SI-RNTI and RA-RNTI. In addition, the UE attempts at blind decoding on all DCI formats to be monitored.

In this manner, if the UE attempts at blind decoding by every CCE aggregation level for all DCI formats to be monitored for all possible RNTIs, the number of detection attempts will be excessively increase, and thus, in the LTE system, a search space (SS) concept is defined for blind decoding of the UE. Search space refers to a PDCCH candidate set for monitoring, and may have a different size according to each PDCCH format.

The search space may include a common search space (CSS) and a UE-specific/dedicated search space (USS). In the case of the common search space, all terminals may know a size of the common search space, but the UE-specific search space may be set individually for each terminal. Accordingly, the UE should monitor both the UE-specific search space and the common search space in order to decode the PDCCH, and thus, the UE performs blind decoding (BD) at a maximum of 44 times in one sub-frame. Here, blind decoding performed in accordance with different CRC values (e.g., C-RNTI, P-RNTI, SI-RNTI, RA-RNTI) is not included.

Due to the small search space, it may happen that eNB fails to secure the CCE resources for transmitting the PDCCH to all the UEs to which the PDCCH is to be transmitted within a given subframe. This is because resources remaining after the CCE location is allocated may not be included in the search space of the specific UE. In order to minimize such barriers that may continue in a next sub-frame, a UE-specific hopping sequence may be applied to a starting point of the UE-specific search space.

Table 5 shows a size of the common search space, and a size of the UE-specific search space.

TABLE 5

| PDCCH format | Number of CCEs (n) | Number of candidates in common search space | Number of candidates in dedicated search space |
|---|---|---|---|
| 0 | 1 | — | 6 |
| 1 | 2 | — | 6 |
| 2 | 4 | 4 | 2 |
| 3 | 8 | 2 | 2 |

In order to alleviate the computational load of the UE according to the number of attempts at blind decoding, the UE does not simultaneously perform search according to all defined DCI formats. In detail, the UE may always perform search for DCI format 0 and 1A in the UE-specific search space. Here, DCI formats 0 and 1A have the same size, but the UE may differentiate between the DCI format using a flag (for format 0/format 1A differentiation) used for differentiating between DCI formats 0 and 1A included in the PDCCH. Also, according to the PDSCH transmission mode set by the eNB, a DCI format other than the DCI formats 0 and 1A may be required for the terminal. For example, there are DCI formats 1, 1B, and 2.

In the common search space, the UE may search the DCI formats 1A and 1C. Also, the UE may be configured to search for DCI format 3 or 3A, and DCI formats 3 and 3A have the same size as DCI formats 0 and 1A, but the UE may differentiate the DCI formats using the CRC scrambled by an identifier other than a UE-specific identifier.

A search space $S\_k^{(L)}$ refers to a PDCCH candidate set according to an aggregation level $L \in \{1, 2, 4, 8\}$. A CCE according to a PDCCH candidate set m of a search space may be determined by Equation 4 below.

$$L \cdot \{(Y_k+m) \bmod \lfloor N_{CCE,k}/L \rfloor\} + i \quad \text{[Equation 4]}$$

Here, $M^{(L)}$ denotes the number of PDCCH candidates according to a CCE aggregation level L for monitoring, and $m=0 \sim M^{\wedge}(L)-1$. i denotes an index designating an individual CCE in each PDCCH candidate, and $i=0 \sim L-1$ As described above, the UE monitors both the UE-specific search space and the common search space to decode the PDCCH. Here, the common search space (CSS) supports PDCCHs having an aggregation level $\{4, 8\}$, and the UE-specific search space (USS) supports PDCCHs having an aggregation level $\{1, 2, 4, 8\}$ Table 6 shows PDCCH candidates monitored by the UE.

TABLE 6

| | Search space $S_k^{(L)}$ | | Number of PDCCH candidates $M^{(L)}$ |
|---|---|---|---|
| Type | Aggregation level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Referring to Equation 4, in the case of the CSS, Y_k is set to 0 for two aggregation levels L=4 and L=8. Meanwhile, in the case of the UE-specific SS (USS), Y_k is defined as expressed by Equation 5 for an aggregation level L.

$$Y_k=(A \cdot Y_{k-1}) \bmod D \quad \text{[Equation 5]}$$

Here, $Y_{-1}=n_{RNTI} \neq 0$, and an RNTI value used for $n_{RNTI}$ may be defined as one of identifications of the UE. Also, A=39827, D=65537, and $k=\lfloor n_s/2 \rfloor$. Here, n_s denotes a slot number (or index) in a radio frame.

UE Procedure for Receiving PDSCH

When UE detects a PDCCH of a serving cell on which a DCI format 1, 1A, 1B, 1C, 1 D, 2, 2A, 2B or 2C intended for the UE is carried other than a subframe(s) indicated by a higher layer parameter "mbsfn-SubframeConfigList", the UE decodes a corresponding PDSCH in the same subframe with the restriction of the number of transport blocks defined in a higher layer.

UE decodes a PDSCH according to a detected PDCCH with CRC scrambled by an SI-RNTI or P-RNTI on which a DCI format 1A, 1C intended for the UE is carried, and assumes that a PRS is not present in a resource block (RB) on which the corresponding PDSCH is carried.

UE in which a carrier indicator field (CIF) for a serving cell is configured assumes that a CIF is not present in any PDCCH of a serving cell within a common search space.

If not, when PDCCH CRC is scrambled by a C-RNTI or an SPS C-RNTI, UE in which a CIF is configured assumes that a CIF for a serving cell is present in a PDCCH that is located within a UE-specific search space.

When UE is configured by a higher layer so that it decodes a PDCCH with CRC scrambled by an SI-RNTI, the UE decodes the PDCCH and a corresponding PDSCH according to a combination defined in Table 3 below. The PDSCH corresponding to the PDCCH(s) is scrambling-initialized by the SI-RNTI.

Table 7 illustrates a PDCCH and PDSCH configured by an SI-RNTI.

TABLE 7

| DCI FORMAT | SEARCH SPACE | SCHEME FOR SENDING PDSCH CORRESPONDING TO PDCCH |
|---|---|---|
| DCI format 1C | common | If the number of PBCH antenna ports is 1, a single antenna port, a port 0 is used, and if not, transmit diversity |
| DCI format 1A | common | If the number of PBCH antenna ports is 1, a single antenna port, a port 0 is used, and if not, transmit diversity |

If UE is configured by a higher layer so that it decodes a PDCCH with CRC scrambled by a P-RNTI, the UE decodes the PDCCH and a corresponding PDSCH according to a combination defined in Table 4 below. The PDSCH corresponding to the PDCCH(s) is scrambling-initialized by the P-RNTI.

Table 8 illustrates a PDCCH and PDSCH configured by a P-RNTI.

TABLE 8

| DCI FORMAT | SEARCH SPACE | SCHEME FOR SENDING PDSCH CORRESPONDING TO PDCCH |
|---|---|---|
| DCI format 1C | common | If the number of PBCH antenna ports is 1, a single antenna port, a port 0 is used, and if not, transmit diversity |
| DCI format 1A | common | If the number of PBCH antenna ports is 1, a single antenna port, a port 0 is used, and if not, transmit diversity |

If UE is configured by a higher layer so that it decodes a PDCCH with CRC scrambled by an RA-RNTI, the UE decodes the PDCCH and a corresponding PDSCH according to a combination defined in Table 5 below. The PDSCH corresponding to the PDCCH(s) is scrambling-initialized by the RA-RNTI.

Table 9 illustrates a PDCCH and PDSCH configured by an RA-RNTI.

TABLE 9

| DCI FORMAT | SEARCH SPACE | SCHEME FOR SENDING PDSCH CORRESPONDING TO PDCCH |
|---|---|---|
| DCI format 1C | common | If the number of PBCH antenna ports is 1, a single antenna port, a port 0 is used, and if not, transmit diversity |
| DCI format 1A | common | If the number of PBCH antenna ports is 1, a single antenna port, a port 0 is used, and if not, transmit diversity |

UE may be semi-statically configured through higher layer signaling so that it receives PDSCH data transmission signaled through a PDCCH in accordance with any one of 9 transmission modes, including a mode 1 to a mode 9.

In the case of the frame structure type 1,
UE does not receive a PDSCH RB transmitted in the antenna port 5 even in any subframe in which the number of OFDM symbols for a PDCCH having a common CP is 4.

If any one of 2 physical resource blocks (PRBs) to which a virtual resource block (VRB) pair is mapped overlaps a frequency in which a PBCH or a primary or secondary synchronous signal is transmitted within the same subframe, UE does not receive a PDSCH RB transmitted in the antenna port 5, 7, 8, 9, 10, 11, 12, 13 or 14 in the corresponding 2 PRBs.

UE does not receive a PDSCH RB transmitted in the antenna port 7 to which distributed VRB resource allocation has been assigned.

UE may skip the decoding of a transport block if it does not receive all of allocated PDSCH RBs. If the UE skips the decoding, a physical layer indicates that the transport block has not been successfully decoded for a higher layer.

In the case of the frame structure type 2,
UE does not receive a PDSCH RB transmitted in the antenna port 5 even in any subframe in which the number of OFDM symbols for a PDCCH having a common CP is 4.

If any one of 2 PRBs to which a VRB pair is mapped overlaps a frequency in which a PBCH is transmitted within the same subframe, UE does not receive a PDSCH RB transmitted in the antenna port 5 in the corresponding 2 PRBs.

If any one of 2 PRBs to which a VRB pair is mapped overlaps a frequency in which a primary or secondary synchronous signal is transmitted within the same subframe, UE does not receive a PDSCH RB transmitted in the antenna port 7, 8, 9, 10, 11, 12, 13 or 14 in the corresponding 2 PRBs.

If a common CP is configured, UE does not receive a PDSCH in the antenna port 5 in which distributed VRB resource allocation has been assigned within a special subframe in an uplink-downlink configuration #1 or #6.

UE does not receive a PDSCH transmitted in the antenna port 7 to which distributed VRB resource allocation has been assigned.

UE may skip the decoding of a transport block if it does not receive all of allocated PDSCH RBs. If the UE skips the decoding, a physical layer indicates that the transport block has not been successfully decoded for a higher layer.

If UE is configured by a higher layer so that it decodes a PDCCH with CRC scrambled by a C-RNTI, the UE decodes the PDCCH and a corresponding PDSCH according to each combination defined in Table 10 below. The PDSCH corresponding to the PDCCH(s) is scrambling-initialized by the C-RNTI.

If a CIF for a serving cell is configured in UE or UE is configured by a higher layer so that it decodes a PDCCH with CRC scrambled by a C-RNTI, the UE decodes the PDSCH of a serving cell indicated by a CIF value within the decoded PDCCH.

When UE of the transmission mode 3, 4, 8 or 9 receives DCI format 1A assignment, the UE assumes that PDSCH transmission is related to a transport block 1 and a transport block 2 is disabled.

If UE is configured as the transmission mode 7, a UE-specific reference signal corresponding to a PDCCH(s) is scrambling-initialized by a C-RNTI.

If an extended CP is used in downlink, UE does not support the transmission mode 8.

If UE is configured as the transmission mode 9, when the UE detects a PDCCH with CRC scrambled by a C-RNTI on which the DCI format 1A or 2C intended for the UE is carried, the UE decodes a corresponding PDSCH in a subframe indicated by a higher layer parameter "mbsfn-SubframeConfigList." However, the subframe configured by a higher layer to decode a PMCH or, the subframe configured by a higher layer to be part of a PRS occasion and the PRS occasion is configured only within an MBSFN subframe and the length of a CP used in a subframe #0 is a common CP is excluded.

Table 10 illustrates a PDCCH and PDSCH configured by a C-RNTI.

TABLE 10

| TRANSMISSION MODE | DCI FORMAT | SEARCH SPACE | METHOD FOR SENDING PDSCH CORRESPONDING TO PDCCH |
|---|---|---|---|
| Mode 1 | DCI format 1A | common and UE-specific by a C-RNTI | a single antenna port, a port 0 |
|  | DCI format 1 | UE-specific by a C-RNTI | a single antenna port, a port 0 |
| Mode 2 | DCI format 1A | common and UE-specific by a C-RNTI | transmit diversity |
|  | DCI format 1 | UE-specific by a C-RNTI | transmit diversity |
| Mode 3 | DCI format 1A | common and UE-specific by a C-RNTI | transmit diversity |
|  | DCI format 2A | UE-specific by a C-RNTI | large delay CDD or transmit diversity |
| Mode 4 | DCI format 1A | common and UE-specific by a C-RNTI | transmit diversity |
|  | DCI format 2 | UE-specific by a C-RNTI | closed-loop spatial multiplexing or transmit diversity |
| Mode 5 | DCI format 1A | common and UE-specific by a C-RNTI | transmit diversity |
|  | DCI format 1D | UE-specific by a C-RNTI | multi-user MIMO |
| Mode 6 | DCI format 1A | common and UE-specific by a C-RNTI | transmit diversity |
|  | DCI format 1B | UE-specific by a C-RNTI | closed-loop spatial multiplexing using a single transport layer |
| Mode 7 | DCI format 1A | common and UE-specific by a C-RNTI | If the number of PBCH antenna ports is 1, a single antenna port, a port 0 is used, and if not, transmit diversity |
|  | DCI format 1 | UE-specific by a C-RNTI | Single antenna port, a port 5 |
| Mode 8 | DCI format 1A | common and UE-specific by a C-RNTI | If the number of PBCH antenna ports is 1, a single antenna port, a port 0 is used, and if not, transmit diversity |
|  | DCI format 2B | UE-specific by a C-RNTI | dual layer transmission, ports 7 and 8 or a single antenna port, a port 7 or 8 |
| Mode 9 | DCI format 1A | common and UE-specific by a C-RNTI | Non-MBSFN subframe: if the number of PBCH antenna ports is 1, a single antenna port, a port 0 is used, and if not, transmit diversity MBSFN subframe: a single antenna port, a port 7 |
|  | DCI format 2C | UE-specific by a C-RNTI | layer transmission up to a maximum of 8, ports 7-14 |

If UE is configured by a higher layer so that it decodes a PDCCH with CRC scrambled by an SPS C-RNTI, the UE decodes a PDCCH of a primary cell and a corresponding PDSCH of the primary cell according to each combination defined in Table 11 below. If a PDSCH is transmitted without a corresponding PDCCH, the same PDSCH-related configuration is applied. The PDSCH corresponding to the PDCCH and the PDSCH not having a PDCCH is scrambling-initialized by the SPS C-RNTI.

If UE is configured as the transmission mode 7, a PDCCH (s) and a corresponding UE-specific reference signal is scrambling-initialized by an SPS C-RNTI.

If UE is configured as the transmission mode 9, when the UE detects a PDCCH with CRC scrambled by an SPS C-RNTI on which the DCI format 1A or 2C intended for the UE is carried or a PDSCH configured without a PDCCH intended for the UE, the UE decodes a corresponding PDSCH in a subframe indicated by a higher layer parameter "mbsfn-SubframeConfigList." However, the subframe configured a higher layer to decode a PMCH or, the subframe configured by a higher layer to be part of a PRS occasion and the PRS occasion is configured only within an MBSFN subframe and the CP length used in a subframe #0 is a common CP is excluded.

Table 11 illustrates a PDCCH and PDSCH configured by an SPS C-RNTI.

TABLE 11

| TRANSMISSION MODE | DCI FORMAT | SEARCH SPACE | METHOD FOR SENDING PDSCH CORRESPONDING TO PDCCH |
|---|---|---|---|
| Mode 1 | DCI format 1A | common and UE-specific by a C-RNTI | a single antenna port, a port 0 |
|  | DCI format 1 | UE-specific by a C-RNTI | a single antenna port, a port 0 |
| Mode 2 | DCI format 1A | common and UE-specific by a C-RNTI | transmit diversity |
|  | DCI format 1 | UE-specific by a C-RNTI | transmit diversity |
| Mode 3 | DCI format 1A | common and UE-specific by a C-RNTI | transmit diversity |
|  | DCI format 2A | UE-specific by a C-RNTI | transmit diversity |
| Mode 4 | DCI format 1A | common and UE-specific by a C-RNTI | transmit diversity |
|  | DCI format 2 | UE-specific by a C-RNTI | transmit diversity |
| Mode 5 | DCI format 1A | common and UE-specific by a C-RNTI | transmit diversity |
| Mode 6 | DCI format 1A | common and UE-specific by a C-RNTI | transmit diversity |
| Mode 7 | DCI format 1A | common and UE-specific by a C-RNTI | a single antenna port, a port 5 |
|  | DCI format 1 | UE-specific by a C-RNTI | a single antenna port, a port 5 |
| Mode 8 | DCI format 1A | common and UE-specific by a C-RNTI | a single antenna port, a port 7 |
|  | DCI format 2B | UE-specific by a C-RNTI | a single antenna port, a port 7 or 8 |
| Mode 9 | DCI format 1A | common and UE-specific by a C-RNTI | a single antenna port, a port 7 |
|  | DCI format 2C | UE-specific by a C-RNTI | a single antenna port, a port 7 or 8 |

If UE is configured by a higher layer so that it decodes a PDCCH with CRC scrambled by a temporary C-RNTI and is configured to not decode a PDCCH with CRC scrambled by a C-RNTI, the UE decodes a PDCCH and a corresponding PDSCH according to a combination defined in Table 12. The PDSCH corresponding to the PDCCH(s) is scrambling-initialized by the temporary C-RNTI.

Table 12 illustrates a PDCCH and a PDSCH configured by a temporary C-RNTI.

TABLE 12

| DCI FORMAT | SEARCH SPACE | METHOD FOR SENDING PDSCH CORRESPONDING TO PDCCH |
|---|---|---|
| DCI format 1A | common and UE-specific by a temporary C-RNTI | If the number of PBCH antenna ports is 1, a single antenna port, a port 0 is used, and if not, transmit diversity |
| DCI format 1 | UE-specific by a temporary C-RNT | If the number of PBCH antenna ports is 1, a single antenna port, a port 0 is used, and if not, transmit diversity |

UE Procedure for PUSCH Transmission

UE is semi-statically configured through higher layer signaling so that it performs PUSCH transmission signaled through a PDCCH according to any one of two types of uplink transmission modes 1 and 2 defined in Table 13 below. If the UE is configured by a higher layer so that it decodes a PDCCH with CRC scrambled by a C-RNTI, the UE decodes the PDCCH according to a combination defined in Table 13 and sends the corresponding PUSCH. The PUSCH transmission corresponding to the PDCCH(s) and the PUSCH retransmission for the same transport block is scrambling-initialized by the C-RNTI. The transmission mode 1 is a default uplink transmission mode until an uplink transmission mode is assigned in the UE by higher layer signaling.

When UE is configured as the transmission mode 2 and receives a DCI format 0 uplink scheduling grant, the UE assumes that PUSCH transmission is related to a transport block 1 and a transport block 2 is disabled.

Table 13 illustrates a PDCCH and a PUSCH configured by a C-RNTI.

TABLE 13

| TRANSMISSION MODE | DCI FORMAT | SEARCH SPACE | METHOD FOR SENDING PUSCH CORRESPONDING TO PDCCH |
|---|---|---|---|
| mode 1 | DCI format 0 | common and UE-specific by a C-RNTI | a single antenna port, a port 10 |
| mode 2 | DCI format 0 | common and UE-specific by a C-RNTI | a single antenna port, a port 10 |
|  | DCI format 4 | UE-specific by a C-RNTI | closed-loop spatial multiplexing |

If UE is configured by a higher layer so that it decodes a PDCCH with CRC scrambled by a C-RNTI and also configured to receive a random access procedure started by a PDCCH order, the UE decodes the PDCCH according to a combination defined in Table 14 below.

Table 14 illustrates a PDCCH set as a PDCCH order for starting a random access procedure.

TABLE 14

| DCI FORMAT | SEARCH SPACE |
|---|---|
| DCI format 1A | common and UE-specific by a C-RNTI |

If UE is configured by a higher layer so that it decodes a PDCCH with CRC scrambled by an SPS C-RNTI, the UE decodes the PDCCH according to a combination defined in Table 15 below and sends a corresponding PUSCH. The PUSCH transmission corresponding to the PDCCH(s) and the PUSCH retransmission for the same transport block is scrambling-initialized by the SPS C-RNTI. PUSCH retransmission for the same transport block as the minimum transmission of a PUSCH without a corresponding PDCCH is scrambling-initialized by an SPS C-RNTI.

Table 15 illustrates a PDCCH and a PUSCH configured by an SPS C-RNTI.

TABLE 15

| TRANSMISSION MODE | DCI FORMAT | SEARCH SPACE | METHOD FOR SENDING PUSCH CORRESPONDING TO PDCCH |
|---|---|---|---|
| mode 1 | DCI format 0 | common and UE-specific by a C-RNTI | a single antenna port, a port 10 |
| mode 2 | DCI format 0 | common and UE-specific by a C-RNTI | a single antenna port, a port 10 |

If UE is configured by a higher layer so that it decodes a PDCCH scrambled by a temporary C-RNTI regardless of whether the UE has been configured to decode a PDCCH with CRC scrambled by a C-RNTI, the UE decodes the PDCCH according to a combination defined in Table 16 and sends a corresponding PUSCH. The PUSCH corresponding to the PDCCH(s) is scrambling-initialized by the temporary C-RNTI.

If a temporary C-RNTI is set by a higher layer, PUSCH transmission corresponding to a random access response grant and PUSCH retransmission for the same transport block are scrambled by the temporary C-RNTI. If not, the PUSCH transmission corresponding to the random access response grant and the PUSCH retransmission for the same transport block are scrambled by a C-RNTI.

Table 16 illustrates a PDCCH configured by a temporary C-RNTI.

TABLE 16

| DCI FORMAT | SEARCH SPACE |
|---|---|
| DCI format 0 | common |

If UE is configured by a higher layer so that it decodes a PDCCH with CRC scrambled by a TPC-PUCCH-RNTI, the UE decodes the PDCCH according to a combination defined in Table 17 below. In Table 17, indication "3/3A" means that UE receives the DCI format 3 or a DCI format depending on a configuration.

Table 17 illustrates a PDCCH configured by a TPC-PUCCH-RNTI.

TABLE 17

| DCI FORMAT | SEARCH SPACE |
| --- | --- |
| DCI formats 3/3A | common |

If UE is configured by a higher layer so that it decodes a PDCCH with CRC scrambled by a TPC-PUSCH-RNTI, the UE decodes the PDCCH according to a combination defined in Table 14 below. In Table 18, indication "3/3A" includes that UE receives the DCI format 3 or a DCI format depending on a configuration.

Table 18 illustrates a PDCCH configured by a TPC-PUSCH-RNTI.

TABLE 18

| DCI FORMAT | SEARCH SPACE |
| --- | --- |
| DCI formats 3/3A | common |

Buffer Status Reporting (BSR)

A buffer status reporting procedure may be used to provide information regarding an amount of data available (or valid) for transmission from UL buffers of a UE to a serving eNB. An RRC may control BSR reporting by configuring two timers, and here, the two timers may be periodicBSR-Timer and retxBSR-Timer. Also, the RRC may control BSR reporting by signaling a logical channel group (logicalChannelGroup, LCG) for selectively allocating a logical channel for the LGC.

For the BSR procedure, the UE should consider all the radio bearers which are not suspended. Also, here, the UE may consider suspended radio bearers.

The BSR may be triggered when any one of the following events occurs.

In case where UL data (regarding a logical channel which belongs to the LCG) is transmittable from an RLC entity or a PDCP entity, in case where data belonging to a logical channel having priority higher than priority of a logical channel that belongs to a specific LCG is already transmittable or in case where there is no transmittable data for (or through) any one of logical channels belonging to the LCG (that is, in case where BSR corresponds to/or is designated as "regular BSR" described hereinafter).

In case where UL resources are allocated and the number of padding bits is equal to or greater than a size obtained by adding a BSR MAC control element and a subheader thereof (that is, in case where the BSR corresponds to/or is designated as "Padding BSR" described hereinafter)

In case where retxBSR-Timer expires and the UE has transmittable data regarding a logical channel that belongs to the LCG (that is, in case where BSR corresponds to/designated as "Regular BSR")

In case where periodicBSR-Timer expires (That is, in case where BSR corresponds to/is designated as "Periodic BSR" described hereinafter)

In the case of Regular and Periodic BSR:

If one or more LCGs have transmittable data within a TTI in which the BSR is transmitted: Long BSR is reported.

In other cases, short BSR is reported.

In the case of Padding BSR:

1) If the number of padding bits is equal to or greater than a size obtained by adding the short BSR and a subheader thereof and smaller than a size obtained by adding a long BSR and a subheader thereof In case where one or more LCGs have data transmittable within a TTI in which the BSR is transmitted: a truncated BSR of the LCG having a logical channel with highest priority in which transmittable data is transmitted is reported.

In other cases: short BSR is reported.

2) Besides, in case where the number of padding bits is equal to or greater than a size obtained by adding a long BSR and a subheader thereof: the long BSR is reported.

In case where at least one BSR is triggered and determined that it is not canceled in a BSR procedure:

1) In case where the UE has UL resource allocated for new transmission in a corresponding TTI:

It instructs multiplexing and assembly procedure to generate a BSR MAC control element.

periodicBSR-Timer is started or re-started, except for a case where every generated BSR is a truncated BSR.

retxBSR-Timer is started or re-started.

2) Besides, in case where a Regular BSR is triggered:

In case where a UL grant is not configured or a regular BSR is not triggered due to data transmittable through a logical channel (here, the logical channel is a channel set in SR masking(logicalChannelSR-Mask) by an upper layer): Scheduling request is triggered.

When the regular BSR and the periodic BSR has priority over a padding BSR, even when a plurality of events triggering BSR until the BSR is transmittable occur, a MAC PDU includes a maximum of one MAC BSR control element. When the UE is instructed to approve regarding transmission of new data of any UL-SCH, the UE may start or re-start retxBSR-Timer.

All the triggered BSRs may accommodate every pending transmission data of UL grant of a subframe but may be canceled when it is not sufficient for additionally accommodating the sum of a BSR MAC control element and a subheader thereof. All triggered BSRs may be canceled when a BSR is included in the MAC PDU for transmission.

The UE may transmit a maximum of one regular/periodic BSR within one TTI. If the UE is requested to transmit a plurality of MAC PDUs within one TTI, the UE may include a padding BAR in any one of MAC PDUs not including the regular/periodic BSR.

All BSRs transmitted within one TTI may always reflect a buffer state after all MAC PDUs configured for the TTI are transmitted. Each LCG may report a maximum of one buffer state value, and the value may be reported in every BSR report buffer state for the LCGs. The padding BSR is not permitted to cancel a triggered regular/periodic BSR. The padding BSR is triggered only for a specific MAC PDU, and the trigger is canceled when the MAC PDU is configured.

D2D (Device-to-Device) Communication

FIG. 19 shows elements regarding a scheme of direct communication between terminals (D2D).

In FIG. 19(a), the UE refers to a terminal of a user, and in case where network equipment such as an eNB transmits and receives a signal according to a communication scheme with a UE, the corresponding network equipment may also be regarded as a UE. Hereinafter, UE1 may select a resource unit corresponding to a specific resource within a resource pool indicating a set of resources and operates to transmit a D2D signal using the corresponding resource unit. A UE2, which is a receiving UE thereof, configures a resource pool in which a UE1 may transmit a signal and detects a signal of the UE1 in the corresponding pool. Here, the resource pool may be notified by a BS when the UE1 is within a connection range of the BS, and may be informed by another UE or determined as a predetermined resource when it is outside the connection range of the BS. In general, a resource pool may include a plurality of resource units, and each UE may select one or a plurality of resource units to use the same to transmit a D2D signal thereof.

FIG. 19(b) illustrates a configuration of resource units. A total of N_F*N_T resource units may be defined by dividing the entire frequency resources into N_F and the entire time resources into N_T. Here, it may be expressed that the corresponding resource pool is repeated at intervals of N_T subframes. Characteristically, one resource unit may appear repeatedly periodically as shown in the drawing. Or, an index of a physical resource unit to which one logical resource unit is mapped may change in a predetermined pattern over time in order to obtain a diversity effect in the time or frequency domain. In this resource unit structure, the resource pool may refer to a set of resource units which may be used by the UE to transmit the D2D signal.

The resource pools described above may be subdivided into various kinds. First, the resource pools may be divided according to the content of a D2D signal transmitted in each resource pool. For example, the content of the D2D signal may be divided as follows, and a separate resource pool may be configured for each signal.

Scheduling assignment (SA): A signal including a position of a resource used for transmission of a D2D data channel performed by each transmitting UE, and information such as a modulation and coding scheme (MCS) required for demodulating other data channels, a MIMO transmission scheme and/or timing advance, and the like. This signal may also be multiplexed and transmitted along with the D2D data on the same resource unit. In this disclosure, the SA resource pool may refer to a pool of resources in which the SA is multiplexed and transmitted with the D2D data, and may also be referred to as a D2D control channel.

D2D data channel: A resource pool used by a transmitting UE to transmit user data using a resource designated through an SA. When it is possible to be multiplexed and transmitted together with the D2D data on the same resource unit, only a D2D data channel without the SA information may be transmitted in the resource pool for the D2D data channel. In other words, the resource element, which was used to transmit the SA information on the individual resource unit in the SA resource pool, may be used to transmit D2D data in the D2D data channel resource pool.

Discovery channel: A resource pool for a message to which a transmitting UE transmits information such as its own ID, or the like, so that a neighboring UE may discover the transmitting UE.

Contrary to the above case, even when the content of the D2D signal is the same, different resource pools may be used depending on the transmission/reception properties of the D2D signal. For example, even the same D2D data channel or a discovery message may be classified into different resource pools depending on a transmission timing determination scheme of the D2D signal (for example, whether it is transmitted at a time point when a synchronization reference signal is received or whether it is transmitted by applying a certain timing advance at the corresponding time point), a resource allocation scheme (e.g., whether the eNB designates transmission resource of an individual signal to an individual transmitting UE or whether an individual transmitting UE selects an individual signaling transmission resource by itself from the pool), a signal format (e.g., the number of symbols of each D2D signal which occupy one subframe, or the number of subframes used for transmission of one D2D signal), signal strength from the eNB, strength of transmission power of the D2D UE, and the like.

In this disclosure, a method in which the eNB directly indicates a transmission resource of a D2D transmitting UE in D2D communication will be called/defined as Mode 1 and a method in which a transmission resource region is set in advance, the eNB designates a transmission resource region, and a UE directly selects a transmission resource will be called/defined as Mode 2. In the case of D2D discovery, a case in which the eNB directly indicates resource will be called/defined as Type 2 and a case in which the UE directly selects transmission resource in a preset resource region or a resource region indicated by the eNB will be called/defined as Type 1.

The afore-mentioned D2D may also be called a sidelink, the SA may be called a physical sidelink control channel (PSCCH), a D2D synchronization signal may be called a sidelink synchronization signal (SSS), a control channel for transmitting most basic information prior to D2D communication transmitted together with the SSS may be called a physical sidelink broadcast channel (PSBCH), or a PD2DSCH (Physical D2D synchronization channel) by a different name. A signal indicating that a specific terminal is in its vicinity, which may include an ID of a specific terminal, may be called a physical sidelink discovery channel (PSDCH).

In D2D of Rel. 12, only a D2D communication UE transmits the PSBCH together with the SSS, and therefore, measurement of the SSS is performed using a DMRS of the PSBCH. An out-coverage UE measures the DMRS of the PSBCH and measures a reference signal received power (RSRP) of the signal to determine whether the UE will become a synchronization source.

Quasi Co-Located (QCL) Between Antenna Ports

Referring to QCL relationship, as for two antenna ports, for example, if large-scale property of a wireless channel in which one symbol is transferred through one antenna port may be inferred from a wireless channel in which one symbol is transferred through the other antenna port, it can be said that the two antenna ports are in a QCL relation (or QCL-ed). In this case, the large-scale property includes one or more of delay spread, Doppler spread, Doppler shift, average gain, and average delay.

That is, if two antenna ports have a QCL relation, it means that the large-scale property of a wireless channel from one antenna port is the same as the large-scale property of a wireless channel from the other antenna port. Assuming that a plurality of antenna ports in which an RS is transmitted is taken into consideration, if antenna ports on which two types of different RSs are transmitted have a QCL relation, the large-scale property of a wireless channel from one antenna port may be replaced with the large-scale property of a wireless channel from the other antenna port.

In accordance with the concept of the QCL, a UE may not assume the same large-scale property between wireless channels from corresponding antenna ports with respect to non-QCL antenna ports. That is, in this case, the UE may perform independent processing on timing acquisition and tracking, frequency offset estimation and compensation, delay estimation, and Doppler estimation for each configured non-QCL antenna port.

There are advantages in that UE can perform the following operations between antenna ports in which QCL may be assumed.

With respect to the Delay spread and Doppler spread, the UE may identically apply the results of a power-delay profile, Delay spread and Doppler spectrum, and Doppler spread estimation for a wireless channel from any one antenna port to a Wiener filter which is used upon channel estimation for a wireless channel from other antenna ports.

With respect to the Frequency shift and received timing, the UE may perform time and frequency synchronization on any one antenna port and then apply the same synchronization to the demodulation of other antenna ports.

With respect to the Average received power, the UE may average reference signal received power (RSRP) measurement for two or more antenna ports.

For example, if a DMRS antenna port for downlink data channel demodulation has been QCL-ed with the CRS antenna port of a serving cell, UE may apply the large-scale property of a wireless channel estimated from its own CRS antenna port upon channel estimation through the corresponding DMRS antenna port, in the same manner, thereby improving reception performance of a DMRS-based downlink data channel.

The reason for this is that an estimation value regarding a large-scale property can be more stably obtained from a CRS because the CRS is a reference signal that is broadcasted with relatively high density every subframe and in a full bandwidth. In contrast, a DMRS is transmitted in a UE-specific manner with respect to a specific scheduled RB, and the precoding matrix of a precoding resource block group (PRG) unit that is used by an eNB for transmission may be changed. Thus, a valid channel received by UE may be changed in a PRG unit. Accordingly, although a plurality of PRGs has been scheduled in the UE, performance deterioration may occur when the DMRS is used to estimate the large-scale property of a wireless channel over a wide band. Furthermore, a CSI-RS may also have a transmission cycle of several several tens of ms, and each resource block has also low density of 1 resource element for each antenna port in average. Accordingly, the CSI-RS may experience performance deterioration if it is used to estimate the large-scale property of a wireless channel.

That is, by assuming the QCL assumption between antenna ports, the UE may utilize it in the detection/reception, channel estimation, and channel state report of a downlink reference signal.

Multi-Cell Multicast/Broadcast Method

The present invention considers a method whereby broadcast and/or multicast transmission in which a network transmits the same data to a plurality of UEs through downlink (DL) and a unicast transmission in which a network transmits data only to a single UE effectively coexist. In particular, the present invention proposes a low complexity/high efficiency transmission method by proposing a frequency-selective QCL scheme and an SFN transmission scheme as broadcast and multicast transmission methods.

Here, broadcast and multicast may be expressed as a form in which one cell transmits data in an RS and format similar to existing unicast transmission, or a form in which a plurality of cells transmit the same data together using a separate RS and format (in particular, an RS and format configured such that signals received from a plurality of cells are appropriately combined) different from unicast. The former may be called a single-cell point-to-multipoint (SC-PTM) and the latter may be called a multicast and broadcast in single frequency network (MBSFN).

Particularly, in the present invention, a wireless communication environment in which vehicle-to-everything (V2X) is performed using a wireless channel is considered. V2X includes communication between a vehicle and every entity such as vehicle-to-vehicle (V2V) designating communication between vehicles, vehicle-to-infrastructure (V2I) designating communication between a vehicle and an eNB or a road side unit (RSU) vehicle-to-pedestrian (V2P) which refers to communication between a vehicle and a user equipment (UE) carried by an individual (e.g., a pedestrian, a bicycle driver, a vehicle driver, or a passenger). However, the present invention is not limited to UEs that perform V2X and may also be applied to general UEs in the same manner.

Multicast/broadcast is effective for quickly transmitting data generated at a specific location to a plurality of UEs near a corresponding location.

As an example of such a case, a UE installed in an automobile may provide data (for example, data indicating that the automobile is broken down) including a series of information related to an operation to a UE installed in a nearby automobile. Such data need not be delivered to a UE which is far from the UE where the corresponding data is generated but it is needs to be delivered to many UEs within a predetermined area at a time, and thus, preferably, cells that belong to the corresponding area broadcast/multicast the corresponding data.

In particular, in the case of data indicating a state of the automobile described above, since the automobile may move at a high speed, it is difficult for the network to recognize an exact location of each UE. In particular, in order to avoid frequent handover due to high-speed movement, a UE of a vehicle that does not need to communicate with the network separately may participate in the corresponding data transmission/reception in an RRC id (RRC_Idle) state. In this case, an RRM report from the UE of the automobile is not received, and thus, it is more difficult for the network to locate the UE.

Meanwhile, UEs that belong to a receiving area of one data may be distributed in a plurality of cells in case where a transmission UE is located at a cell boundary or data is information (for example, emergency information indicating occurrence of a collision accident) to be transmitted to UEs in a very wide area.

FIG. 20 is a diagram illustrating a multicast/broadcast transmission method according to an embodiment of the present invention.

FIG. 20 illustrates a situation where UE0 belonging to an area of a cell 0 generates data and delivers data to neighboring UEs (UE1 to UE4) nearby.

The UE0 transmits the data to an eNB of cell 0 which is an eNB close to the UE0, and upon receiving the data, the eNB knows that UE0 is within the area of cell 0 but it does not know a precise position therein. In this case, broadcast/multicast transmission may be performed in a cell belonging to a sufficiently large area so as to always include the UE0 data area by taking a more conservative operation. This will be described with reference to the following drawings.

In FIG. 20, cell 1 and cell 2 adjacent to cell 0 may participate in the broadcast/multicast transmission. Through this, all UEs within the data area of UE0 may receive broadcast/multicast transmission in which the eNB closest to all the UEs is participating.

Of course, there may be a UE, such as UE4, which belongs to the same cell as that of the UEs which belong to the data area of UE0 but does not belong to the data area of UE0, and although all areas does not overlap the data area of the UE0, like the cell 2 to which UE6 to UE7 belong, the cell 2 may need to participate in the broadcast/multicast.

In order to effectively perform the above-described operation, it is important to appropriately configure clusters of each data.

Here, the term cluster refers to a set of cells (or eNBs serving to the corresponding cells) that participate in multicast/broadcast of specific data, and eNBs belonging to one cluster may be synchronized and perform MBSFN transmission to transmit the same signal in the same resource or may transmit the same data as different signals in the form of SC-PTM in different resources.

If a size of the cluster is too small, a UE belonging to the data area may move out of the cluster. In particular, if data must be delivered with a high degree of reliability, the cluster of each data must be able to sufficiently include UEs that belong to the range of each data.

On the other hand, if the size of the cluster is too large, network resources are wasted. Therefore, the cluster of each data should be set to an appropriate level.

In a situation in which data of one cell is transmitted in a cluster including a plurality of cells, if data generated in all the cells has respective clusters, the clusters will overlap each other and one cell will belong to a plurality of clusters. This means that even the same cells may belong to different clusters according to types of transmitted data, in particular, cells in which the transmitted data is generated. This will be described with reference to the following drawings.

FIG. 21 is a view for explaining a cluster according to an embodiment of the present invention.

As illustrated in FIG. 21, it is assumed that a cluster configured for data generated in one cell is a set of the corresponding cell and six adjacent cells surrounding the cell.

In this case, data generated in cell 0 may be transmitted in a cluster composed of cells 0, 1, 2, 3, 4, 5, and 6 in which A are marked, and data generated in cell 5 may be transmitted in a cluster composed of cells 5, 6, 0, 4, 14, 15, 16. Therefore, in the case of cells 0, 4, 5, and 6, they may be included in the cluster transmitting data of the cell 0 and may also be included in the cluster transmitting data of the cell 5 at the same time.

Meanwhile, an appropriate level of cluster size may also be determined by the size of each data area. Data with a relatively narrow area is sufficient for small clusters, while data with a large area will require a large cluster. This means that although a UE generates data at the same location, the cluster must be changed according to the type and area of the data.

Based on the example of the operation described above, the present invention proposes a scheme regarding in which transmission method to be applied for a plurality of cells to perform multicast/broadcast transmission when a set of cells participating in the multicast/broadcast.

As in the example of FIG. 21, a cluster may be configured in a form that a total of 7 cells corresponding to a 1-tier based on a specific cell participate in transmission.

Alternatively, more effectively, the present invention may be applied together with a method of reducing a set of cells participating in the multicast/broadcast transmission by a specific coordination between networks. In other words, when information that may focus more of the target coverage by a particular network coordination (e.g., with support by UE-type RSU and/or eNB-type RSU) regarding coverage requiring multicast/broadcast transmission, not all the 7 cells participate in transmission but only a small number of required cells (for example, adjacent 2 to 3 cells) may participate in multicast/broadcast, thereby significantly improving utilization of network resources.

Hereinafter, for convenience of description, a situation in which two cells of cell A and cell B participate in specific multicast/broadcast (that is, a single cluster is composed of cell A and cell B). However, it is obvious that the following technologies may be generalized and extendedly applied even to a situation where three or more cells such as cells A, B, C, . . . participate in specific multicast/broadcast.

In the following description of the present invention, the operation of the present invention, which is described with a cell, may be applied in the same manner by replacing the cell with a TP, and similarly, an operation of the present invention described with the TP may also be applied in the same manner by replacing the TP with a cell.

1. Method 1: Frequency-selective QCL (Quasi-Co-Location)

In this method, a cell A and a cell B may perform multicast/broadcast transmission while alternating between predetermined resource units. Here, a predetermined resource unit may be, for example, a resource block (RB) unit, an RB group of a predefined unit (for example, a physical resource block group (PRG), an RE unit, an RE group unit, a subcarrier unit, a subcarrier group unit, and the like. In particular, a frequency selective CoMP/DPS scheme proposed hereinafter may be defined such that transmission points (TPs) are alternately transmitted by RE (groups) (or subcarrier (groups) or may be set in a terminal.

Here, the same data content may be transmitted for each RB group, or different data contents may be transmitted. For example, a bit string to which channel coding is applied at a high coding rate (i.e., a bit string to which a parity bit is attached) is divided into a plurality of sub-bit strings, and each sub-bit string may be mapped to each RB group and transmitted.

For example, cell A may be transmitted in an odd-numbered RB, and cell B may be transmitted in an even-numbered RB. If the multicast/broadcast transmission is performed in units of specific single data (for example, PDSCH) and a UE receives the PDSCH, the UE may receive/decode data by applying different QCL assumptions to the odd-numbered RBs and the even-numbered RBs in receiving a specific single PDSCH. From this point of view, this method may be termed a "frequency-selective QCL (FSQ)".

If the corresponding data transmission is in the form of a DMRS-based PDSCH, information may be provided to a UE in the form that different CSI-RS resource indexes are QCL-ed with the corresponding DMRS for each of the classified RB groups (for example, in units of RBs) according to the FSQ. Alternatively, an RS which is QCL-ed with a DMRS may be provided in the form of information that it is QCL-ed with a CRS (i.e., a physical cell identity (PCI) may be indicated independently) directly, not a CSI-RS.

If the corresponding data transmission is in the form of a CRS-based PDSCH, the FSQ must use different specific CRSs (i.e., a physical cell identity (PCI) may be indicated independently) in channel estimation and PDSCH decoding by the classified RB groups. When this operation is applied, it may also be interpreted in the form that a sort of "frequency-selective rate matching (around CRS)" operation is applied.

Regarding control signaling information for allowing the UE to perform the FSQ-related operation, related information may be signaled through a specific DL-related DCI scheduling the corresponding PDSCH. For example, a specific FSQ field may be defined, and a specific state may be indicated to the terminal via the corresponding field. Here, the FSQ related information may be provided to the UE by higher layer signaling such as RRC signaling in advance for each state that may be indicated through the corresponding field. In this manner, the BS may dynamically indicate in which state indicated information is to follow through the corresponding DCI regarding each state set by RRC signaling, or the like. The information that may be RRC-indicated for each state in the FSQ field may include at least one of the following information elements:

If DMRS-based PDSCH, QCL-ed NZP CSI-RS index(es) for the RB group #i (i=1, 2, . . . ) and/or PCI for QCL-ed CRS If CRS-based PDSCH, PCI for CRS demodulation for RBs for the RB group #i (i=1, 2, . . . )

Further, the BS may transmit information on the RB group #i (for example, it may be defined in the form of an RB bitmap or may be defined in a specific function form, and other various signaling viewpoint representation methods are possible) to the UE semi-statically by higher layer signaling. For example, as in the above example, semi-static signaling may be provided to the UE in the form that RB group #1 is defined with odd-numbered RB indexes and RB group #2 is defined with even-numbered RB indices. In addition, all the RB indexes belonging to each RB group may be distributed and set to the UE (for each RB group) in various forms and in a more flexible form.

Alternatively, the information on the RB group #i may be dynamically indicated as more dynamic information by defining a modified form of a resource Allocation (RA) field in the DCI.

The UE receiving the above signaling may receive/decode the corresponding PDSCH by applying different/independent QCLs (or CRS demodulation) to each RB group.

Through the above-described operation, improvement of UE reception performance by macro diversity may be expected.

In the above-mentioned operation, in the case of the UE located close to a specific cell (for example, cell A), strength of a signal within the RB group transmitted by the cell A may be stronger and strength of a signal within the RB group transmitted by the cell B may be very weak.

In this case, the corresponding PDSCH must actually be decoded only with information transmitted within the corresponding RB group transmitted by the cell A (by puncturing an information amount close to half of the information), and only the information transmitted in the corresponding RB group transmitted by the cell A needs to be decoded may occur.

However, since the cell A transmits data only by using resources in the corresponding RB group, transmission power that may be transmitted to other RBs may be given to signal transmission in the corresponding RB group to transmit power-boosted data. Also, since the UE in the above example is located close to the cell A, signal-to-interference-plus-noise ratio (SINR) quality may be very good, and thus, if the PDSCH to which an appropriate coding rate is applied such that the signal reception is successful is transmitted, there may be no problem in operation. In other words, if a high coding rate is applied, many parity bits are attached, and thus, although only a part of the parity bits is received, it may be transmitted with strong power and may be more accurately received, whereby the corresponding PDSCH may be successfully decoded.

To this end, for example, a specific upper limit value of the coding rate at the time of transmitting the PDSCH in the above operation may be defined or set in the terminal. For example, the upper limit may be as much as 1/2, preferably less than 1/2 (i.e., since many parity bits are needed).

More characteristically, this value may be defined/configured differently depending on how many cells participate in the multicast/broadcast transmission (the coding rate may be reduced or increased as the number of cells participating in the multicast/broadcast transmission is increased). For example, when two cells of cell A and cell B participate in, the upper limit may be defined or set as a value smaller than 1/2 (e.g., 1/3) in the UE.

2. Method 2: Single-Frequency Network (SFN) Transmission

The second method is a form of SFN transmission between the selected cell A and cell B. In this case, for example, in the case of DMRS-based PDSCH transmission, information of a specific CSI-RS (and/or CRS) capable of making QCL assumption with the corresponding DMRS needs to be set, and to this end, a method in which separate (different) CSI-RS resources are allocated and actually transmitted to A and cell B transmitted together in the SFN form at the network level may be considered.

The SFN transmission scheme described below may be understood as covering a detailed transmission option that implements the SFN transmission scheme. For example, it is possible to apply a simplest non-coherent joint transmission (JT) scheme in which multiple TPs performing SFN transmission simply transmit the completely same data packet.

Alternatively, in actual transmission of the same data, it may be modified and applied such as transmission based on SFBC (Space Frequency Block Coding), or the like. For example, TP1 and TP2 may carry out transmission based on SFBC coding previously defined or set to an RE level (or specific RE group level). In this case, it may be applied based on the SFBC scheme currently supported by the LTE standard or may be applied in a similar STBC form.

Alternatively, it may be applied in a form in which the TPs transmit data alternately by alternating ports at a port level, as in some method described below.

Alternatively, a form in which each TP is divided and transmitted (or alternately) by (MIMO) layers at a layer level may be applied. For example, Cell A performs 2-layer transmission, Cell B performs 2-layer transmission, and the UE may combine them to perform 4-layer reception.

However, if different (different) CSI-RS resources are allocated to cell A and cell B, very large network resources may be wasted. That is, it means that, considering that the cell A and the cell B in the above example perform multicast/broadcast together, a separate CSI-RS resource AB must occupy resources at the network level and transmit CSI-RS. In addition, since there may be many inter-cell combinations (e.g., cell A and C, cell A/B/D, etc.), if all of the separate CSI-RS resources to be transmitted by the combinations of the cells and the CSI-RS is transmitted in the corresponding resource, network overhead is too large.

Thus, in the present invention, even in the situation in which data transmission in the SFN form between the cell A and cell B is considered, QCL-assumable specific RSs (e.g., CSI-RSs) therefor may be transmitted by individual cell units. Accordingly, the UE may re-calculate estimated large-scale parameters of wireless channels of respective cells obtained in individual cell units in the form of adding (the parameters from cells within a corresponding selected cluster) by a specific combining function and utilize it to receive/decode corresponding data.

Here, as the large-scale parameters, at least one of {delay spread, Doppler spread, Doppler shift, average gain, average delay} may be included.

Hereinafter, for convenience of explanation, the parameters estimated from the cell A will sequentially be referred to as DelaySpread_A, DopplerSpread_A, DopplerShift_A, AverageGain_A, and AverageDelay_A, and the parameters estimated from the cell B will sequentially be referred to as DelaySpread_B, DopplerSpread_B, DopplerShift_B, AverageGain_B, AverageDelay_B.

If the UE is scheduled with multicast/broadcast based on the SFN transmission between the cell A and the cell B with the parameters individually estimated for each cell as described above, large-scale parameters re-calculated through the following calculation method may be calculated for each of the five parameters and applied to data reception/decoding.

Values averaged in the form of (DelaySpread_A+DelaySpread_B)/2 may be applied as a delay spread parameter. Alternatively, the values may be combined in the form of a specific weighted average. This is due to the effect that delay spread from each cell is seen to the UE in the averaged form when SFN transmission occurs between cells A and B in practice.

Values averaged in the form of (DopplerSpread_A+DopplerSpread_B) may be applied as a DopplerSpread parameter. Alternatively, the values may be combined in a specific weighted average form. This is due to the effect that the DopplerSpread from each cell is seen to the UE in the averaged form when the SFN transmission occurs between cells A and B in practice.

Values averaged in the form (DopplerShift_A+DopplerShift_B)/2 may be applied as a DopplerShift parameter. Alternatively, the values may be combined in a specific weighted average form. This is due to the effect that DopplerShift from each cell is seen to the UE in the averaged form when SFN transmission occurs between cells A and B in practice.

Values summed in the form of AverageGain_A+AverageGain_B may be applied as an AverageGain parameter. Or, values averaged in the form (AverageGain_A+AverageGain_B)/2 may be applied as an AverageGain parameter or may be combined in a specific weighted average form. This is due to the fact that the values of AverageGain from each cell are seen to the UE in a summed or averaged form when SFN transmission occurs between cells A and B in practice.

Values averaged in the form of AverageDelay_A+AverageDelay_B may be applied as an AverageDelay parameter. Alternatively, the values may be combined in a specific weighted average form. This is due to the fact that the values of AverageDelay from each cell are seen to the UE in a specific averaged form when the SFN transmission occurs between cells A and B in practice.

If the corresponding data transmission is in the form of CRS-based PDSCH, PCI information lists for a CRS for each cell may be provided to the UE through DCI signaling and/or RRC signaling for multiple cells indicated by "SFN transmission". Also, the terminal estimates the large-scale parameters of the radio channels acquired for each PCI, combines the large-scale parameters according to the above-described method to calculate parameters, and receives/decodes the SFN transmitted data with the calculated parameters.

The control signaling information for allowing the UE to perform the "SFN transmission (SFNT)-related operation may be signaled through a specific DL-related DCI for scheduling the corresponding PDSCH. For example, a specific SFNT field may be defined and a specific state may be indicated to the UE through the corresponding field. Here, the SFNT-related information may be provided to the UE by higher layer signaling such as RRC signaling in advance for each state that may be indicated through the corresponding field. In this manner, the BS may dynamically indicate in which state indicated information is to follow through the corresponding DCI regarding each state set by RRC signaling, or the like. The information that may be RRC-indicated for each state in the SFNT field may include at least one of the following information elements:

If DMRS-based PDSCH, QCL-ed NZP CSI-RS indexes (at least two indexes may be known and may indicate SFN transmission between them) and/or PCIs for QCL-ed CRSs, and/or a specific cell/TP set which has been already defined or configured in the UE may be defined by a separate indicator (e.g., a (local-based) temporary mobile group identity (TMGI), an MBSFN area identifier (ID), etc.) or configured in the UE. And, the specific QCL and/or rate matching operation to be followed in the case of the indicator may be predefined or configured in conjunction with this indicator. The BS may also be applied in the form in which the QCL and/or RM are indicated by indicating the BS itself to the terminal.

If CRS-based PDSCH, PCIs for SFN-transmitted CRS(s) and/or a separate indicator (e.g., a (local-based) temporary mobile group identity (TMGI), an MBSFN area identifier (ID), etc.) for a specific cell/TP set already defined or configured in the UE. And, the specific QCL and/or rate matching operation to be followed in the case of the indicator may be predefined or configured in conjunction with this indicator. It may also be applied such that the BS may indicate the BS itself to the UE, thereby indicating the QCL and/or RM.

In receiving data that is multicast/broadcast by the "SFN transmission", in another possible embodiment, the terminal may not derive a final large-scale parameter by performing predetermined combining such as the abovementioned methods, and may apply only the parameter obtained for specific cell(s) determined to be most dominant among the large-scale parameters from each cell to detecting and/or decoding the corresponding SFN-transmitted PDSCH. In fact, this may be interpreted as a method that can be applied when a weight value is given to a specific cell (e.g., weight value 1 is applied to a parameter for a specific cell and weight value 0 is applied to a parameter for the other remaining cell(s)) in the "weighted average" method described above. That is, the weighted average method in the above description may be considered to include the method of giving the weight value only to a specific cell.

As a representative example, as a method for determining a specific dominant cell (or as a method for determining the weight value), it may be determined on the basis of specific measurement estimate values that may represent signal quality such as RSRP (reference signal received power), RSRQ (reference signal received quality) by cells. For example, a large-scale parameter for s cell with s largest value of RSRP, RSRQ, etc., may be determined as a final large-scale parameter.

When this method is explained using the case of the DMRS-based PDSCH as an example, it may be interpreted as a method of mapping a plurality of TPs (or cells) QCL-ed with the DMRS (which may correspond to the CSI-RS, for example) and demodulating using a corresponding TP with largest reception power by the UE. In particular, it may be effective when the TP that is QCL-ed to the same DMRS is far away, because signal intensity gap from the TP is large.

As a further proposed technique in the present invention, the following method may be applied to be utilized in the multicast/broadcast transmission.

1) Two TPs (or cells) transmit DMRS to different ports (e.g., port 7 and port 8) and data may be SFN-transmitted.

For example, data is transmitted to port 7, and TP 1 (or cell 1) may transmit a DMRS to port 7 and TP 2 (or cell 2) may transmit a DMRS to port 8. In this case, the UE may estimate the DMRS of the ports 7 and 8 respectively, form a final channel with their superposition, and demodulate the data of the port 7. In this manner, the QCL of each port may be obtained for each TP.

In other words, while transmitting the DMRS to port 7, TP1 also transmits data to which the same precoding is applied to the port 7, and, while transmitting the DMRS to the port 8 which is applied independent precoding different from TP1, TP2 also transmits data to which the same precoding is applied, to port 8. Here, the data transmitted by each TP may be transmitted together (i.e., SFN transmission) by sharing the data generated to be completely the same by backhaul signaling, etc. However, only precoding may be independently applied to be optimized for each TP.

The terminal independently estimates each port 7 and the port 8 and subsequently forms a final channel by superposition thereof, and applies it to data demodulation, thereby enabling demodulation of data transmitted in the SFN.

To this end, it is preferable that mutually orthogonal sequences may be applied to the port 7 and the port 8 (for example, port 7 is [1 1], port 8 is [1 −1]). In addition, the seed values for the DMRS of the port 7 and the DMRS of the port 8 should be the same (for example, the same virtual cell identity (VCID)). In order to enable such an operation, each DMRS port related configuration (e.g., including VCID configuration) needs to be signaled semi-statically (e.g., RRC signaling) and/or dynamically (e.g., by DCI).

If a degradation can be overcome by applying this operation with a quasi-orthogonal DMRS (for example, by appropriate beam separation and/or interference suppression of UE), it may be applied in a form that sequences of port 7 and port 8 are generated by independent (i.e., different) VCIDs.

In the proposed scheme, mapping to RS resources (for example, time/frequency RE position, and/or code-domain resource (For example, OCC [11] or [1 −1], or CDM pairs as a form including an extension to other lengths, such as OCC length 4, etc.)) is defined in a different form or configured in the UE in the RS port index (e.g., port 7 or port 8, etc.) by TPs (or cells).

That is, the different ports in the above description means that they are set with the same port index (e.g., port 7) (from the point of view of the UE) and a DMRS to which the corresponding port is mapped may be configured in a different form and provided. In other words, the same port index is set in TP1 and TP2, but the UE may regard/assume that different DMRS resources are mapped to each TP.

A representative possible method may be applied by indicating/configuring so that the terminal changes a specific DMRS configuration table to a separate table (e.g., table indicating different port-to-resource mapping) through signaling (e.g., RRC or DCI) indicating/configuring "port swapping", or the like. In addition, it should be understood that, through various signaling forms, similar variations are also included in the scope of the present invention such that a terminal differently understands mapping to the DMRS resources, in spite of the same DMRS port.

2) Data may be transmitted to rank 2, and each layer may be handled and transmitted by each TP. However, one codeword may be transmitted over two layers (this is similar to a codeword-to-layer mapping in a conventional rank 2 PDSCH retransmission).

In this case, since the coding rate is doubled in the process of becoming rank 2, even if the UE is close to one TP, the coding rate only returns to the original rate, and the problem mentioned above in (**) in which coding rate is halved may be avoided.

For example, if data information bits are assumed to be 100 bits, it may be extended to 400 bits by applying the coding rate 1/4 and each TP may handle and transmit by 200 bits. Then, although the UE is close to one TP and only 200 bits are successfully received from the corresponding TP, the substantial coding rate in this case is 1/2, so that the problem mentioned in (**) may be avoided.

In another embodiment, for example, when data information bits are 100 bits, it may be extended to 200 bits by applying a coding rate 1/2, and the data information bits are equally copied so that each TP may transmit the same 200 bits. Here, if each TP transmits it in this state, it corresponds to the data SFN transmission like the above 1) method. Thus, here, each TP may additionally apply dependent specific scrambling to each 200 bits and transmit the same. This scrambling may be applied by a corresponding TP-specific VCID, and in case where each TP is a separate cell, scrambling may be applied to the corresponding PCI. In addition, more characteristically, descrambling may be performed in a step before demodulation.

This differs from that scrambling/descrambling is performed on a (coded) bit stream. That is, in the proposal of the present invention, scrambling/descrambling is performed on a modulated symbol stream, and since the modulated symbols are complex valued symbols, so that it may be interpreted as turning (i.e., changing) a phase in a scrambling form. In this manner, the fact that scrambling was applied may be semi-statically or dynamically signaled to the UE. In this manner, the phase is scrambled (i.e., changed) may be interpreted. Thus, the fact that scrambling is applied may be semi-static or dynamic signaling to the UE. In this manner, when the UE receives such a signal, the UE performs data reception by separately applying descrambling and combining data streams to advantageously enhance reception performance.

Regarding order of RE mapping the demodulated symbols instead of the scrambling, a rule may be determined for TP1 and TP2 to perform RE mapping in a specific different manner. Here, information regarding the different RE mapping may be informed to the UE. Thus, a randomization effect may be obtained.

For example, if TP1 follows order of first completing mapping in a frequency axis on the entire RB(s) scheduled by OFDM symbols and subsequently performing mapping on next OFDM symbols, TP2 may apply circular shifting such that mapping starts from a next index of a first OFDM symbol index and a finally mapping OFDM symbol index is circularly becomes a first OFDM symbol index.

Alternatively, TP2 may change interleaving order to "time first, then frequency second", not the form of "frequency first, then time second" in the related art as described above.

It is to be appreciated that similar variations applying scrambling in various forms are included in the scope of the present invention.

Hereinafter, a region where improvement is possible to obtain a performance gain of multi-cell multicast/broadcast will be described.

1. Introduction

A study item for LTE-based V2X is approved and feasibility and required enhancement of three V2X services, V2V, V2l and V2P are studied.

The need for improvement of multi-cell multicast/broadcast has been examined, and an improvement area for obtaining a performance gain will be described.

2. Overview of Multi-Cell Multicast/Broadcast

Most V2X messages need to be delivered to all UEs in a specific area (e.g., all UEs in a target range of a transmitter in the case of V2V and V2P). Thus, when LTE DL is used for the V2X operation, it is natural to consider a multicast/broadcast mechanism. Since multiple UEs are present in a cell, DL unicast for V2X message delivery may not be feasible.

LTE currently has a multimedia broadcast/multicast service (MBMS) for a multicast mechanism and specifies a single cell point-to-multipoint (SC-PTM) as another solution. One challenge in using DL broadcasts for V2X is the lack of reusability of spatial resources: Based on a location of a message generation UE, a V2X message generated in the cell needs to be delivered to the UE in a neighboring cell. FIG. 20 illustrates this situation. UE0 in cell 0 has generated a V2X message and the message needs to be delivered to UE2 and UE3 within coverage of cell 1 which is within a target range of UE0. Therefore, the network needs to broadcast the message of UE0 in both cell 0 and cell 1. Also, if cell 0 does not know an exact target range of the UE0 message, the network must transmit the corresponding message in the neighboring cell, possibly including cell 2 in FIG. 20. As a result, the same message needs to be redundantly transmitted in multiple cells, thereby reducing a possibility of reusing spatial resources of a cellular communication system.

FIG. 22 illustrates a broadcast transmission in a hexagonal cell layout according to an embodiment of the present invention.

Here, cells indicated by the same pattern constitute one cluster, and all the cells in the cluster transmit a message generated in the center cell of the cluster. All cells in the cluster transmit the same signal in the MBMS case, so inter-cell interference may disappear in each cluster. On the other hand, cells in the cluster transmit different signals and even if cells in the cluster transmit exactly the same message. inter-cell interference exists in the SC-PTM case. According to the operation in FIG. 22, a cell transmits a message generated in the cell, in one subframe among a set of seven subframes; The corresponding cell transmits the generated message in a neighboring cell within the six remaining subframes of the set. As a result, if all generated V2X messages are transmitted in this manner, actual traffic load of the LTE DL may be increased seven times and a problem may arise with broadcast channel capacity.

Although two existing mechanisms provide a basic operation of V2X message broadcasting, there is still room for further optimization from the physical layer viewpoint. Currently, MBMS is mainly designed for multimedia transmission over a wide area. Thus, the MBMS is not suitable for V2X services based on static resource allocation and entailing a demand for stringent latency/reliability and dynamic changes in traffic load. For example, when more vehicles are moving to a particular area or many event-triggered messages are generated at the same time, the amount of resources for V2X message transmission necessarily increases. In addition, a current MBMS operation with high RS (Reference Signal) and CP (Cyclic Prefix) overhead is unnecessary for transmission to medium-sized areas where the V2V message range is considered up to several hundred meters. SC-PTM may support dynamic resource allocation with less overhead. However, cell-by-cell transmission may not utilize benefit of MBSFN transmission from multiple cells that may provide higher quality to cell-boundary UEs, and when a target area is covered by multiple cells, it is not possible to avoid redundant transmission of the same message from multiple cells. Thus, it may be more useful to study options that may provide benefit of multi-cell transmission within the MBSFN type involving more dynamic scheduling and less overhead.

One possible enhancement for DL multicast/broadcast is to apply CoMP. As described above, target coverage of the V2X message is relatively small, so only a few cells need to participate in the transmission. Such a set of cells may form a cluster and cooperative transmissions may be made within each cluster. The following two options for multi-cell collaborative multicast/broadcast may be considered.

One cooperative option is joint transmission (JP), the effect of which is basically the same as MBSFN transmission where signals from multiple cells are combined in the air. A difference from MBMS is that it has lower overhead by using dynamic adaptation of time/frequency resources and general CP according to traffic transition.

One cooperative option is cooperative silencing expressed in FIG. 23. While the central cell is broadcasting if cells around the central cell remain silent, the range of the central cell may be extended to include the neighboring cell UEs within the target range of the message transmission.

In this multi-cell-cooperative multicast/broadcast, the PDSCH may be reused for a physical format.

Table 19 below compares the number of REs available for data transmission within a PRB pair.

If joint transmission uses a PDSCH structure while using the same multicast cluster as the MBMS and an MCS for joint transmission is set to be exactly the same as an MCS for the MBMS (that is, the semi-static MCS by higher layer signaling), it may be noted that joint transmission may achieve an SINR of MBMS and the same performance may be effectively provided with less resource consumption. For example, if MBMS uses five subframes per radio frame (i.e., 510 REs by PRB pairs per radio frame), almost the same coding rate may be provided by joint transmission with four subframes per radio frame (using the DMRS-based PDSCH in the MBSFN subframe), which means that 20% of DL resources is saved, while maintaining the same SINR.

In addition to notable gain in the DL resource reduction, if the MCS for joint transmission is dynamically set by the L1 scheduling grant, a further improved SINR may be achieved compared to MBMS in joint transport applications. The dynamic scheduling may be considered when considering reusing the PDSCH for the broadcast physical format.

TABLE 19

| | Number of available REs per PRB pair | Assumption: |
|---|---|---|
| PMCH | 102 | Normal CP in PDSCH 2 symbol PDCCH |
| CRS-based PDSCH (used for SC-PTM) | 132 | 2 port CRS No CSI-RS |

TABLE 19-continued

| | Number of available RES per PRB pair | Assumption: |
|---|---|---|
| DMRS-based PDSCH | 132 in MBSFN subframe 120 in non-MBSFN subframe | |

Observation 1: Capacity problems may arise when the LTE multicast/broadcast mechanism is used for V2X, if all messages are transmitted via DL with a limited bandwidth.

Observation 2: Multi-cell cooperative multicast/broadcast based on PDSCH format has a potential to improve V2V performance compared to existing MBMS and SC-PTM.

Proposal 1: V2X research needs to consider enhanced DL multicast/broadcast to enable dynamic multi-cell cooperative transmission with less overhead.

3. Discussion of Potential Improvement 3.1 Demodulation RS

It is necessary for a certain RS type to be determined for demodulation of multi-cell coordinated broadcast (MCCB). For MBMS, MBSFN RS is used for demodulation. For SC-PTM, CRS is used for demodulation, and here, TM (Transmission Mode) 1 or TM2 may be used to configure the SC-PTM. Although extending the existing SC-PTM to be applicable for the MCCB may be considered, MCCB may not be appropriate because it requires multi-cell joint transmission and a DMRS-based PDSCH format may be more appropriate for the MCCB.

More specifically, since TM10 uses the DMRS-based PDSCH and has several related characteristics based on the multi-cell cooperative transmission, a TM1-based operation may be the basis and may correspond to a time point for improvement to effectively support the MCCB.

Observation 3: Extending SC-PTM may be considered for MCCB, but CSR-based TM for SC-PTM is not suitable for MCCB.

Proposal 2: The DMRS-based PDSCH is used for MCCB transmission and the TM10-based enhancement needs to be considered as an additional study.

3.2 QCL (Quasi Co-Location)

Considering the MCCB corresponds to a type of joint transmission from multiple transmission points, and the existing UE operation under QCL (quasi co-location) assumption needs to be further studied. In particular, in TM10, the UE may be set to QCL Type A or Type B by RRC signaling. Here, Type A indicates that all RS ports configured for the UE necessarily have a QCL relationship with one another, and Type B indicates a single CSI-RS resource QCL-ed with a PDSCH DMRS within a given subframe, thereby allowing the UE to perform dynamic point selection (DPS) for PDSCH reception.

Since the QCL CSI-RS dynamically indicated by such DCI signaling is typically transmitted from a single cell, it may be evaluated that a legacy operation on their QCL assumptions was optimized for single cell transmission rather than multi-cell joint transmission. Therefore, how to provide appropriate QCL signaling to support the MCCB using the DMRS-based PDSCH needs to be studied. Paying attention to the Release-11 CoMP discussion, joint transmission having necessary QCL signaling was partially discussed, but mainly targets "coherent JT" based on CSI feedback from the UE. On the other hand, the MCCB for the V2X service is mainly based on open loop transmission due to high mobility of the UE, and thus, "non-coherent JT" is considered as a main target for the MCCB.

An open-loop type candidate for supporting the MCCB from a macroscopic point of view will be described in the next section.

Observation 4: An operation associated with legacy QCL signaling has been optimized to target single cell transmission Proposal 3: Appropriate improvement in a QCL operation is required to support the MCCB entailing the DMRS-based PDSCH of multi-cell joint transmission.

3.3 Open-Loop (OL) Precoding

As discussed above, an appropriate DMRS-based OL precoding scheme for MCCBs needs more discussion and it may be categorized into the following topics as a whole.

1) Technique for Obtaining Macro Diversity from Multi-Cell

Frequency selective DPS: Each cell participating in the MCCB may transmit in some of the scheduled RB (s). Here, the entire scheduled RBs may be partitioned in a predetermined manner.

(***) Such RB partitioning related information may be provided to the UE in advance (for example, through RRC signaling, or the like).

More characteristically, it is desirable for the UE to be able to receive an MCCB message even in an idle mode for the V2X service, so that information such as the RB partitioning related information may be included in system information and transmitted (For example, it may be included in a specific SIB).

Here, the RB partitioning related information may include information on which cell performs MCCB transmission to which RB(s) (i.e., RB information used for MCCB transmission by cells) and/or how QCL assumption to be assumed by the UE in this connection is varied by corresponding RB(s) (i.e., information about the QCL assumption applied to each RB).

Here, for example, the QCL assumption applied to each RB may include a scrambling seed value of a different RS which can be QCL-ed with a DMRS (for example, CSI-RS and/or CRS) and/DMRS and a corresponding RS resource index which can be QCL-ed with the DMRS. Here, regarding the corresponding RS resource indexes which can be QCL-ed with the DMRS, in a state in which a transmission resource position for receiving the corresponding RS and transmission time point/subframe-related configurations are separately provided by indexes in advance, QCL signaling may be delivered in the form of indicating cooperatively with an index related to the information.

More characteristically, as for this information, only information related to an RS transmitted by the corresponding cell may not be provided by an SIB transmitted by a certain cell belonging to the specific cluster but information regarding adjacent cell(s) (belonging to the corresponding cluster) may be provided together. Accordingly, even if the UE reads the SIB for a specific cell, it may immediately know information on neighboring cells (in the same cluster). Thus, there is an advantage in that latency is minimized in receiving the MCCB message, when high mobility of the V-UEs is considered. Related ECL assumptions are provided to the UE, and here, different QCLs may be applied to each cell to receive a single MCCB PDSCH.

Single frequency network (SFN) transmission: Multiple cells participating in the MCCB transmission may transmit the same MCCB PDSCH together so that they may be coupled in the air by the SFN transmission method. A difference from the MBMS transmission is that it includes a cluster including several cells having a smaller size as described above, a DMRS-based PDSCH, and further reduced RS overhead. When a shared-cell CSI-RS resource is used for such SFN transmission, since there is a large number of possible cell combinations corresponding to each CSI-RS resource, it causes a large CSI-RS overhead. To prevent such CSI-RS resource overhead, each cell may transmit its own CSI-RS and the UE may generate a combined estimated channel after each channel estimation for multiple cells in a given cluster.

2) Technique for Single Cell Open Loop MIMO (OL-MIMO) Precoding

In addition to the macro diversity scheme across multiple cells, it may be desirable that the MCCB PDSCH transmitted in each cell is generated by specific OL-MIMO precoding. In particular, RB-level and/or RE-level precoding cycling may be further considered to achieve frequency diversity.

Proposal 4: To achieve robust performance for MCCB transmission, a technique for obtaining macro diversity from multi-cells and OL-MIMO precoding in a single cell need to be further studied.

3.4 Coordinated Scheduling

Coordinated scheduling is required in a cell of a cluster for an MCCB, and here, two approaches may be considered as follows:

Approach 1: Semi-Static Schedule by Higher Layer Signaling

The MCCB transmission may be semi-statically scheduled by higher layer signaling without an L1 scheduling grant. Such higher layer signaling may include a scheduled subframe bitmap, resource allocation information, DMRS related configuration including a sequence generation parameter, an MCCB transmission related parameter, and a cell list that constitutes a local cluster for the MCCB entailing related QCL signaling. To support MCCB reception in an idle mode, such information needs to be provided via an SIB from a certain cell associated with the cluster.

As a detailed description related thereto, the proposed techniques added from the above (***) may be interpreted as a detailed proposed description related thereto.

For example, as for the scheduling information for MCCB transmission, not only information related to an RS transmitted by a corresponding cell via an SIB transmitted by a certain cell belonging to the specific cluster but information regarding adjacent cell(s) (belonging to the corresponding cluster) may be provided together. Thus, although the UE reads the SIB for a specific cell, it may immediately know information on neighboring cells (in the same cluster). Thus, there is an advantage in that latency is minimized in receiving the MCCB message, when high mobility of the V-UEs is considered.

Approach 2: Dynamic Scheduling by DCI Entailing Group RNTI for MCCB

The MCCB may be dynamically scheduled by the L1 scheduling grant, and here, the related DCI is preferably transmitted on a common search space. Such a DCI may be limited to a specific basic DCI format (e.g., format 1A) and preferably has the same payload size such that additional blind detection complexity is not increased. To have the same payload size, existing fields may be removed or replaced by new fields required for MCCB scheduling.

Further discussion is needed on how to determine a coordinated cluster having various cell combinations. An example based on FIGS. 22 and 23 is illustrated, and further optimization or modification needs to be employed. For example, optimization of cell clustering based on a location of message generation may be considered. In this case, the cluster may not always necessarily include seven cells as illustrated in FIG. 22 and may be dynamically include a pair of neighboring cells based on the location of message generation. As a result, a further improved system gain may be obtained as resource efficiency is increased.

Proposal 5: Coordinated scheduling method including semi-persistent or dynamic scheduling requires further discussion. Optimization of cell clustering may be considered based on a message generation location.

3.5 Power Saving Mechanism

In the case of V2P, a power saving mechanism for a pedestrian UE (P-UE) has to be developed as compared to a vehicle UE (V-UE: vehicle UE), which generally does not require battery saving. For example, it may be advantageous for the P-UE to receive information about whether the MCCB message is intended for transmission to the P-UE in other cells, as well as a serving cell of the P-UE to which the P-UE transmits an MCCB. This is because the MCCB message itself may be generated in neighboring cells. However, as described in FIG. 20, the serving cell may transmit a message together. If such information is provided to the P-UE, the UE may skip reception of the message and reduce battery consumption. Further discussion is needed as to how the location-based TX is informed to the P-UE and related information as well.

Proposal 6: Power saving mechanism for the pedestrian UE needs to be studied.

Hereinafter, an area where improvement is possible with respect to non-coherent joint transmission (JT) will be described.

1. Introduction

A study item on improvement of CoMP operation has been approved, and a performance gain for the following improvement technique related to a CoMP technique will be discussed.

Support of non-coherent JP (e.g., support for MIMO layer transmission based on different transmission points within a single user MIMO)

Expansion of beamforming and scheduling coordination on transmission point (CS/CB)

A goal related to the non-coherent JP and an improvement area will be discussed.

2. Discussion

CoMP was discussed in Release-11, and TM10 introduction was specified to support the CoMP operation. The TM10 supports the DCI format 2D in which a PDSCH RE mapping and quasi co-location indicator (PQI) field is newly added to the existing DCI format 2C associated with TM9. A UE for which TM10 is set may be set QCL Type A or Type B by RRC signaling, and here, Type A indicates that all RS ports set to the UE necessarily have a QCL relationship with each other, and Type B means a single CSI-RS resource QCL-ed with a PDSCH DMRS in a given subframe, whereby the UE performs dynamic point selection (DPS) for PDSCH reception.

In these legacy operations on the QCL assumption, since a dynamically pointed QCL CSI-RS based on DCI signaling is generally transmitted from a single cell/TP, it may be evaluated to be optimized for targeting single cell/TP transmission, rather than multi-cell/transmission point (TP). Also, in the Release-11 CoMP discussion, joint transmission having required QCL signaling was partially discussed but it mainly targeted "coherent JT" based on CSI feedback from the UE.

We classified the areas that could be improved for "non-coherent JT" as the following three approaches.

Approach #1: Frequency-Selective CoMP/DPS (Frequency-Selective CoMP/DPS)

In this type of technique, each participating TP in the CoMP is transmitted in some of the scheduled RB(s), and the entire scheduled RBs are partitioned in a predetermined manner. Related QCL and rate matching (RM) assumptions are provided to the UE, and here, different QCLs and RMs per TP may be applied to receive a single PDSCH. This transmission scheme may be associated with multiple CSI processes, and here, each CSI process corresponds to each participating TP in the CoMP, and the CQI may be derived by assuming a frequency-selective CoMP operation. Alternatively, a single CSI process configuration including multiple CSI-RS resources is used for such CSI reporting. Here, similar to the FD-MIMO Class B setting, the plurality of CSI-RS resources are included in the corresponding CSI process, but since CRI reporting that feeds back the best resource is not performed but each CSI-RS resource corresponds to each TP from the CSI reporting point of the UE, all of {RI, PMI} contents for each resource may be defined to be reported or set in the UE.

Alternatively, the UE may select and report the most optimal M CSI-RS resources among the plurality of set N number of CSI-RS resources (for example, M<=N), and all the reported {RI, PMI} contents for the M CSI-RS resources may be defined to be reported or set in the UE.

The CQI may be defined or configured in the UE such that a plurality of CQIs expected when multiple {RI, PMI} are all applied to transmission (for example, transmission based on a frequency-selective CoMP method) are collectively reported.

These non-coherent JP types provide high spectral efficiency, assuming that accuracy of the relevant CSI report is high enough.

Approach #2: SFN Transmission from Multiple TPs

In this type of technique, TPs participating in the CoMP to be coupled in the SFN transmission scheme in the air transmit the same data together. When shared-TP CSI-RS resource between TPs is used for such SFN transmission, there may be a number of possible TP combinations corresponding to each CSI-RS resource, and it needs to be transmitted for QCL purposes, causing large CSI-RS overhead. Further research is needed to prevent CSI-RS overhead. For example, QCL tracking per TP and coupling at the UE end according to SFN transmission within a given cluster may be considered. This type of technique may benefit especially in high UE scenarios (e.g., V2X), and open loop transmission may be desirable due to high mobility.

Approach #3: Independent-Layer JT

For this type of technique, assuming that TP1 and TP2 are simply included in the CoMP set, separate layers for TP1 and TP2 are used for the non-coherent JP. Also, separate QCL/RM assumptions for TP1 and TP2 are directed to the UE. A single CSI process consisting of multiple CSI-RS resources may be configured, and here, the UE assumes an independent layer-JP and reports multiple sets of {RIi, PMIi} CSI-RSi and CQIs corresponding to each CSI-RSi. When RIi is calculated to 0, this may mean that a channel measured by CSI-RSi is not desirable to be used. Accordingly, such an indication may be provided by the UE, and accordingly, the eNB may schedule an independent-layer JP excluding the TP that transmits the CSI-RSi. This type of technique may benefit from a crowded layout scenario in a room.

In this method, resource allocation (RA) information may be necessarily limited to match by TPs or partially overlap (and/or do not overlap) may also be allowed. For example, in the latter case, RA information for each TP should be separately provided. As another example, RA information for a specific reference TP may be indicated and, in the case of RA regarding other TP(s), RAs different in a specific pattern in cooperation may be applied.

Proposal 1: It is desirable to consider outdoor and indoor layout scenarios for non-coherent JT.

Proposal 2: It is desirable to consider different use cases of non-coherent JT including frequency-selective DPS, SFN transmission and independent-layer JP.

FIG. 24 is a diagram illustrating a method for transmitting and receiving downlink data according to an embodiment of the present invention.

In particular, FIG. 24 illustrates a frequency-selective QCL technique described above.

Although only two cells A and B are illustrated in FIG. 24 for convenience of explanation, the same method may be applied to two or more cells. Further, the cell may be interpreted as TP.

The UE receives downlink data on the PDSCH from the cell A and the cell B. That is, the PDSCH is composed of a first resource block group and a second resource block group, in which downlink data transmitted from a first cell is mapped to the first resource block group and downlink data transmitted from a second cell is mapped to the second resource block group (S2401, S2402).

The UE may independently apply a QCL assumption to decode the first resource block group (i.e., mapped downlink data) and the second resource block group (i.e., mapped downlink data).

For example, it may be assumed that an antenna port associated with the first resource block group and an antenna port corresponding to the first CSI-RS resource are QCL-ed and it may be assumed that an antenna port associated with the second resource block group and an antenna port corresponding to a second CSI-RS resource are QCL-ed.

In another example, it is assumed that an antenna port associated with the first resource block group and a first CRS antenna port generated based on a first physical cell identifier (PCI) are QCL-ed and it may be assumed that an antenna port associated with the second resource block group and a second CRS antenna port generated based on a second PCI are QCL-ed.

Prior to steps S2401 and S2402, the UE may receive a non-zero power (NZP) CSI-RS resource index to which QCL assumption is applied by the first resource block group and the second resource block group and/or a PCI for CRS to which the QCL assumption is applied, from a serving cell.

Also, the UE may receive from the serving cell an index of one or more resource blocks constituting the first resource block group and an index (for example, bitmap form) of one or more resource blocks constituting the second resource block group.

In addition, a coding rate may be limited to below a predetermined upper limit value in the PDSCH transmission. Here, the upper limit value of the coding rate may be determined according to the number of cells participating in the multicast/broadcast.

FIG. 25 is a diagram illustrating a method of transmitting and receiving downlink data according to an embodiment of the present invention.

In particular, FIG. 25 illustrates the SFN transmission technique described above.

Although only two cells A and B are illustrated in FIG. 25 for convenience of explanation, the same method may also be applied to two or more cells. Further, the cell may be interpreted as TP.

The UE receives a first RS from the cell A (S2501) and derives a first large-scale parameter based on the first RS (S2502).

The UE receives the second RS from the cell B (S2503) and derives a second large-scale parameter based on the second RS (S2504).

The UE derives the final third large-scale parameter based on the first large-scale parameter and the second large-scale parameter (S2205).

Here, the third large-scale parameter may be derived by weighted averaging the first large-scale parameter and the second large-scale parameter.

Alternatively, the third large-scale parameter may be derived by either the first large-scale parameter or the second large-scale parameter. For example, the third large-scale parameter may be derived as a large-scale parameter for a cell with a larger reference signal received power (RSRP) or reference signal received quality (RSRQ) among the first cell and the second cell.

The UE receives the same data from the cell A and the cell B via a single PDSCH (S2205). That is, the PDSCH is transmitted in the SFN manner.

The UE decodes the PDSCH using the derived third large-width parameter (S2507).

General Wireless Communication Device to which an Embodiment of the Present Invention May be Applied FIG. 26 illustrates a block diagram of a wireless communication device according to an embodiment of the present invention.

Referring to FIG. 26, the wireless communication system includes an eNB 2610 and a plurality of UEs 2620 placed within the area of the eNB 2610.

The eNB 2610 includes a processor 2611, memory 2612, and a Radio Frequency (RF) unit 2613. The processor 2611 implements the functions, processes and/or methods proposed with reference to FIGS. 1 to 25. The layers of the radio interface protocol may be implemented by the processor 2611. The memory 2612 is connected to the processor 2611 and stores various types of information for driving the processor 2611. The RF unit 2613 is connected to the processor 2611 and sends and/or receives radio signals.

The UE 2620 includes a processor 2621, memory 2622, and an RF unit 2623. The processor 2621 implements the functions, processes and/or methods proposed with reference to FIGS. 1 to 25. The layers of the radio interface protocol may be implemented by the processor 2621. The memory 2622 is connected to the processor 2621 and stores various types of information for driving the processor 2621. The RF unit 2623 is connected to the processor 2621 and sends and/or receives radio signals.

The memory 2612, 2622 may be placed inside or outside the processor 2611, 2621 and may be connected to the processor 2611, 2621 by well-known various means. Furthermore, the eNB 2610 and/or the UE 2620 may have a single antenna or multiple antennas.

Hereinafter, detailed embodiments of the present invention are described in detail with reference to the accompanying drawings. Each of elements or characteristics may be considered to be optional unless otherwise described explicitly. Each element or characteristic may be implemented in such a way as not to be combined with other elements or characteristics. Furthermore, some of the elements and/or the characteristics may be combined to form an embodiment of the present invention. Order of operations described in connection with the embodiments of the present invention may be changed. Some of the elements or characteristics of an embodiment may be included in another embodiment or may be replaced with corresponding elements or characteristics of another embodiment. It is evident that in the claims, one or more embodiments may be constructed by combining claims not having an explicit citation relation or may be included as one or more new claims by amendments after filing an application.

An embodiment of the present invention may be implemented by various means, for example, hardware, firmware, software or a combination of them. In the case of implementations by hardware, an embodiment of the present invention may be implemented using one or more Application-Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers and/or microprocessors.

In the case of implementations by firmware or software, an embodiment of the present invention may be implemented in the form of a module, procedure, or function for performing the aforementioned functions or operations. Software code may be stored in the memory and driven by the processor. The memory may be placed inside or outside the processor, and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

INDUSTRIAL APPLICABILITY

The method for reducing interference of D2D communication in a wireless communication system according to an embodiment of the present invention has been illustrated as being applied to 3GPP LTE/LTE-A systems, but may be applied to various wireless communication systems other than the 3GPP LTE/LTE-A systems.

The invention claimed is:

1. A method for receiving downlink data in a wireless communication system, the method performed by user equipment (UE) comprising:
receiving configuration information including a plurality of QCL (quasi-co-location) related information;
receiving downlink control information (DCI) including information indicating at least two of the plurality of QCL related information,
wherein first QCL related information and second QCL related information are indicated based on the DCI; and
receiving downlink data on a plurality of resources,
wherein the plurality of resources comprise first resources and second resources that are non-overlapping in the frequency domain, and
wherein the first QCL related information is associated with the first resources and the second QCL related information is associated with the second resources.

2. The method of claim 1, wherein the a first resource block group comprises the first resources and a second resource block group comprises the second resources.

3. The method of claim 2, wherein it is assumed that an antenna port associated with the first resource block group and an antenna port corresponding to a first channel state information-reference signal (CSI-RS) resource are QCL-ed, and it is assumed that an antenna port associated with the second resource block group and an antenna port corresponding to a second CSI-RS resource are QCL-ed.

4. The method of claim 2, wherein it is assumed that an antenna port associated with the first resource block group and a first cell-specific reference signal (CRS) antenna port generated based on a first physical cell identity (PCI) are QCL-ed and it is assumed that an antenna port associated with the second resource block group and a second CRS antenna port generated based on a second PCI are QCL-ed.

5. The method of claim 2, further comprising:
receiving indexes of one or more resource blocks comprising the first resource block group and indexes of one or more resource blocks comprising the second resource block group.

6. The method of claim 2, wherein a coding rate of the downlink data is limited to below a predetermined upper limit value.

7. The method of claim 1, wherein the downlink data comprises a single codeword encoded from a single transport block.

8. The method of claim 1, wherein the plurality of resources comprises a plurality of layers.

9. The method of claim 1, wherein the downlink data is transmitted from a plurality of cells based on SFN (single frequency network) transmission.

10. The method of claim 9, further comprising:
receiving a plurality of reference signals from the plurality of cells,
deriving a plurality of QCL related parameters based on each of the plurality of reference signals, and
decoding the downlink data based on a specific QCL related parameter.

11. The method of claim 10,
wherein each of the plurality of QCL related information includes resource indexes of the plurality of reference signals.

12. The method of claim 10,
wherein the specific QCL related parameter is a weighted average of the plurality of QCL related parameters.

13. The method of claim 10, wherein the specific QCL related parameter is one of the plurality of QCL related parameters.

14. The method of claim 10, wherein the specific QCL related parameter is a QCL related parameter based on a reference signal transmitted from a cell having a larger reference signal received power (RSRP) or a reference signal received quality (RSRQ) among the plurality of cells.

15. The method of claim 1, wherein the first resources are indexed by even numbers and the second resources are indexed by odd numbers.

16. The method of claim 1, wherein each of the plurality of QCL related information includes (i) information related with a reference signal for QCL and (ii) Cell index.

17. A user equipment (UE) configured to receive downlink data in a wireless communication system, the UE comprising:
at least one transceiver;
at least one processor; and
at least one computer memory connected to the at least one processor and storing instructions that, based on being executed by the at least one processor, perform operations comprising:
receiving configuration information including a plurality of QCL(quasi-co-location) related information;
receiving downlink control information(DCI) including information indicating at least two of the plurality of QCL related information,
wherein a first QCL related information and a second QCL related information are indicated based on the DCI; and
receiving downlink data on a plurality of resources,
wherein the plurality of resources comprise a first resources and a second resources that are non-overlapping in the frequency domain, and
wherein the first QCL related information is associated to the first resources and the second QCL related information is associated to the second resources.

18. A method for transmitting downlink data in a wireless communication system, the method performed by a base station (BS) comprising:
transmitting, to a user equipment (UE), configuration information including a plurality of QCL(quasi-co-location) related information;
transmitting, to the UE, downlink control information (DCI) including information indicating at least two of the plurality of QCL related information; and
transmitting, to the UE, downlink data on a plurality of resources,
wherein the plurality of resources comprise a first resources and a second resources that are non-overlapping in the frequency domain, and
wherein based on a first QCL related information and a second QCL related information being indicated by the information, the first QCL related information is associated to the first resources and the second QCL related information is associated to the second resources.

19. A base station (BS) configured to transmit downlink data in a wireless communication system, the BS comprising:
at least one transceiver;
at least one processor; and
at least one computer memory connected to the at least one processor and storing instructions that, based on being executed by the at least one processor, perform operations comprising:
transmitting, to a user equipment (UE), configuration information including a plurality of QCL(quasi-co-location) related information;
transmitting, to the UE, downlink control information (DCI) including information indicating at least two of the plurality of QCL related information; and
transmitting, to the UE, downlink data on a plurality of resources,
wherein the plurality of resources comprise a first resources and a second resources that are non-overlapping in the frequency domain, and
wherein based on a first QCL related information and a second QCL related information being indicated by the information, the first QCL related information is associated to the first resources and the second QCL related information is associated to the second resources.

* * * * *